(12) United States Patent
Nishikawa et al.

(10) Patent No.: US 12,547,321 B2
(45) Date of Patent: Feb. 10, 2026

(54) MEMORY SYSTEM AND METHOD OF CONTROLLING NONVOLATILE MEMORY

(71) Applicant: Kioxia Corporation, Tokyo (JP)

(72) Inventors: Suguru Nishikawa, Tokyo (JP);
Takehiko Amaki, Kanagawa (JP);
Shunichi Igahara, Kanagawa (JP);
Toshikatsu Hida, Kanagawa (JP);
Yoshihisa Kojima, Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/592,763

(22) Filed: Mar. 1, 2024

(65) Prior Publication Data
US 2024/0295969 A1   Sep. 5, 2024

(30) Foreign Application Priority Data
Mar. 2, 2023   (JP) ................. 2023-032128

(51) Int. Cl.
*G06F 3/06* (2006.01)

(52) U.S. Cl.
CPC .......... *G06F 3/0619* (2013.01); *G06F 3/0656* (2013.01); *G06F 3/0659* (2013.01); *G06F 3/0679* (2013.01)

(58) Field of Classification Search
CPC .... G06F 3/0619; G06F 3/0656; G06F 3/0659; G06F 3/0679; G06F 11/1048; G11C 11/5628
See application file for complete search history.

(56) References Cited

U.S. PATENT DOCUMENTS

| | | | |
|---|---|---|---|
| 9,342,410 B2 | 5/2016 | Oshinsky et al. | |
| 9,696,918 B2 | 7/2017 | Zaltsman et al. | |
| 9,727,368 B1* | 8/2017 | Tsirkin | G06F 3/067 |
| 9,946,496 B2 | 4/2018 | Lotem et al. | |
| 2012/0290897 A1* | 11/2012 | Yoon | G11C 11/5628 |
| | | | 714/766 |
| 2018/0032283 A1* | 2/2018 | Park | G06F 3/0659 |
| 2018/0182463 A1* | 6/2018 | Dutta | G06F 3/0619 |
| 2021/0048952 A1* | 2/2021 | Cariello | G06F 3/0679 |
| 2021/0200435 A1* | 7/2021 | Miller | G06F 3/0604 |
| 2022/0043596 A1* | 2/2022 | Madraswala | G11C 29/021 |
| 2022/0147476 A1* | 5/2022 | Nam | G06F 3/0604 |
| 2022/0374216 A1* | 11/2022 | Sugawara | G06F 3/0604 |
| 2023/0282294 A1* | 9/2023 | Gorobets | G11C 7/106 |
| | | | 365/185.22 |
| 2023/0359378 A1* | 11/2023 | Gopalakrishnan | G06F 3/0659 |

* cited by examiner

*Primary Examiner* — Nanci N Wong
(74) *Attorney, Agent, or Firm* — Maier & Maier, PLLC

(57) ABSTRACT

According to an embodiment, a memory system includes a nonvolatile memory and a memory controller. The nonvolatile memory includes a first memory cell configured to nonvolatilely store data of a plurality of bits including a first bit and a second bit, and a second memory cell configured to nonvolatilely store data of at least one bit. The memory controller is configured to execute a save operation in accordance with reception of a command from a host, in the save operation, write first bit data to the second memory cell in a case where the first memory cell stores the first bit data as the first bit and does not store data as the second bit, and transmit, to the host, a completion response to the command after the first bit data has been written to the second memory cell.

20 Claims, 32 Drawing Sheets

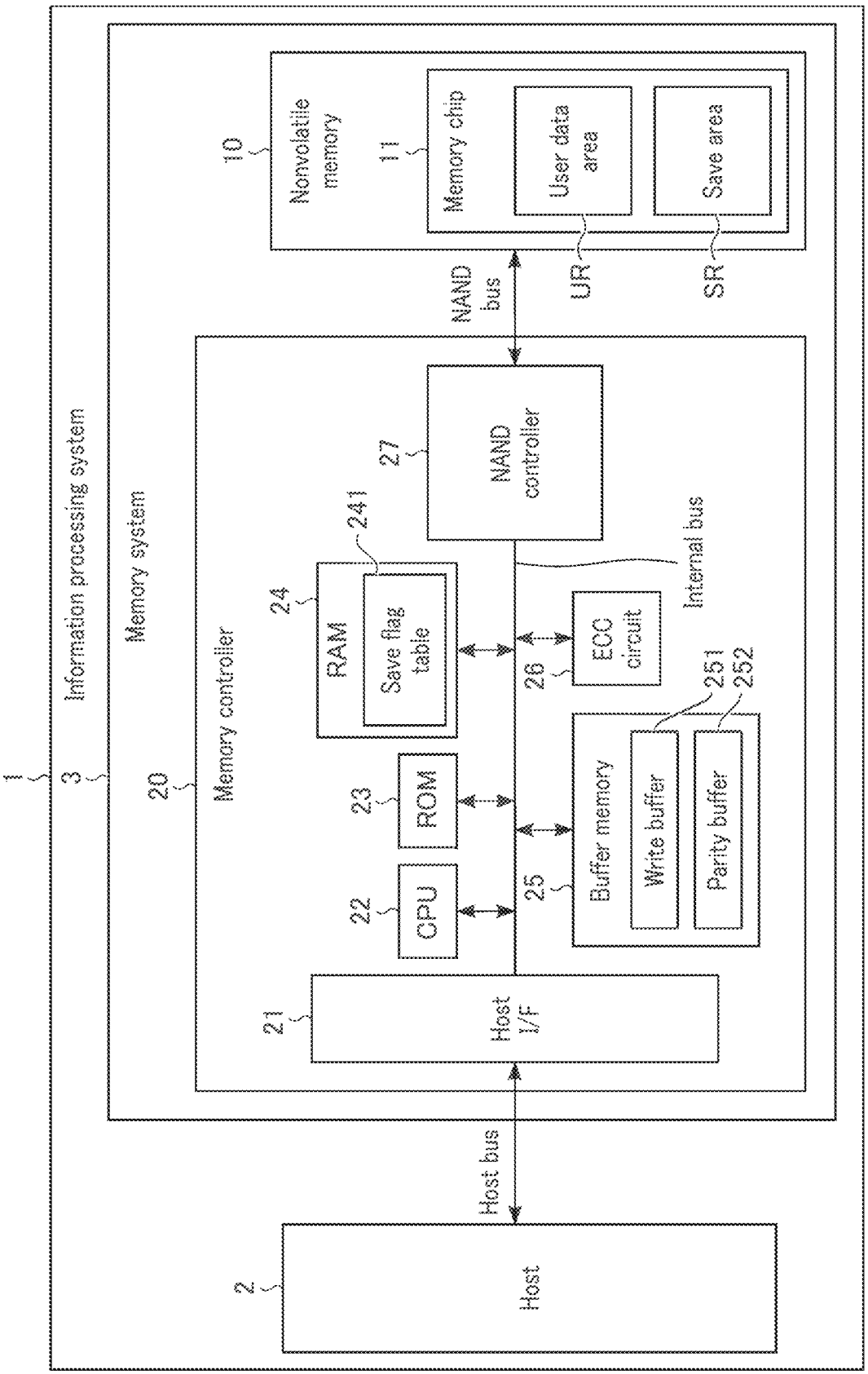
F I G. 1

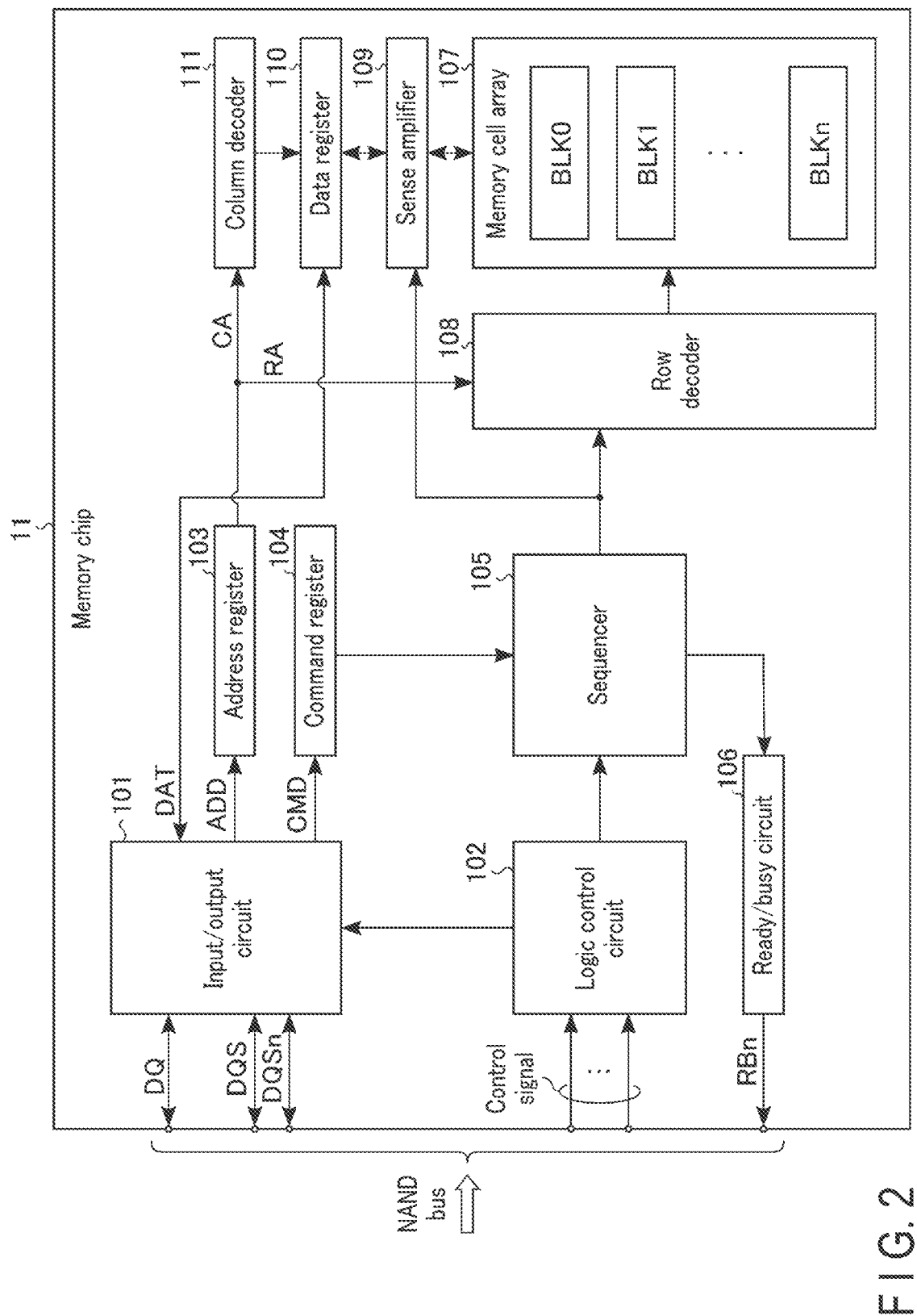
F I G. 2

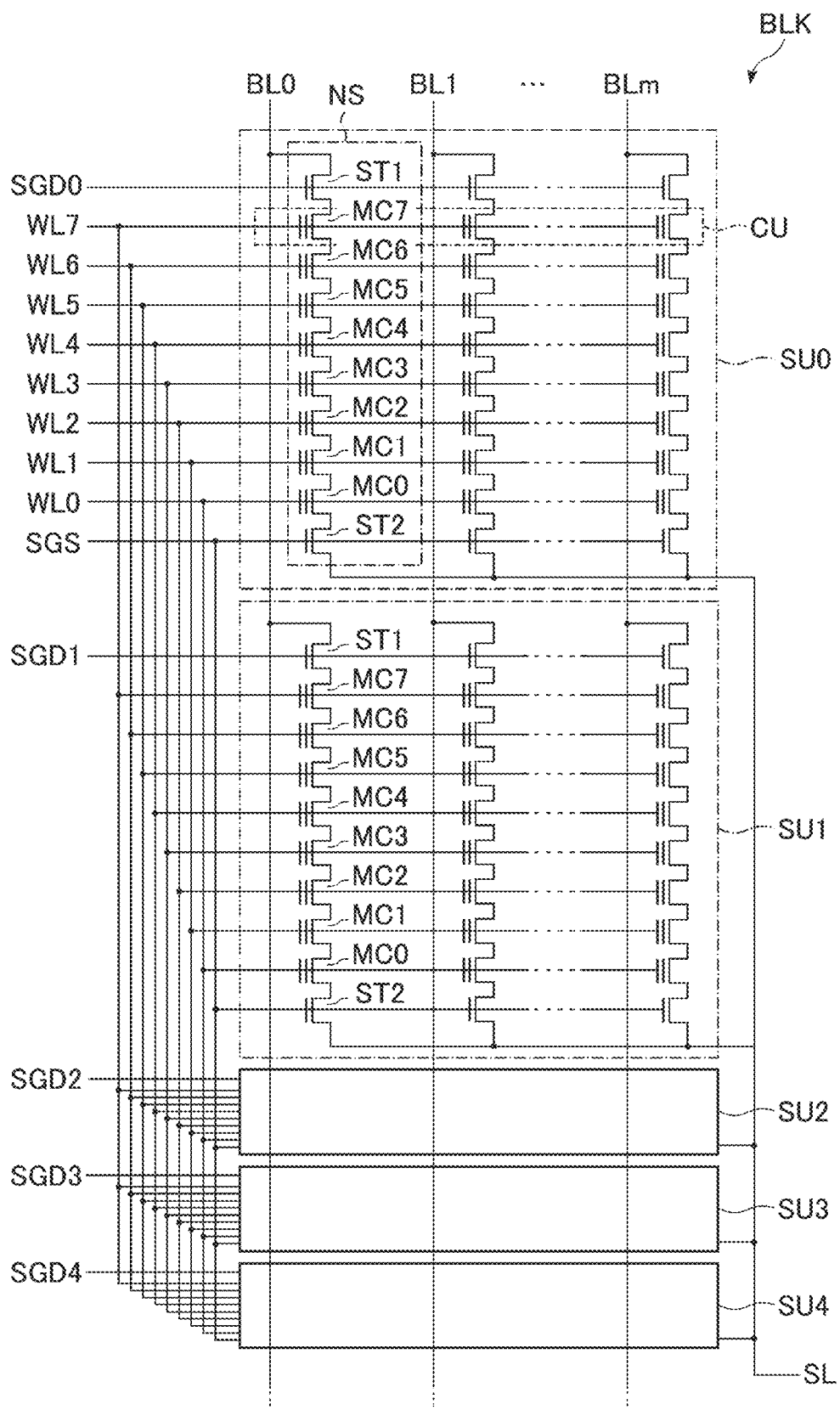
F I G. 3

FIG. 6

| WL # | PT | H0 | H1 | H2 | H3 | H4 | H5 | H6 | H7 |
|---|---|---|---|---|---|---|---|---|---|
| 0 | L | D0 | D2 | D4 | D6 | D8 | D10 | D12 | PL0 |
| 0 | M | D1 | D3 | D5 | D7 | D9 | D11 | D13 | PM0 |
| 0 | U | D14 | D16 | D18 | D20 | D22 | D24 | D26 | PU0 |
| 0 | T | D15 | D17 | D19 | D21 | D23 | D25 | D27 | PT0 |
| ... | ... | | | | | | | | |

BLK in user data area (UR)

| WL # | S0 | S1 | S2 | S3 | S4 | S5 | S6 | S7 | S8 | S9 | S10 | S11 | S12 | S13 | S14 |
|---|---|---|---|---|---|---|---|---|---|---|---|---|---|---|---|
| 0 | D0 | Ps0 | | | | | | | | | | | | | |
| 1 | | | | | | | | | | | | | | | |
| 2 | | | | | | | | | | | | | | | |
| 3 | | | | | | | | | | | | | | | |
| 4 | | | | | | | | | | | | | | | |
| 5 | | | | | | | | | | | | | | | |

BLK in save area (SR)

|   | Buffer | | | |
|---|---|---|---|---|
|   | 0 | 1 | 2 | 3 |
| Data | D0 | — | — | — |

251

F I G. 7

| PT | Parity data |
|---|---|
| L | PL0 |
| M | PM0 |
| U | PU0 |
| T | PT0 |

252

F I G. 8

|   | LBN | WL# | PT | PBN |
|---|---|---|---|---|
| 1 | 0 | 0 | L | H0 |
| 2 | — | — | — | — |
| 3 | — | — | — | — |
| 4 | — | — | — | — |
| 5 | — | — | — | — |
| 6 | — | — | — | — |
| 7 | — | — | — | — |

241

F I G. 9

| WL# | Write operation | Page | BLK in user data area ||||||||
| --- | --- | --- | --- | --- | --- | --- | --- | --- | --- | --- |
| | | | H0 | H1 | H2 | H3 | H4 | H5 | H6 | H7 |
| 0 | WRT1 | L/M | 1 | 2 | 3 | 4 | 5 | 6 | 7 | 8 |
| | WRT2 | U/T | 17 | 18 | 19 | 20 | 21 | 22 | 23 | 24 |
| 1 | WRT1 | L/M | 9 | 10 | 11 | 12 | 13 | 14 | 15 | 16 |
| | WRT2 | U/T | 33 | 34 | 35 | 36 | 37 | 38 | 39 | 40 |
| 2 | WRT1 | L/M | 25 | 26 | 27 | 28 | 29 | 30 | 31 | 32 |
| | WRT2 | U/T | | | | | | | | |
| ⋮ | ⋮ | ⋮ | | | | | | | | |

FIG. 13

| WL# | Write operation | Page | SU0 | SU1 | SU2 | SU3 | SU4 |
| --- | --- | --- | --- | --- | --- | --- | --- |
| 0 | WRT1 | L/M | 1 | 2 | 3 | 4 | 5 |
| | WRT2 | U/T | 7 | 9 | 11 | 13 | 15 |
| 1 | WRT1 | L/M | 6 | 8 | 10 | 12 | 14 |
| | WRT2 | U/T | 17 | 19 | 21 | 23 | 25 |
| 2 | WRT1 | L/M | 16 | 18 | 20 | 22 | 24 |
| | WRT2 | U/T | 27 | 29 | 31 | 33 | 35 |
| 3 | WRT1 | L/M | 26 | 28 | 30 | 32 | 34 |
| | WRT2 | U/T | | | | | |

FIG. 14

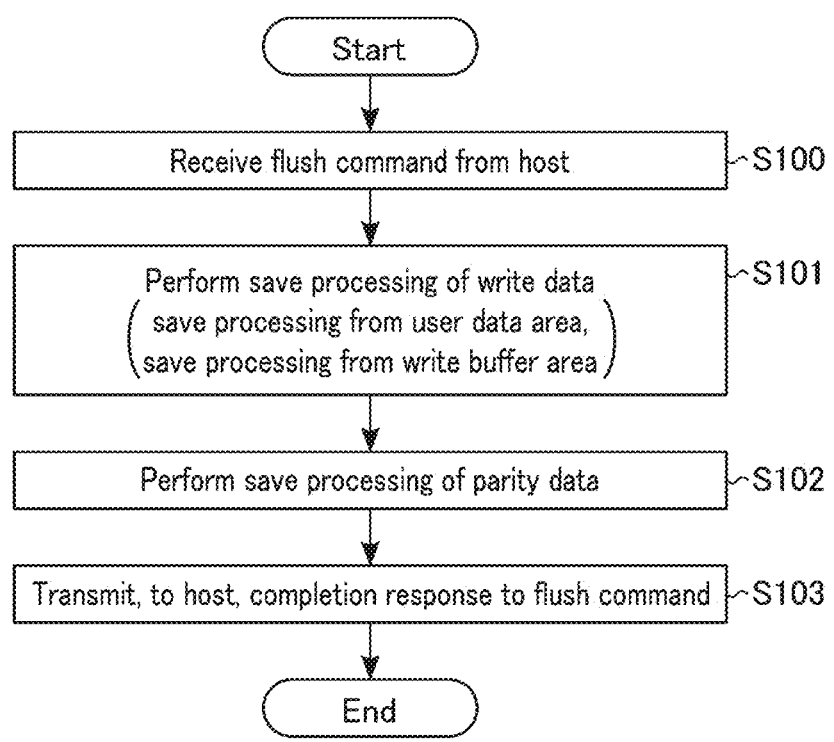
F I G. 15

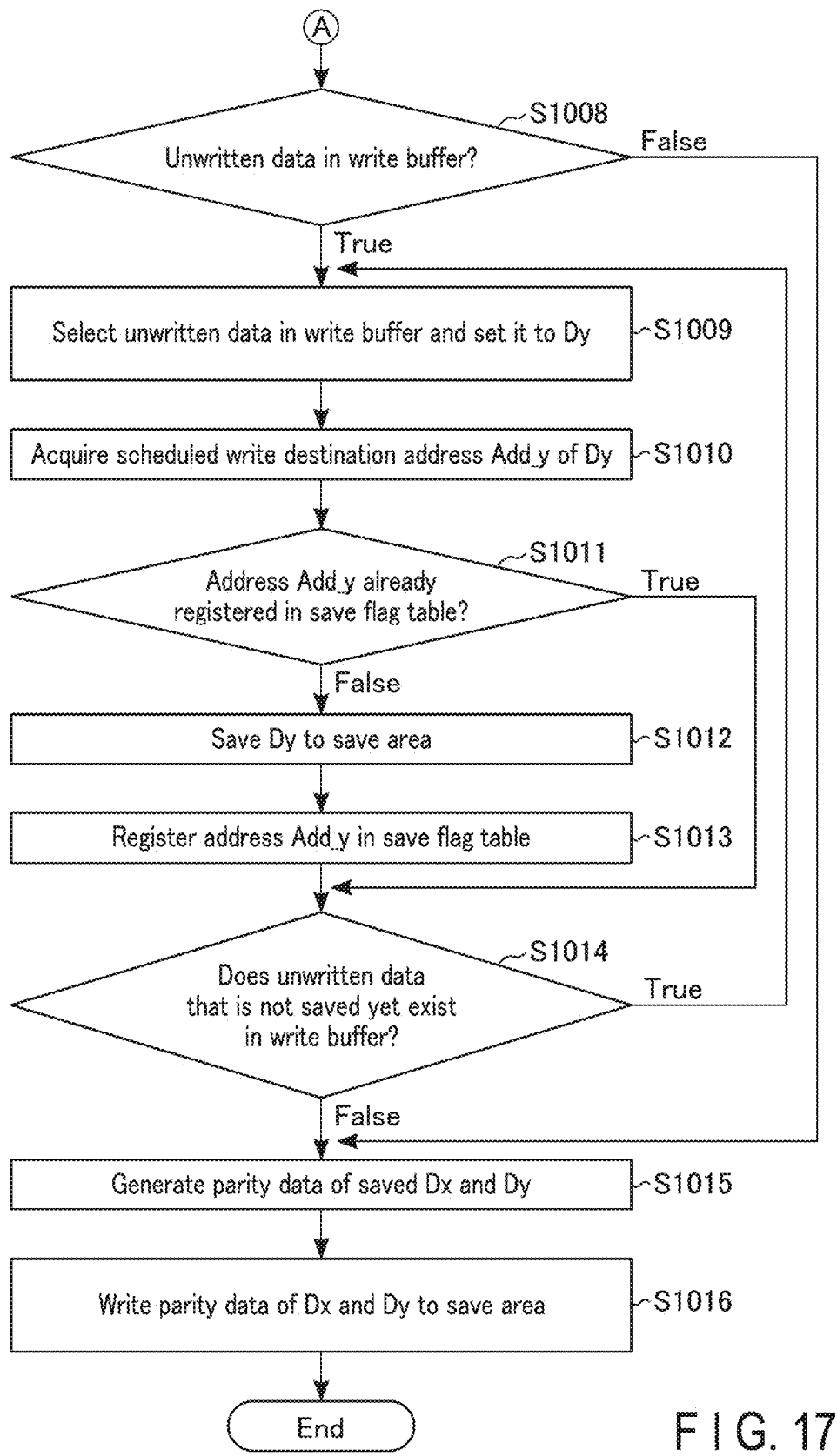
F I G. 17

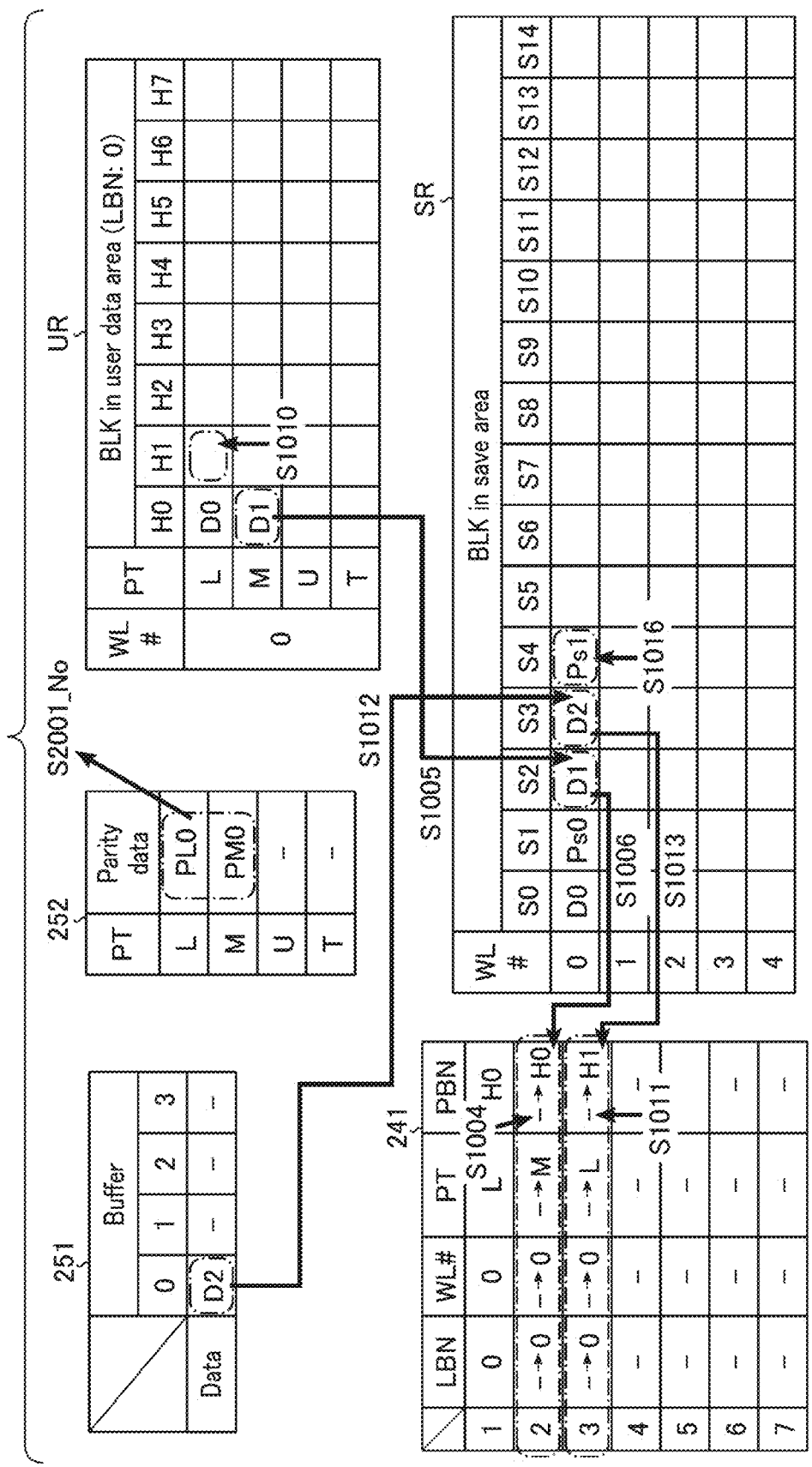
F I G. 20

Write buffer save flag table ~ 241

241a

| | LBN | WL# | PT | PBN |
|---|---|---|---|---|
| 1 | 0 | 0 | L | H0 |
| 2 | – | – | – | – |
| 3 | – | – | – | – |
| 4 | – | – | – | – |
| 5 | – | – | – | – |
| 6 | – | – | – | – |
| 7 | – | – | – | – |

User data area save flag table

241b

| | LBN | WL# | PT | PBN |
|---|---|---|---|---|
| 1 | 0 | 0 | L | H0 |
| 2 | – | – | – | – |
| 3 | – | – | – | – |
| 4 | – | – | – | – |
| 5 | – | – | – | – |
| 6 | – | – | – | – |
| 7 | – | – | – | – |

F I G. 23

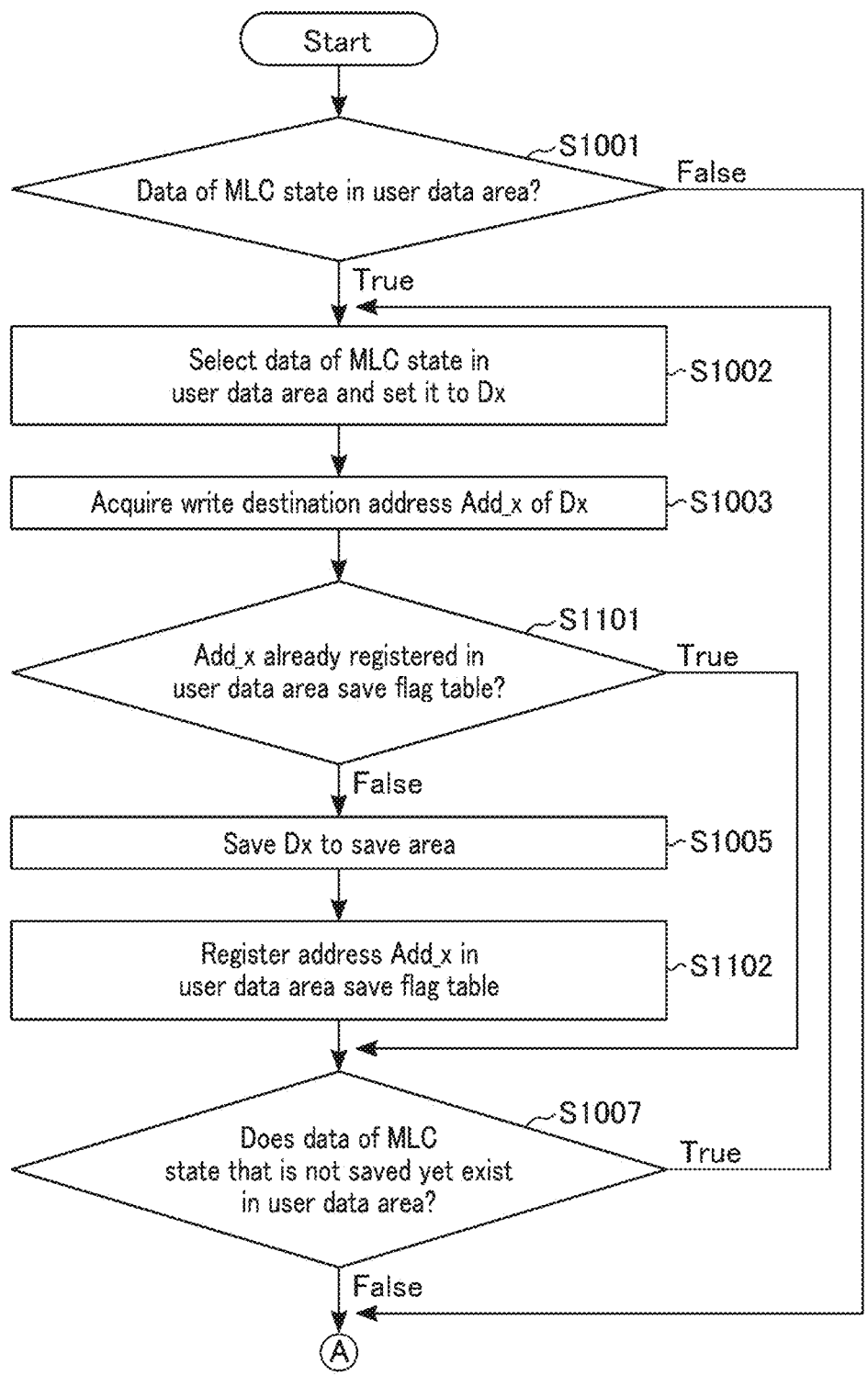
F I G. 24

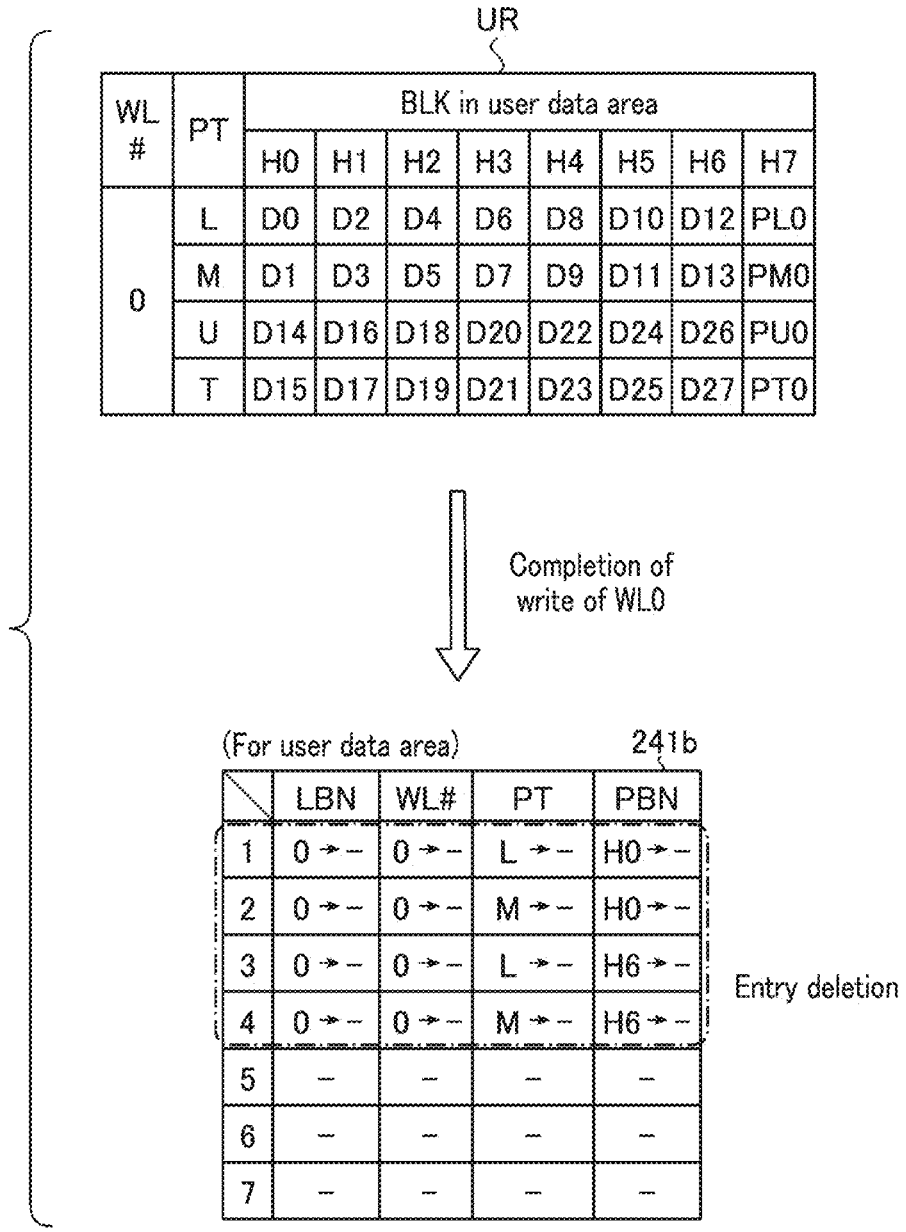
F I G. 30

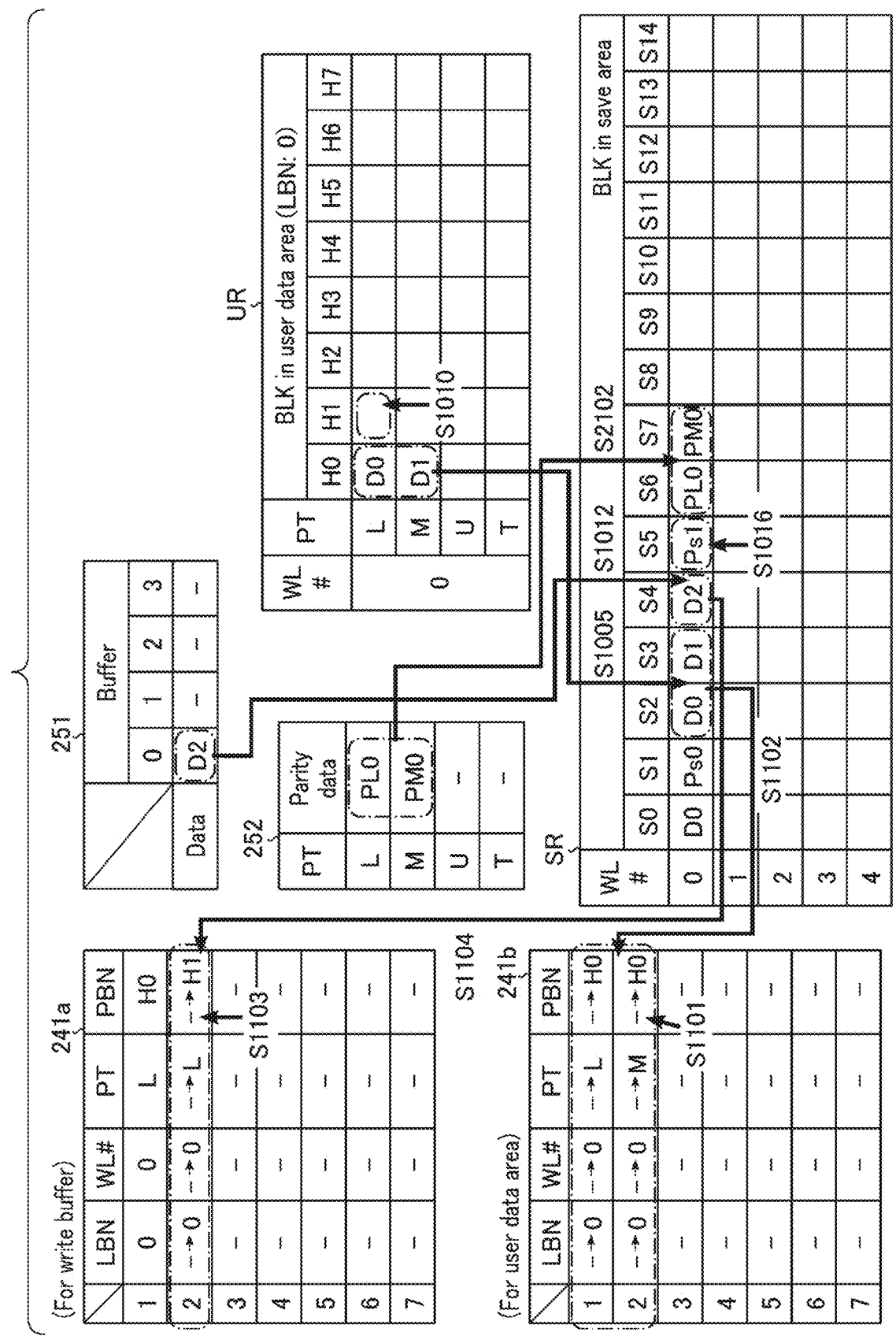
F I G. 34

MEMORY SYSTEM AND METHOD OF CONTROLLING NONVOLATILE MEMORY

CROSS-REFERENCE TO RELATED APPLICATIONS

This application is based upon and claims the benefit of priority from Japanese Patent Application No. 2023-032128, filed Mar. 2, 2023, the entire contents of which are incorporated herein by reference.

FIELD

Embodiments described herein relate generally to a memory system.

BACKGROUND

As a memory system, a solid state drive (SSD), which includes a nonvolatile semiconductor memory such as a NAND flash memory, is known.

BRIEF DESCRIPTION OF THE DRAWINGS

FIG. 1 is a block diagram showing an example of the overall configuration of an information processing system including a memory system according to a first embodiment.

FIG. 2 is a block diagram showing the basic configuration of a memory chip included in the memory system according to the first embodiment.

FIG. 3 is a circuit diagram showing an example of the circuit configuration of a memory cell array included in the memory system according to the first embodiment.

FIG. 6 is a table showing an example of the configuration of the memory areas of the memory cell array included in the memory system according to the first embodiment.

FIG. 7 is a view showing an example of the configuration of a write buffer included in the memory system according to the first embodiment.

FIG. 8 is a view showing an example of the configuration of a parity buffer included in the memory system according to the first embodiment.

FIG. 9 is a view showing an example of the configuration of a save flag table included in the memory system according to the first embodiment.

FIG. 13 is a view showing an example of the order of executing the first write operation and the second write operation in the memory system according to the first embodiment.

FIG. 14 is a view showing another example of the order of executing the first write operation and the second write operation in the memory system according to the first embodiment.

FIG. 15 is a flowchart showing an example of the procedure of a save operation in the memory system according to the first embodiment.

FIG. 17 is a flowchart showing an example of save processing of write data in the memory system according to the first embodiment.

FIG. 20 is a view showing a second detailed example of the save operation in the memory system according to the first embodiment.

FIG. 23 is a view showing an example of the configuration of a save flag table included in a memory system according to a second embodiment.

FIG. 24 is a flowchart showing an example of save processing of write data in the memory system according to the second embodiment.

FIG. 30 is a view showing entry deletion of a user data area save flag table in the memory system according to the second embodiment.

FIG. 34 is a view showing a first detailed example of a save operation in a memory system according to a fourth embodiment.

DETAILED DESCRIPTION

Figure 4:
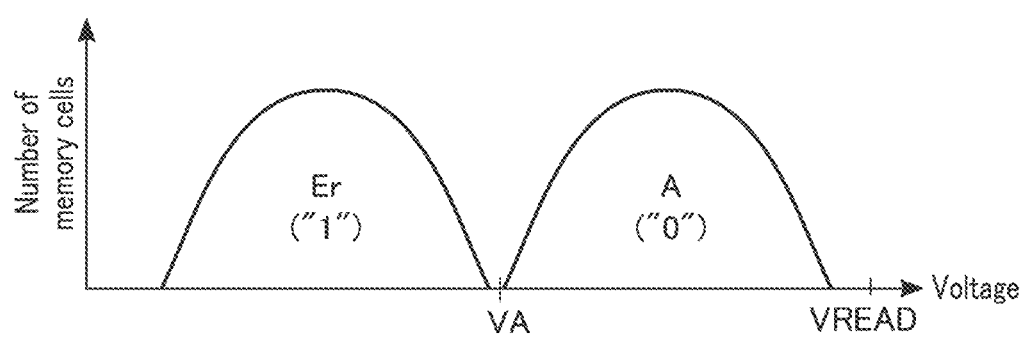
FIG. 4 is a view showing a threshold voltage distribution and data assignment in a case where a memory cell transistor included in the memory system according to the first embodiment is an SLC.

In general, according to one embodiment, a memory system includes a nonvolatile memory and a memory controller. The nonvolatile memory includes a first memory cell configured to nonvolatilely store data of a plurality of bits including a first bit and a second bit, and a second memory cell configured to nonvolatilely store data of at least one bit. The memory controller is configured to execute a save operation in accordance with reception of a command from a host. The memory controller is configured to, in the save operation, write first bit data to the second memory cell in a case where the first memory cell stores the first bit data as the first bit and does not store data as the second bit, and transmit, to the host, a completion response to the command after the first bit data has been written to the second memory cell.

Embodiments will now be described with reference to the accompanying drawings. The drawings are schematic drawings. Note that in the following explanation, constituent elements having the substantially same functions and configurations are denoted by the same reference numerals. A number after characters that form a reference numeral is used to distinguish between elements having identical configurations.

A memory system according to an embodiment will be described below.

1 Configuration

1.1 Configuration of Information Processing System

1.1.1 Configuration of Information Processing Apparatus

First, an example of the configuration of an information processing system 1 will be described with reference to FIG. 1. FIG. 1 is a block diagram showing an example of the overall configuration of the information processing system 1.

As shown in FIG. 1, the information processing system 1 includes a host 2 and a memory system 3.

The host 2 is an information processing apparatus (computing device) that accesses the memory system 3. The host 2 controls the memory system 3. More specifically, for example, the host 2 requests (instructs) the memory system 3 to execute a write operation or a read operation of data (to be referred to as "user data" hereinafter). For example, a write request includes a write command, a logical address, and user data. Also, the host 2 transmits a flush command to the memory system 3. The flush command is a command that instructs the memory system 3 to non-volatilize (write) data whose non-volatilization has not been completed, that is, whose write to a nonvolatile memory 10 of the memory system 3 has not been ended. For example, the host 2 issues the flush command in a case where it is expected that supply of power to the memory system 3 stops halfway through a write operation (that is, in a state in which a completion response to a write request is not received from the memory system 3). In the memory system 3, data is nonvolatilized based on the flush command, thereby suppressing data loss due to power stop.

The memory system 3 is, for example, a solid state drive (SSD). The memory system 3 includes the nonvolatile memory 10, and a memory controller 20. The memory system 3 is coupled with the host 2 via a host bus. The type of the host bus depends on an application applied to the memory system 3. If the memory system 3 is an SSD, the host bus complies with, for example, the peripheral component interconnect express (PCIe™) standard.

1.1.2 Configuration of Memory System

An example of the configuration of the memory system 3 will be described next.

The nonvolatile memory 10 is a nonvolatile storage medium. The nonvolatile memory 10 nonvolatilely stores data received from the memory controller 20. A case where the nonvolatile memory 10 is a NAND flash memory will be described below. Note that the nonvolatile memory 10 may be a nonvolatile storage medium other than the NAND flash memory.

The memory controller 20 is, for example, a system-on-a-chip (SoC). The memory controller 20 instructs the nonvolatile memory 10 to execute a read operation, a write operation, etc. in response to a request (instruction) from the host 2. Upon receiving a flush command from the host 2, the memory controller 20 executes a data save operation. If the data save operation is completed, the memory controller 20 transmits, to the host 2, a completion response to the flush command. Also, the memory controller 20 manages the memory space of the nonvolatile memory 10.

An example of the internal configuration of the nonvolatile memory 10 will be described next. The nonvolatile memory 10 includes one or more memory chips 11.

The memory chip 11 is, for example, a semiconductor chip with a NAND flash memory mounted thereon. The memory chip 11 includes a plurality of memory cell transistors (to be also referred to as "memory cells" hereinafter) that nonvolatilely store data. The memory chip 11 is coupled with the memory controller 20 via a NAND bus. The memory chip 11 includes, in a memory area, a user data area UR and a save area SR.

The user data area UR is an area where write data including user data is stored.

The save area SR is an area where data (to be referred to as "save data" hereinafter) is stored based on the flush command. For example, the save data includes data stored in a write buffer 251 and a parity buffer 252 of a buffer memory 25, and data to be stored in a memory cell transistor for which the write operation has not been completed in the user data area UR of the memory chip 11. The write buffer 251 is an example of a first buffer. The parity buffer 252 is an example of a second buffer. A memory cell transistor in the user data area UR according to the embodiment can store data of a plurality of bits. In this embodiment, data of a plurality of bits is written in a memory cell transistor in the user data area UR by a plurality of write operations. That is, a memory cell transistor for which the write operation is not completed is a memory cell transistor for which one or more write operations are completed, but all of the plurality of write operations corresponding to data of a plurality of bits to be stored therein are not completed, and thus data of only some of the plurality of bits is stored. In other words, a memory cell transistor for which the write operation is not completed is a memory cell transistor in a halfway stage of the plurality of write operations. Details of the write operation will be described later.

An example of the internal configuration of the memory controller 20 will be described next. The memory controller 20 includes a host interface circuit (host I/F) 21, a central processing unit (CPU) 22, a read only memory (ROM) 23, a random access memory (RAM) 24, the buffer memory 25, an error checking and correcting (ECC) circuit 26, and one or more NAND controllers 27. These circuits are coupled with each other via, for example, an internal bus. Note that the functions of the host interface circuit 21, the ECC circuit 26, and the NAND controller 27 may be implemented by a dedicated circuit or may be implemented by a processor executing firmware.

The host interface circuit 21 is an interface circuit coupled with the host 2. The host interface circuit 21 performs communication between the host 2 and the memory controller 20. The host interface circuit 21 transmits a request and user data received from the host 2 to the CPU 22 and the buffer memory 25, respectively. Also, the host interface circuit 21 transmits user data in the buffer memory 25 to the host 2 in response to an instruction of the CPU 22.

The CPU 22 is a processor. The CPU 22 controls the operation of the entire memory controller 20. For example, the CPU 22 instructs the nonvolatile memory 10 to execute a write operation and a read operation based on a request of the host 2.

In addition, the CPU 22 executes a data save operation based on a flush command. The save operation is an operation of saving (writing), to the save area SR, data for which the write operation is not completed.

The ROM 23 is a nonvolatile memory. For example, the ROM 23 is an electrically erasable programmable read-only memory (EEPROM™). The ROM 23 is a non-transitory storage medium that stores firmware, programs, etc. For example, the CPU 22 loads firmware from the ROM 23 into the RAM 24 and executes it.

The RAM 24 is a volatile memory. The RAM 24 is a DRAM, an SRAM, or the like. The RAM 24 stores firmware for managing the nonvolatile memory 10 and various kinds of management tables. For example, the RAM 24 stores a save flag table 241 as a management table. The save flag table 241 is an example of a third table. The save flag table 241 is used to manage write data saved to the save area SR. Detailed of the save flag table 241 will be described later.

The buffer memory 25 is a volatile memory. The buffer memory 25 is a DRAM, an SRAM, or the like. The buffer memory 25 temporarily stores data that the memory controller 20 has read out from the nonvolatile memory 10 or user data received from the host 2. For example, the buffer memory 25 includes the write buffer 251 and the parity buffer 252.

The write buffer 251 temporarily stores write data. The write data includes user data and an error correction code for the user data. The error correction code is used to correct an error of data read out from the memory chip 11.

The parity buffer 252 temporarily stores an error correction code (to be also referred to as "parity data" hereinafter) capable of correcting a burst error such as a block missing fault. The block missing fault is, for example, a fault that a whole block BLK (to be described later) of the memory chip 11 cannot be accessed. The parity data is used to, for example, in a case where data cannot be read out from the memory chip 11, decode the data that cannot be read out, based on other data and the parity data.

The ECC circuit 26 is a circuit that executes ECC processing. The ECC processing includes encoding processing and decoding processing of data. For example, in the write operation, the ECC circuit 26 executes the encoding processing of user data, thereby generating an error correction code. The ECC circuit 26 generates write data by adding the error correction code to the user data. Then, the ECC circuit 26 executes the decoding processing in the read operation. That is, the ECC circuit 26 executes error correction of data read out from the memory chip 11 using the error correction code.

Also, the ECC circuit 26 executes correction processing of a burst error. For example, if target data cannot be read out, the ECC circuit 26 executes burst error correction processing based on other data and parity data, thereby decoding the target data that cannot be read out. The ECC circuit 26 generates parity data based on one or more write data.

The NAND controller 27 controls the memory chip 11. For example, one NAND controller 27 can control a plurality of memory chips 11. The NAND controller 27 transmits a command corresponding to a write operation, a read operation, an erase operation, or the like to the memory chip 11. In the read operation, the NAND controller 27 receives readout data from the memory chip 11.

1.1.3 Configuration of Memory Chip

Next, an example of the configuration of the memory chip 11 will be described with reference to FIG. 2. FIG. 2 is a block diagram showing an example of the basic configuration of the memory chip 11. Note that in the example shown in FIG. 2, some of the couplings between the constituent elements are indicated by arrow lines. However, the couplings between the constituent elements are not limited to the example shown in FIG. 2.

As shown in FIG. 2, the memory chip 11 transmits and receives a signal DQ and timing signals DQS and DQSn to and from the memory controller 20 (more specifically, the NAND controller 27) via a NAND bus. The signal DQ is, for example, data DAT, an address ADD, or a command CMD. The timing signals DQS and DQSn are timing signals used at the time of input and output of the data DAT. The timing signal DQSn is the inverted signal of the timing signal DQS.

Also, the memory chip 11 receives various kinds of control signals from the memory controller 20 via the NAND bus. In addition, the memory chip 11 transmits a ready/busy signal RBn to the memory controller 20 via the NAND bus. The ready/busy signal RBn is a signal indicating whether the memory chip 11 cannot receive a command CMD from the memory controller 20 (busy state) or can receive (ready state). In the busy state, the memory chip 11 cannot receive a command CMD from the memory controller 20. In the ready state, the memory chip 11 can receive a command CMD from the memory controller 20.

The internal configuration of the memory chip 11 will be described next. The memory chip 11 includes an input/output circuit 101, a logic control circuit 102, an address register 103, a command register 104, a sequencer 105, a ready/busy circuit 106, a memory cell array 107, a row decoder 108, a sense amplifier 109, a data register 110, and a column decoder 111.

The input/output circuit 101 is a circuit that inputs/outputs the signal DQ. The input/output circuit 101 is coupled with the memory controller 20. Also, the input/output circuit 101 is coupled with the logic control circuit 102, the address register 103, the command register 104, and the data register 110.

If the input signal DQ is the address ADD, the input/output circuit 101 transmits the address ADD to the address register 103. If the input signal DQ is the command CMD, the input/output circuit 101 transmits the command CMD to the command register 104.

If the input signal DQ is the data DAT, the input/output circuit 101 receives the input signal DQ based on the timing signals DQS and DQSn. The input/output circuit 101 then transmits the data DAT to the data register 110. In addition, the input/output circuit 101 outputs the data DAT to the memory controller 20 together with the timing signals DQS and DQSn.

The logic control circuit 102 is a circuit that performs logic control based on control signals. The logic control circuit 102 is coupled with the memory controller 20. In addition, the logic control circuit 102 is coupled with the input/output circuit 101 and the sequencer 105. The logic control circuit 102 receives various kinds of control signals from the memory controller 20. The logic control circuit 102 controls the input/output circuit 101 and the sequencer 105 based on the received control signals.

The address register 103 is a register that temporarily stores the address ADD. The address register 103 is coupled with the input/output circuit 101, the row decoder 108, and the column decoder 111. The address ADD includes a row address RA and a column address CA. The address register 103 transfers the row address RA to the row decoder 108. Also, the address register 103 transfers the column address CA to the column decoder 111.

The command register 104 is a register that temporarily stores the command CMD. The command register 104 is coupled with the input/output circuit 101 and the sequencer 105. The command register 104 transfers the command CMD to the sequencer 105.

The sequencer 105 is a circuit that controls the memory chip 11. The sequencer 105 controls the entire memory chip 11. More specifically, the sequencer 105 controls the ready/busy circuit 106, the row decoder 108, the sense amplifier 109, the data register 110, and the column decoder 111. The sequencer 105 executes a write operation, a read operation, an erase operation, or the like based on the command CMD.

The ready/busy circuit 106 is a circuit that transmits the ready/busy signal RBn. The ready/busy circuit 106 transmits the ready/busy signal RBn to the memory controller 20 in accordance with the operation state of the sequencer 105.

The memory cell array 107 is a set of a plurality of memory cell transistors arrayed in a matrix. The memory cell array 107 includes a plurality of blocks BLK0 to BLKn (n is an integer of 1 or larger). A block BLK is, for example, a set of a plurality of memory cell transistors in which data are erased at once. That is, the block BLK is a data erase unit. For example, some blocks BLK are included in the user data area UR, and the remaining blocks BLK are included in the save area SR. The number of blocks BLK included in the user data area UR and the number of blocks BLK included in the save area SR are arbitrary. Blocks BLK allocated to the user data area UR and blocks BLK allocated to the save area SR can be freely changed. Details of the configuration of the block BLK will be described later.

The row decoder 108 is a decoding circuit for the row address RA. The row decoder 108 selects one block BLK in the memory cell array 107 based on the decoding result. The row decoder 108 applies voltages to the wires (word lines and select gate lines to be described later) of the selected block BLK in the row direction.

The sense amplifier 109 is a circuit that performs write and read of the data DAT. The sense amplifier 109 is coupled with the memory cell array 107 and the data register 110. In the read operation, the sense amplifier 109 reads out the data DAT from the memory cell array 107. In the write operation, the sense amplifier 109 supplies voltages according to the data DAT to the memory cell array 107. The sense amplifier 109 includes a plurality of latch circuits configured to temporarily store data.

The data register 110 is a register that temporarily stores the data DAT. The data register 110 is coupled with the sense amplifier 109 and the column decoder 111. The data register 110 includes a plurality of latch circuits. Each latch circuit temporarily stores data (write data or parity data) received from the input/output circuit 101 or data (readout data) received from the sense amplifier 109.

The column decoder 111 is a circuit that decodes the column address CA. The column decoder 111 receives the column address CA from the address register 103. The column decoder 111 selects latch circuits in the data register 110 based on the decoding result of the column address CA.

1.1.4 Circuit Configuration of Memory Cell Array

Next, an example of the circuit configuration of the memory cell array 107 will be described with reference to FIG. 3. FIG. 3 is a circuit diagram showing an example of the circuit configuration of the memory cell array 107.

The block BLK includes, for example, five string units SU0 to SU4. Note that the number of string units SU included in the block BLK is arbitrary. The string unit SU is, for example, a set of a plurality of NAND strings NS selected at once in the write operation or the read operation.

The internal configuration of the string unit SU will be described next. The string unit SU includes a plurality of NAND strings NS. The NAND string NS is a set of a plurality of memory cell transistors coupled in series. Each of the plurality of NAND strings NS in the string unit SU is coupled with one of bit lines BL0 to BLm (m is an integer of 1 or larger).

The internal configuration of the NAND string NS will be described next. Each NAND string NS includes a plurality of memory cell transistors MC, and select transistors ST1 and ST2. In the example shown in FIG. 3, the NAND string NS includes eight memory cell transistors MC0 to MC7.

The memory cell transistor MC is a memory element that nonvolatilely stores data. The memory cell transistor MC includes a control gate and a charge accumulation layer. The memory cell transistor MC may be a metal-oxide-nitride-oxide-silicon (MONOS) type, or a floating gate (FG) type.

The select transistors ST1 and ST2 are switching elements. The select transistors ST1 and ST2 are used to select the string unit SU in various kinds of operations.

The current paths of the select transistor ST2, the memory cell transistors MC0 to MC7, and the select transistor ST1 in the NAND string NS are coupled in series. The drain of the select transistor ST1 is coupled with a bit line BL. The source of the select transistor ST2 is coupled with a source line SL.

The control gates of the memory cell transistors MC0 to MC7 in the same block BLK are commonly coupled with word lines WL0 to WL7, respectively. More specifically, for example, the block BLK includes the five string units SU0 to SU4. Each string unit SU includes a plurality of memory cell transistors MC0. The control gates of the plurality of memory cell transistors MC0 in the block BLK are commonly coupled with one word line WL0. This also applies to the memory cell transistors MC1 to MC7.

The gates of a plurality of select transistors ST1 in the string unit SU are commonly coupled with one select gate line SGD. More specifically, the gates of the plurality of select transistors ST1 in the string unit SU0 are commonly coupled with a select gate line SGD0. The gates of the plurality of select transistors ST1 in the string unit SU1 are commonly coupled with a select gate line SGD1. The gates of the plurality of select transistors ST1 in the string unit SU2 are commonly coupled with a select gate line SGD2. The gates of the plurality of select transistors ST1 in the string unit SU3 are commonly coupled with a select gate line SGD3. The gates of the plurality of select transistors ST1 in the string unit SU4 are commonly coupled with a select gate line SGD4.

The gates of a plurality of select transistors ST2 in the block BLK are commonly coupled with a select gate line SGS.

The word lines WL0 to WL7, the select gate lines SGD0 to SGD4, and the select gate line SGS are coupled with the row decoder 108.

The bit lines BL are commonly coupled with one NAND string NS in each of the plurality of string units SU of each block BLK. Each bit line BL is coupled with the sense amplifier 109.

The source line SL is shared by, for example, the plurality of blocks BLK.

A set of a plurality of memory cell transistors MC coupled with a common word line WL in one string unit SU will be referred to as, for example, a "cell unit CU". In other words, the cell unit CU is a set of a plurality of memory cell transistors MC selected at once in the write operation or the read operation. A page is a unit of data written at once in the cell unit CU (or read out at once). For example, if the memory cell transistor MC stores 1-bit data, the storage capacity of the cell unit CU is 1 page. Note that the cell unit CU can have a storage capacity of two or more pages based on the number of bits of data to be stored in the memory cell transistor MC.

In this embodiment, a case where each memory cell transistor MC in the user data area UR is a quad level cell (QLC) that stores 4-bit data, and each memory cell transistor MC in the save area SR is a single level cell (SLC) that stores 1-bit data will be described. Note that the memory cell transistor MC in the user data area UR is not limited to the QLC. This embodiment can be applied if the memory cell transistor MC in the user data area UR can store data of two or more bits. For example, the memory cell transistor MC may be a multi level cell (MLC) that stores 2-bit data, a triple level cell (TLC) that stores 3-bit data, or a penta level cell (PLC) that stores 5-bit data. Also, the memory cell transistor MC in the save area SR is not limited to the SLC. The memory cell transistor MC in the save area SR may store data of two or more bits.

1.2 Threshold Voltage Distribution of Memory Cell Transistors

Regarding the threshold voltage distribution of the memory cell transistors, two examples will be described.

1.2.1 Threshold Voltage Distribution of SLC

First, an example of the threshold voltage distribution of SLC will be described with reference to FIG. 4. FIG. 4 is a view showing a threshold voltage distribution and data assignment in a case where the memory cell transistor MC is an SLC.

As shown in FIG. 4, the threshold voltage of the SLC can have a value included in one of two discrete threshold voltage distributions. The two threshold voltage distributions will be referred to as an "Er state" and an "A state" hereinafter in ascending order of the threshold voltages.

The Er state corresponds to, for example, a data erased state. The A state corresponds to a state in which electric charges are injected into the charge accumulation layer, and data is written. In the write operation, a verify voltage corresponding to the threshold voltage distribution of the A state is defined as VA. The voltage VA and a voltage VREAD have a relationship given by VA<VREAD. The voltage VREAD is a voltage applied to a non-selected word line WL in the read operation. If the voltage VREAD is applied to the gate, the memory cell transistor MC is turned on regardless of data stored therein.

More specifically, the threshold voltage of the memory cell transistor MC included in the Er state is lower than the voltage VA. The threshold voltage of the memory cell transistor MC included in the A state is the voltage VA or higher, and lower than the voltage VREAD.

For example, "1" data is assigned to the Er state, and "0" data is assigned to the A state. The memory cell transistor MC thus stores 1-bit (binary) data.

1.2.2 Threshold Voltage Distribution of QLC

Figure 5:
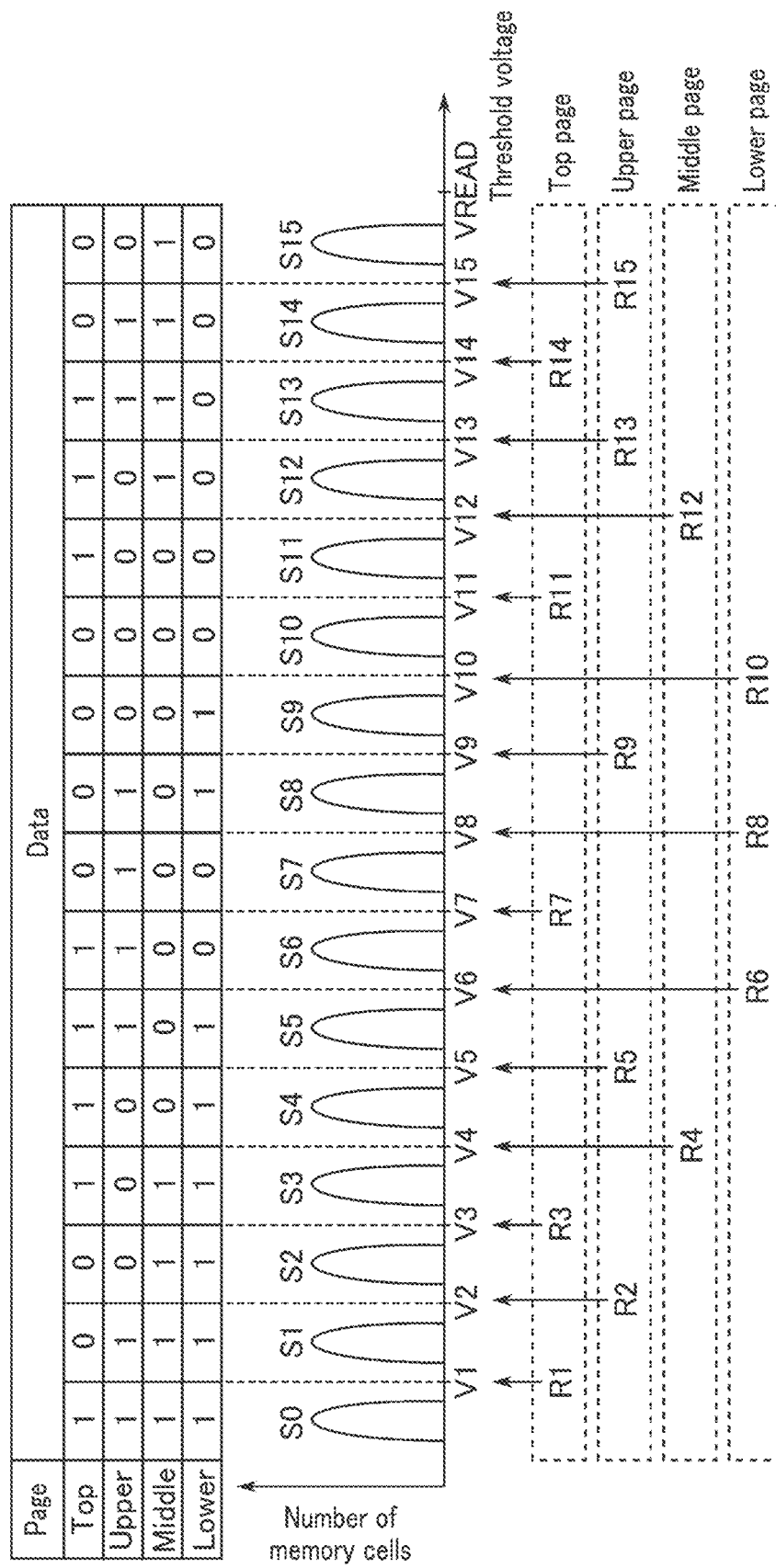
FIG. 5 is a view showing a threshold voltage distribution and data assignment in a case where a memory cell transistor included in the memory system according to the first embodiment is a QLC.

Next, an example of the threshold voltage distribution of QLC will be described with reference to FIG. 5. FIG. 5 is a view showing a threshold voltage distribution and data assignment in a case where the memory cell transistor MC is a QLC.

As shown in FIG. 5, if the memory cell transistor MC stores 4-bit data, the threshold voltage distribution is divided into 16 threshold voltage distributions. The 16 threshold voltage distributions will be referred to as S0 to S15 states in ascending order of the threshold voltages.

Voltages V1 to V15 are verify voltages used for the verify operation of the S1 to S15 states in the write operation. The relationship between these voltage values and the voltage VREAD is given by V1<V2<V3<V4<V5<V6<V7<V8<V9<V10<V11<V12<V13<V14<V15<VREAD.

The S0 state corresponds to the data erased state of the memory cell transistor MC. The S1 to S15 states each correspond to a state in which electric charges are injected into the charge accumulation layer of the memory cell transistor MC, and data is written. The threshold voltage of the memory cell transistor MC included in the S0 state is lower than the voltage V1. The threshold voltages of the memory cell transistors MC included in the S1 to S14 states are respectively the voltage V1 or higher and lower than the voltage V2, to the voltage V14 or higher and lower than the voltage V15. The threshold voltage of the memory cell transistor MC included in the S15 state is the voltage V15 or higher and lower than the voltage VREAD.

The value of the verify voltage and the value of the read voltage corresponding to each state may be identical or may be different. To simplify the explanation, a case where the verify voltage and the read voltage have the same value will be described below.

Read operations using the voltages V1 to V15 will be referred to as read operations R1 to R15 hereinafter, respectively. The read operation R1 determines whether the threshold voltage of the memory cell transistor MC is lower than the voltage V1. The read operation R2 determines whether the threshold voltage of the memory cell transistor MC is lower than the voltage V2. The read operation R3 determines whether the threshold voltage of the memory cell transistor MC is lower than the voltage V3. The same applies hereafter.

As described above, the threshold voltage of each memory cell transistor MC belongs to one of the 16 threshold voltage distributions. Thus, each memory cell transistor MC can take 16 types of states. By assigning "0000" to "1111" in binary notation to these states, each memory cell transistor MC can store 4-bit data. The bits of 4-bit data will be referred to as a "lower bit", a "middle bit", an "upper bit", and a "top bit" hereinafter sequentially from the lowest bit. Additionally, a set of lower bits stored in the memory cell transistors MC included in the same cell unit CU will be referred to as lower page data, a set of middle bits will be referred to as middle page data, a set of upper bits will be referred to as upper page data, and a set of top bits will be referred to as top page data.

In the example shown in FIG. 5, data of "lower bit/middle bit/upper bit/top bit" are assigned to the memory cell transistors MC included in the respective states, as follows.

S0 state: "1111" data
S1 state: "1110" data
S2 state: "1100" data
S3 state: "1101" data
S4 state: "1001" data
S5 state: "1011" data
S6 state: "0011" data
S7 state: "0010" data
S8 state: "1010" data
S9 state: "1000" data
S10 state: "0000" data
S11 state: "0001" data
S12 state: "0101" data
S13 state: "0111" data
S14 state: "0110" data
S15 state: "0100" data Note that the data assigned to the states are not limited to these.

When reading out the thus assigned data, the lower bit is determined by the read operations R6, R8, and R10. The middle bit is determined by the read operations R4 and R12. The upper bit is determined by the read operations R2, R5, R9, R13, and R15. The top bit is determined by the read operations R1, R3, R7, R11, and R14. That is, the values of the lower bit, the middle bit, the upper bit, and the top bit are determined by three, two, five, and five read operations, respectively. This data assignment will be referred to as "3-2-5-5 code" hereinafter. Note that the data assignment to the S0 to S15 states is not limited to the 3-2-5-5 code.

1.3 Configuration of Memory Cell Array

Next, an example of the memory areas of the memory cell array 107 will be described with reference to FIG. 6. FIG. 6 is a table showing an example of the configuration of the memory areas of the memory cell array 107. To simplify the explanation, the example in FIG. 6 shows a case where each block BLK includes one string unit SU. Also, in the example shown in FIG. 6, a rectangular frame of a solid line indicates one page data.

As shown in FIG. 6, the memory cell array 107 includes the user data area UR and the save area SR as the memory areas. The user data area UR is an area where write data and parity data corresponding to the write data are stored.

The example in FIG. 6 shows a state in which each page data is written in the cell unit CU corresponding to the word line WL0 (that is, the word line WL identified by word line number WL#"0") in each block BLK. Data D0 to D27 indicate write data. Parity data PL0, PM0, PU0, and PT0 indicate parity data of lower page data, middle page data, upper page data, and top page data each corresponding to the word line WL0.

More specifically, the user data area UR includes, for example, eight blocks BLK. The memory controller 20 manages one or more blocks BLK (for example, eight blocks BLK) as one logical block. The logical block is also called a super block. The user data area UR may include eight or more blocks BLK to be managed as a plurality of logical blocks. When mentioning the eight blocks BLK in the user data area UR, these will be referred to as blocks BLK_H0 to BLK_H7 hereinafter. For example, if the memory cell transistor MC in the user data area UR is a QLC, the cell unit CU stores data corresponding to four page types PT. That is, the page type PT indicates page data in the cell unit CU. "L" of the page type PT shown in FIG. 6 indicates lower page data. "M" of the page type PT indicates middle page data. "U" of the page type PT indicates upper page data. "T" of the page type PT indicates top page data.

In the example shown in FIG. 6, lower page data, middle page data, upper page data, and top page data in the cell unit CU of the word line WL0 of the block BLK_H0 are the data D0, D1, D14, and D15, respectively. Lower page data, middle page data, upper page data, and top page data in the cell unit CU of the word line WL0 of the block BLK_H1 are the data D2, D3, D16, and D17, respectively. Lower page data, middle page data, upper page data, and top page data in the cell unit CU of the word line WL0 of the block BLK_H2 are the data D4, D5, D18, and D19, respectively. Lower page data, middle page data, upper page data, and top page data in the cell unit CU of the word line WL0 of the block BLK_H3 are the data D6, D7, D20, and D21, respectively. Lower page data, middle page data, upper page data, and top page data in the cell unit CU of the word line WL0 of the block BLK_H4 are the data D8, D9, D22, and D23, respectively. Lower page data, middle page data, upper page data, and top page data in the cell unit CU of the word line WL0 of the block BLK_H5 are the data D10, D11, D24, and D25, respectively. Lower page data, middle page data, upper page data, and top page data in the cell unit CU of the word line WL0 of the block BLK_H6 are the data D12, D13, D26, and D27, respectively. Lower page data, middle page data, upper page data, and top page data in the cell unit CU of the word line WL0 of the block BLK_H7 are the parity data PL0, PM0, PU0, and PT0, respectively.

The parity data PL0, PM0, PU0, and PT0 are used for correction processing of burst errors in the data of the corresponding page types PT in the cell unit CU of the word line WL0 of each of the eight blocks BLK, which are managed as, for example, one logical block. More specifically, the parity data PL0 is used for correction processing of burst errors in the data D0, D2, D4, D6, D8, D10, and D12. The parity data PL0 is generated by executing an exclusive OR operation (XOR operation) for the data D0, D2, D4, D6, D8, D10, and D12. For example, if the data D0 in the block BLK_H0 cannot be read out, the CPU 22 executes the XOR operation for the data D2, D4, D6, D8, D10, and D12 and the parity data PL0, thereby decoding the data D0. Similarly, the parity data PM0 is used for correction processing of burst errors in the data D1, D3, D5, D7, D9, D11, and D13. The parity data PU0 is used for correction processing of burst errors in the data D14, D16, D18, D20, D22, D24, and D26. The parity data PT0 is used for correction processing of burst errors in the data D15, D17, D19, D21, D23, D25, and D27.

The save area SR is an area where save data is stored. In the example shown in FIG. 6, the save area SR includes 15 blocks BLK. When mentioning the 15 blocks BLK in the save area SR, these will be referred to as blocks BLK_S0 to BLK_S14 hereinafter. For example, if the memory cell transistor MC in the save area SR is an SLC, the cell unit CU stores 1 page data. In the example shown in FIG. 6, the data D0 is stored in the cell unit CU of the word line WL0 of the block BLK_S0. Data Ps0 is stored in the cell unit CU of the word line WL0 of the block BLK_S1. For example, the data Ps0 indicates the parity data of the data D0. The parity data Ps0 is generated by, for example, executing the exclusive OR operation for the data D0 and dummy data of the page size. The dummy data is, for example, data in which all bits are data "0". In this case, the data D0 and the parity data Ps0 are identical.

1.4 Configuration of Buffer Memory

1.4.1 Configuration of Write Buffer

First, an example of the configuration of the write buffer 251 will be described with reference to FIG. 7. FIG. 7 is a view showing an example of the configuration of the write buffer 251.

As shown in FIG. 7, the write buffer 251 includes a plurality of buffers each capable of storing write data having the size of one page. The number of buffers included in the write buffer 251 is arbitrary. For example, the number of buffers included in the write buffer 251 is based on the number of bits of data that can be stored in the memory cell transistor MC. In the example shown in FIG. 7, the write buffer 251 includes four buffers (i.e., buffer 0 to buffer 3). In the example shown in FIG. 7, the data D0 is stored in buffer 0.

1.4.2 Configuration of Parity Buffer

Next, an example of the configuration of the parity buffer 252 will be described with reference to FIG. 8. FIG. 8 is a view showing an example of the configuration of the parity buffer 252.

As shown in FIG. 8, the parity buffer 252 includes a plurality of buffers each capable of storing parity data having the size of one page. For example, the number of buffers included in the parity buffer 252 is based on the page type PT of the cell unit CU in the user data area UR. In the example shown in FIG. 8, the parity buffer 252 includes four buffers corresponding to the four page types PT. In the example shown in FIG. 8, the parity data PL0 is stored in a buffer corresponding to lower page data ("L"). The parity data PM0 is stored in a buffer corresponding to middle page data ("M"). The parity data PU0 is stored in a buffer corresponding to upper page data ("U"). The parity data PU0 is stored in a buffer corresponding to top page data ("T").

The parity data stored in the parity buffer 252 are updated every time write data that is the target of correction processing of burst errors increases.

1.5 Configuration of Save Flag Table

Next, an example of the configuration of the save flag table 241 will be described with reference to FIG. 9. FIG. 9 is a view showing an example of the configuration of the save flag table 241.

As shown in FIG. 9, the save flag table 241 includes a plurality of entries configured to store the address information of write data saved to the save area SR. For example, to identify saved write data, as address information, a logical block number LBN, a word line number WL#, the page type PT, and a physical block number PBN are stored in each entry. The logical block number LBN is a number for identifying a logical block. The physical block number PBN is a number for identifying the block BLK in the memory chip 11.

In the example shown in FIG. 9, address information is stored in entry 1. For example, in entry 1, "0" is registered (stored) in the item of the logical block number LBN, "0" (WL0) is registered (stored) in the item of the word line number WL#, "L" (lower page) is registered (stored) in the item of the page type PT, and "H0" (block BLK_H0) is registered (stored) in the item of the physical block number PBN. That is, the example in FIG. 9 shows that data, which is to be stored (or already stored) as lower page data of WL0 of the block BLK_H0 that is included in a logical block whose logical block number LBN is "0", is saved to an area of the save area SR corresponding to entry 1.

1.6 Write Operation

The write operation will be described next. The write operation includes a program operation and a program verify operation. By repeating the combination of the program operation and the program verify operation (to be referred to as a "program cycle" hereinafter), the threshold voltage of each memory cell transistor MC is raised up to a target level.

The program operation is an operation of raising the threshold voltage by injecting electric charges into the charge accumulation layer (or maintaining the threshold voltage by inhibiting injection).

The program verify operation is an operation of, after the program operation, reading out data from the memory cell transistor MC and determining whether the threshold voltage of the memory cell transistor MC has reached the target level. For the memory cell transistor MC whose threshold voltage has reached the target level, write is inhibited in a program cycle after that.

In this embodiment, when writing data in the user data area UR, the write operation to one cell unit CU is divisionally executed twice. More specifically, a write operation of four page data corresponding to a QLC is divisionally executed twice as an operation of writing lower page data and middle page data (to be referred to as a "first write operation" hereinafter) and an operation of writing upper page data and top page data (to be referred to as a "second write operation" hereinafter). Note that the write operation to one cell unit CU may divisionally be executed three or more times.

Also, in this embodiment, when writing data in the save area SR, the write operation to one cell unit CU is executed only once. More specifically, a write operation of one page data corresponding to an SLC is executed.

1.6.1 First Write Operation

Figure 10:
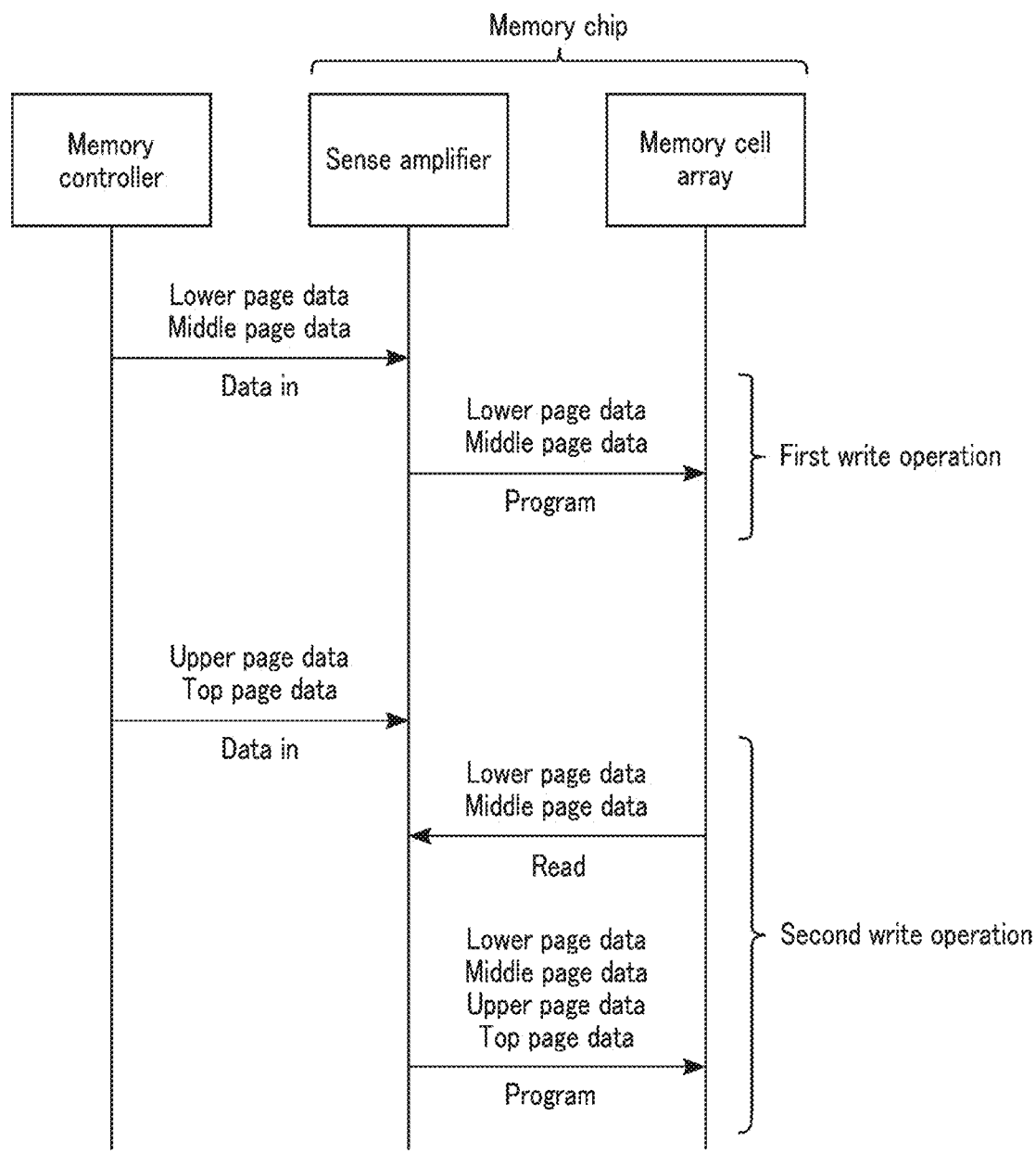
FIG. 10 is a sequence chart showing an example of a write operation in the memory system according to the first embodiment.
Figure 11:
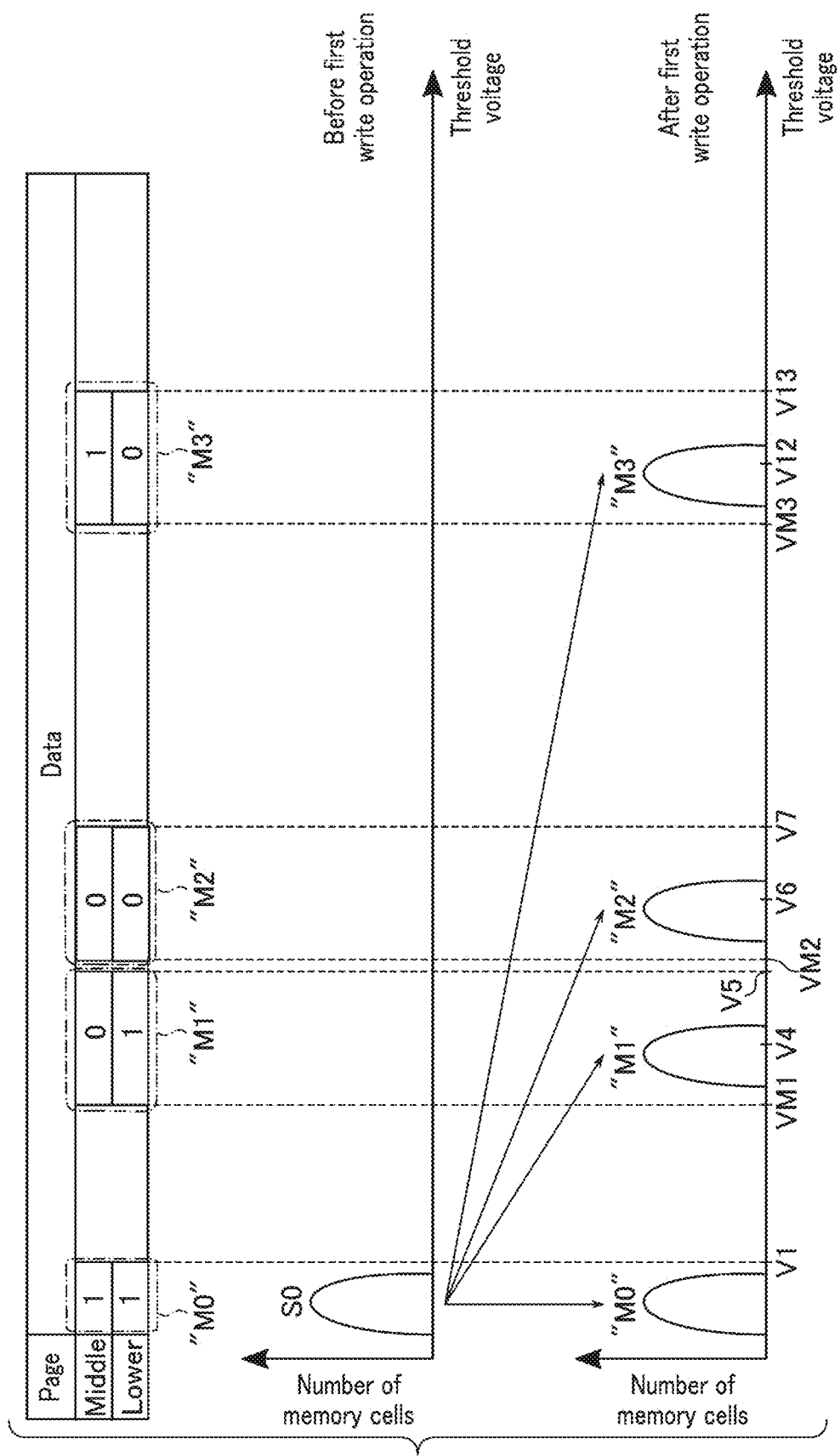
FIG. 11 is a view showing a change of the threshold voltage distributions of memory cell transistors by a first write operation in the memory system according to the first embodiment.

First, the first write operation will be described with reference to FIGS. 10 and 11. FIG. 10 is a sequence chart showing an example of the write operation. FIG. 11 is a view showing a change of the threshold voltage distribution of the memory cell transistors MC by the first write operation. Note that in FIGS. 10 and 11, the program verify operation is omitted.

As shown in FIG. 10, the memory controller 20 causes the sequencer 105 to execute the first write operation. First, the memory controller 20 transmits lower page data and middle page data stored in the write buffer 251 to the memory chip 11 (data in). The sequencer 105 causes the latch circuits of the sense amplifier 109 (and the data register 110) to temporarily store the lower page data and the middle page data.

Next, the sequencer 105 executes the first write operation. More specifically, the sequencer 105 writes lower page data and middle page data in the target cell unit CU of the memory cell array 107.

As shown in FIG. 11, by the first write operation, the threshold voltage of each memory cell transistor MC belongs to one of four threshold voltage distributions. The four threshold voltage distributions will be referred to as "M0 state", "M1 state", "M2 state", and "M3 state" hereinafter in ascending order of threshold voltages. Data of "lower bit/middle bit" are assigned to the memory cell transistors MC included in the states, as follows.

M0 state: "11" data
M1 state: "10" data
M2 state: "00" data
M3 state: "01" data

The M0 state includes the memory cell transistors MC that are to transition to the S0 state, the S1 state, the S2 state, and the S3 state by the second write operation to be described later. The M1 state includes the memory cell transistors MC that are to transition to the S4 state, the S5 state, the S8 state, and the S9 state by the second write operation. The M2 state includes the memory cell transistors MC that are to transition to the S6 state, the S7 state, the S10 state, and the S11 state by the second write operation. The M3 state includes the memory cell transistors MC that are to transition to the S12 state, the S13 state, the S14 state, and the S15 state by the second write operation.

The sequencer 105 uses voltages VM1, VM2, and VM3 as verify voltages in the first write operation. The voltage VM1 is a verify voltage used to write the M1 state ("10" data). The voltage VM1 is the voltage V1 or higher, and lower than the voltage V4. The voltage VM2 is a verify voltage used to write the M2 state ("00" data). The voltage VM2 is the voltage V4 or higher, and lower than the voltage V6. The voltage VM3 is a verify voltage used to write the M3 state ("01" data). The voltage VM3 is the voltage V6 or higher, and lower than the voltage V12.

The threshold voltage of the memory cell transistors MC included in the M0 state is lower than the voltage V1. The threshold voltage of the memory cell transistors MC included in the M1 state is the voltage VM1 or higher, and lower than the voltage V5. The threshold voltage of the memory cell transistors MC included in the M2 state is the voltage VM2 or higher, and lower than the voltage V7. The threshold voltage of the memory cell transistors MC included in the M3 state is the voltage VM3 or higher, and lower than the voltage V13.

The state of the cell unit CU for which the first write operation has been executed but the second write operation has not been executed will be referred to as an "MLC state" or a "halfway stage of write operations" hereinafter. If lower page data and middle page data are written in the cell unit CU, but upper page data and top page data are not written, the lower page data and the middle page data will also collectively be referred to as "data of the MLC state" or "data at the halfway state of write operations".

1.6.2 Second Write Operation

Figure 12:
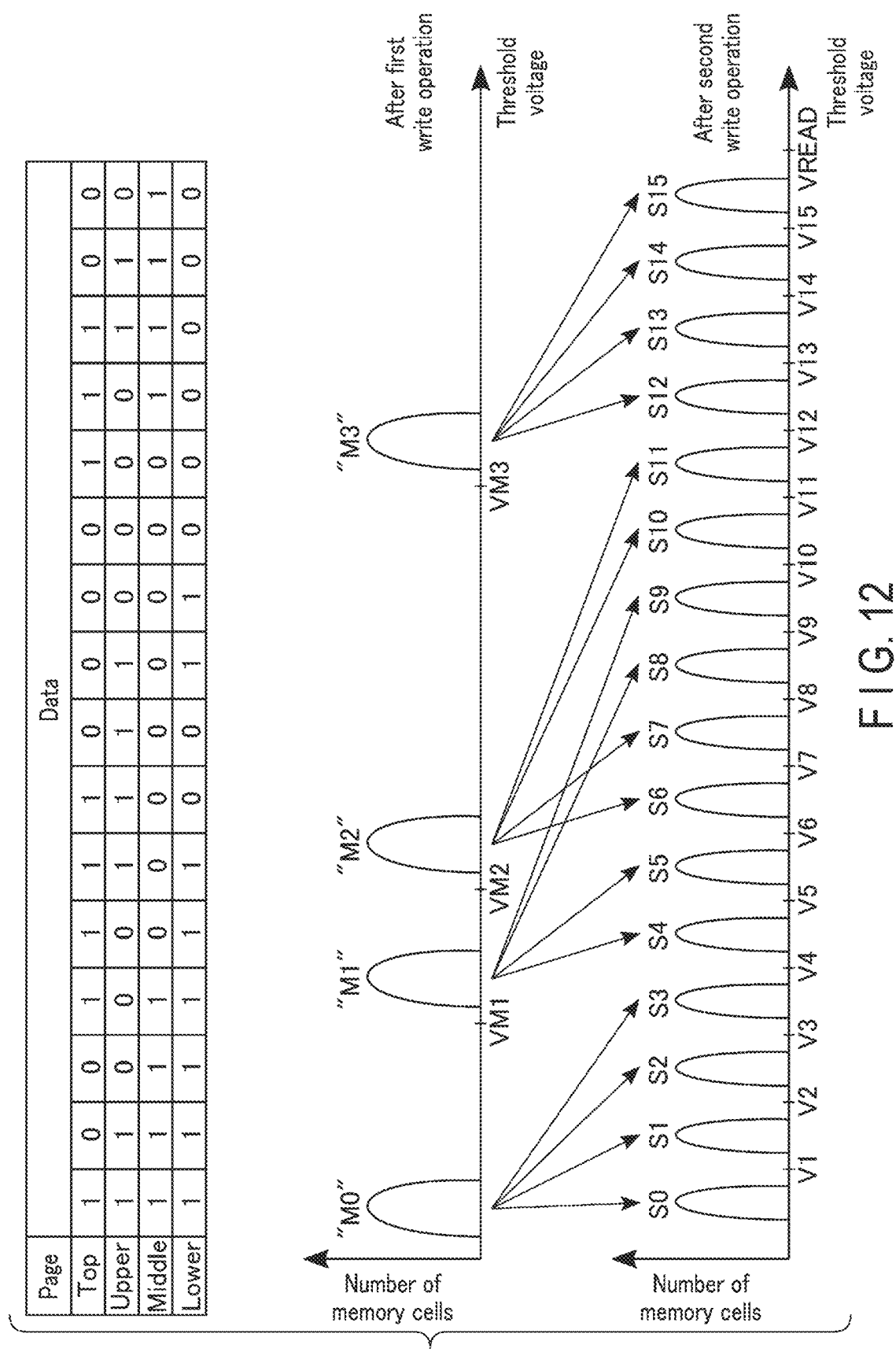
FIG. 12 is a view showing a change of the threshold voltage distributions of memory cell transistors by a second write operation in the memory system according to the first embodiment.

Next, the second write operation will be described with reference to FIGS. 10 and 12. FIG. 12 is a view showing a change of the threshold voltage distribution of the memory cell transistors MC by the second write operation.

As shown in FIG. 10, the memory controller 20 causes the sequencer 105 to execute the second write operation. First, the memory controller 20 transmits upper page data and top page data stored in the write buffer 251 to the memory chip 11 (data in). The sequencer 105 causes the latch circuits of the sense amplifier 109 (and the data register 110) to temporarily store the upper page data and the top page data.

Next, the sequencer 105 executes the second write operation. More specifically, first, the sequencer 105 reads out the lower page data and the middle page data from the corresponding cell unit CU of the memory cell array 107, and causes the latch circuits of the sense amplifier 109 (and the data register 110) to temporarily store these. Next, the sequencer 105 executes the write operation of the upper page data and the top page data in the target cell unit CU based on the lower page data, the middle page data, the upper page data, and the top page data stored in the latch circuits of the sense amplifier 109 (and the data register 110). Note that the sequencer 105 may transmit the lower page data and the middle page data to the memory controller 20. In this case, the memory controller 20 executes ECC processing of the lower page data and the middle page data in the ECC circuit 26. The memory controller 20 may transmit the corrected lower page data and middle page data to the memory chip 11.

As shown in FIG. 12, 16 threshold voltage distributions are formed by the second write operation. For example, by the second write operation, each memory cell transistor MC belonging to the threshold voltage distribution of the M0 state becomes to belong to one of the threshold voltage distributions of the S0 to S3 states. Each memory cell transistor MC belonging to the threshold voltage distribution of the M1 state becomes to belong to one of the threshold voltage distributions of the S4, S5, S8, and S9 states. Each memory cell transistor MC belonging to the threshold voltage distribution of the M2 state becomes to belong to one of the threshold voltage distributions of the S6, S7, S10, and S11 states. Each memory cell transistor MC belonging to the threshold voltage distribution of the M3 state becomes to belong to one of the threshold voltage distributions of the S12 to S15 states.

1.6.3 Execution Order of Write Operations

Next, an order of executing the first write operation and the second write operation will be described with reference to FIGS. 13 and 14. FIG. 13 is a view showing an example of the order of executing the first write operation and the second write operation in the plurality of blocks BLK of the user data area UR. FIG. 14 is a view showing an example of the order of executing the first write operation and the second write operation in a case where data are continuously written in one block BLK. To simplify the explanation, the example in FIG. 13 shows a case where each block BLK includes one string unit SU. Also, in the example shown in FIG. 13, a rectangular frame of a solid line corresponding to an intersection between each word line WL and each block BLK indicates one cell unit CU. Similarly, in the example shown in FIG. 14, a rectangular frame of a solid line corresponding to an intersection between each word line WL and each string unit SU indicates one cell unit CU. The upper part divided by a broken line in each rectangular frame of a solid line in FIGS. 13 and 14 indicates the first write operation (WRT1). The lower part divided by the broken line in each rectangular frame of the solid line indicates the second write operation (WRT2). That is, numerical values in the upper and lower parts in each rectangular frame of the solid line represent the order of write operations.

The order of write operations when writing data in the plurality of blocks BLK will be described first.

As shown in FIG. 13, first, the sequencer 105 selects the word line WL0 of each block BLK, and sequentially executes the first write operation. More specifically, as the first to eighth operations, the sequencer 105 sequentially selects the cell units CU of the blocks BLK_H0 to BLK_H7 corresponding to the word line WL0, and executes the first write operation to each of these cell units CU.

Next, the sequencer 105 selects the word line WL1 of each block BLK, and sequentially executes the first write operation. More specifically, as the 9th to 16th operations, the sequencer 105 sequentially selects the cell units CU of the blocks BLK_H0 to BLK_H7 corresponding to the word line WL1, and executes the first write operation to each of these cell units CU.

Next, the sequencer 105 selects the word line WL0 of each block BLK, and sequentially executes the second write operation. More specifically, as the 17th to 24th operations, the sequencer 105 sequentially selects the cell units CU of the blocks BLK_H0 to BLK_H7 corresponding to the word line WL0, and executes the second write operation to each of these cell units CU.

Next, the sequencer 105 selects the word line WL2 of each block BLK, and sequentially executes the first write operation. More specifically, as the 25th to 32nd operations, the sequencer 105 sequentially selects the cell units CU of the blocks BLK_H0 to BLK_H7 corresponding to the word line WL2, and executes the first write operation to each of these cell units CU.

Next, the sequencer 105 selects the word line WL1 of each block BLK, and sequentially executes the second write operation. More specifically, as the 33rd to 40th operations, the sequencer 105 sequentially selects the cell units CU of the blocks BLK_H0 to BLK_H7 corresponding to the word line WL1, and executes the second write operation to each of these cell units CU.

In this way, the sequencer 105 executes the first write operation to the cell units CU corresponding to the word line WL of a word line number WL#, and then executes the first write operation to the cell units CU corresponding to the word line WL of the next word line number WL#. After the first write operation to the cell units CU corresponding to the of the next word line number WL# is completed, the sequencer 105 executes the second write operation to the cell units CU corresponding to the preceding word line number WL#. For the word line WL2 and beyond, the sequencer 105 selects the cell units CU of the blocks BLK in a similar order.

The order of write operations when continuously writing data in one block BLK will be described next.

As shown in FIG. 14, first, as the first to fifth operations, the sequencer 105 sequentially selects the string units SU0 to SU4 while selecting the word line WL0, and executes the first write operation to each cell unit CU.

Next, as the sixth operation, the sequencer 105 executes the first write operation while selecting the string unit SU0 and the word line WL1.

Next, as the seventh operation, the sequencer 105 executes the second write operation while selecting the string unit SU0 and the word line WL0.

Next, as the 8th to 15th operations, the sequencer 105 sequentially selects the string units SU1 to SU4 and, in accordance with the same procedure as the 6th and 7th operations, alternately executes the first write operation while selecting the word line WL1 and the second write operation while selecting the word line WL0.

Next, as the 16th to 25th operations, like the 6th to 15th operation, the sequencer 105 sequentially selects the string units SU0 to SU4 and alternately executes the first write operation while selecting the word line WL2 and the second write operation while selecting the word line WL1.

Next, as the 26th to 35th operations, like the 6th to 15th operation, the sequencer 105 sequentially selects the string units SU0 to SU4 and alternately executes the first write operation while selecting the word line WL3 and the second write operation while selecting the word line WL2. For the word line WL3 and beyond, the sequencer 105 alternately executes the first write operation and the second write operation in a similar order.

1.7 Save Operation

The save operation will be described next. In this embodiment, a case will be described where identical write data is not saved (written) redundantly in the save area SR, and identical parity data is not saved (written) redundantly in the save area SR, either. The case where identical data is not redundantly saved will be referred to as "redundancy elimination" hereinafter. That is, in the save operation according to the first embodiment, redundancy of identical write data and identical parity data is eliminated.

1.7.1 Procedure of Save Operation

First, an example of the procedure of the save operation will be described with reference to FIG. 15. FIG. 15 is a flowchart showing an example of the procedure of the save operation.

As shown in FIG. 15, upon receiving a flush command from the host 2 (step S100), the CPU 22 starts the save operation.

First, in step S101, the CPU 22 executes save processing of write data (user data and the error correction code of the user data). More specifically, the CPU 22 sequentially executes save processing (write operation) of saving data of the MLC state from the user data area UR to the save area SR, and save processing (write operation) of saving write data from the write buffer 251 to the save area SR.

Next, the CPU 22 executes save processing of parity data (step S102). More specifically, the CPU 22 executes save processing (write operation) of saving parity data from the parity buffer 252 to the save area SR.

If the save processing of the data to the save area SR is completed, the CPU 22 transmits, to the host 2, a completion response to the flush command (step S103).

1.7.2 Procedure of Save Processing of Write Data

Figure 16:
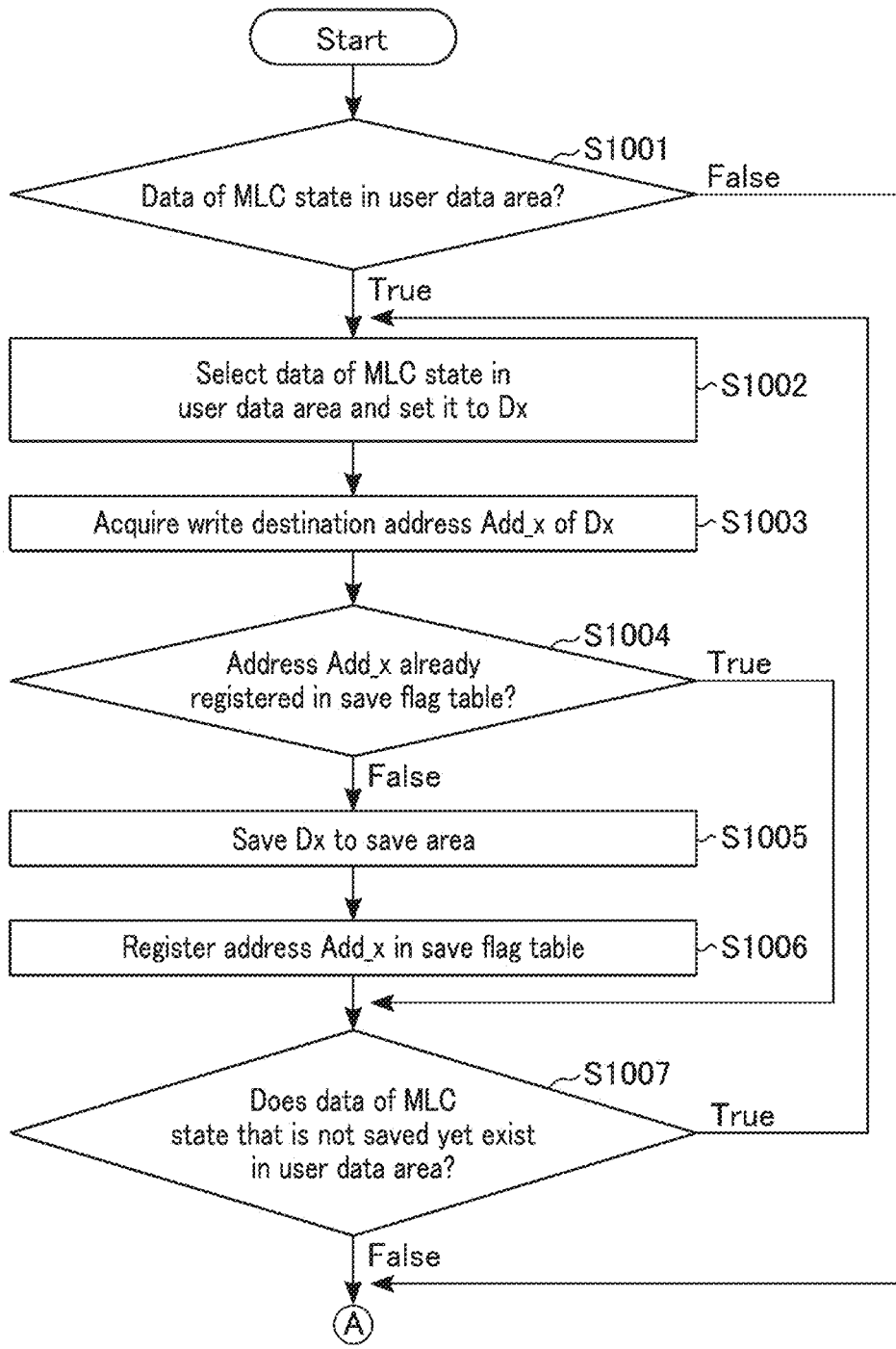
FIG. 16 is a flowchart showing an example of save processing of write data in the memory system according to the first embodiment.

Next, an example of the procedure of save processing of write data will be described with reference to FIGS. 16 and 17. FIGS. 16 and 17 are flowcharts showing an example of save processing of write data.

As shown in FIG. 16, first, the CPU 22 executes the processes of steps S1001 to S1007 to be described later, thereby executing save processing of write data (user data and the error correction code of the user data) from the user data area UR.

The CPU 22 confirms whether data of the MLC state exists in the user data area UR (step S1001). That is, the CPU 22 confirms whether the cell unit CU in which lower page data and middle page data are written but upper page data and top page data are not written exists in the user data area UR.

If data of the MLC state does not exist (False in step S1001), write data of a save target does not exist in the user data area UR, and therefore, the CPU 22 omits the save processing of data from the user data area UR, and advances to the process of step S1008.

If data of the MLC state exists in the user data area UR (True in step S1001), in step S1002, the CPU 22 selects data of one page from the data of the MLC state in the user data area UR, and sets the data to data Dx (x is an integer of 0 or larger). More specifically, for example, the CPU 22 selects lower page data stored in the cell unit CU that stores the data of the MLC state and sets it to the data Dx.

The CPU 22 acquires a write destination address Add_x of the data Dx (step S1003). More specifically, the CPU 22 acquires the address information of the cell unit CU in the user data area UR in which the data Dx is written.

The CPU 22 confirms whether the address Add_x is already registered in the save flag table 241 (step S1004).

If the address Add_x is already registered (True in step S1004), the CPU 22 advances to the process of step S1007 without saving the data Dx.

If the address Add_x is not already registered (False in step S1004), the CPU 22 reads out the data of the MLC state from the user data area UR and saves the data Dx in the readout data of the MLC state to the save area SR (step S1005). For example, the sequencer 105 executes the write operation of the data Dx to the save area SR.

When the save of the data Dx is ended, the CPU 22 registers the address Add_x of the data Dx in the save flag table 241 (step S1006).

If the address Add_x is already registered (True in step S1004), or after the address Add_x is registered (step S1006), the CPU 22 confirms whether data of the MLC state that is not saved yet (i.e., not selected yet as the save target) exists in the user data area UR (step S1007).

If data of the MLC state that is not selected yet as the save target exists (True in step S1007), the CPU 22 increments the variable x (x=x+1) and then sets the data to the data Dx (step S1002). More specifically, for example, the CPU 22 selects middle page data from the data of the MLC state in the user data area UR and sets it to the data Dx.

If data of the MLC state that is not selected yet as the save target does not exist (False in step S1007), as shown in FIG. 17, the CPU 22 executes the processes of steps S1008 to S1014 to be described later, thereby executing the save processing of write data from the write buffer 251.

First, the CPU 22 confirms whether unwritten data exists in the write buffer 251 (step S1008). That is, the CPU 22 confirms whether write data that is unwritten to the user data area UR exists in the write buffer 251. In other words, the CPU 22 confirms whether write data that is not yet nonvolatilized exists in the write buffer 251.

If unwritten data does not exist in the write buffer 251 (False in step S1008), data of the save target does not exist in the write buffer 251, and therefore, the CPU 22 omits save processing of write data from the write buffer 251, and advances to the process of step S1015.

If unwritten data exists in the write buffer 251 (True in step $1008), in step S1009, the CPU 22 selects data of one page from the unwritten data, and sets the data to data Dy (y is an integer of 0 or larger).

The CPU 22 acquires a scheduled write destination address Add_y of the data Dy (step S1010). More specifically, the CPU 22 acquires the address information of the cell unit CU in the user data area UR, which is scheduled as the write destination of the data Dy.

The CPU 22 confirms whether the address Add_y is already registered in the save flag table 241 (step S1011).

If the address Add_y is already registered (True in step S1011), the CPU 22 advances to the process of step S1014 without saving the data Dy.

If the address Add_y is not already registered (False in step S1011), the CPU 22 saves the data Dy to the save area SR (step S1012). For example, the sequencer 105 executes the write operation of the data Dy to the save area SR.

When the save of the data Dy is ended, the CPU 22 registers the address Add_y of the data Dy in the save flag table 241 (step S1013).

If the address Add_y is already registered (True in step S1011), or after the address Add_y is registered (step S1013), the CPU 22 confirms whether unwritten data that is not saved yet (not selected yet as the save target) exists in the write buffer 251 (step S1014).

If unwritten data that is not selected yet as the save target exists (True in step S1014), the CPU 22 increments the variable y and then sets the data to the data Dy (step S1009).

If unwritten data that is not selected yet as the save target does not exist (False in step S1014), the CPU 22 controls the ECC circuit 26 to generate parity data of the data Dx and Dy saved to the save area SR (step S1015). More specifically, for example, based on the control of the CPU 22, the ECC circuit 26 executes an exclusive OR operation (XOR operation) for the saved data Dx and Dy, thereby generating the parity data. Note that if data of only one page is saved, the ECC circuit 26 executes the XOR operation for the saved data and dummy data, thereby generating the parity data.

The CPU 22 writes the parity data of the data Dx and Dy to the save area SR (step S1016). For example, the sequencer 105 executes the write operation of the parity data of the data Dx and Dy to the save area SR.

After the end of the process of step S1016, the CPU 22 ends the save processing of write data.

1.7.3 Procedure of Save Processing of Parity Data

Figure 18:
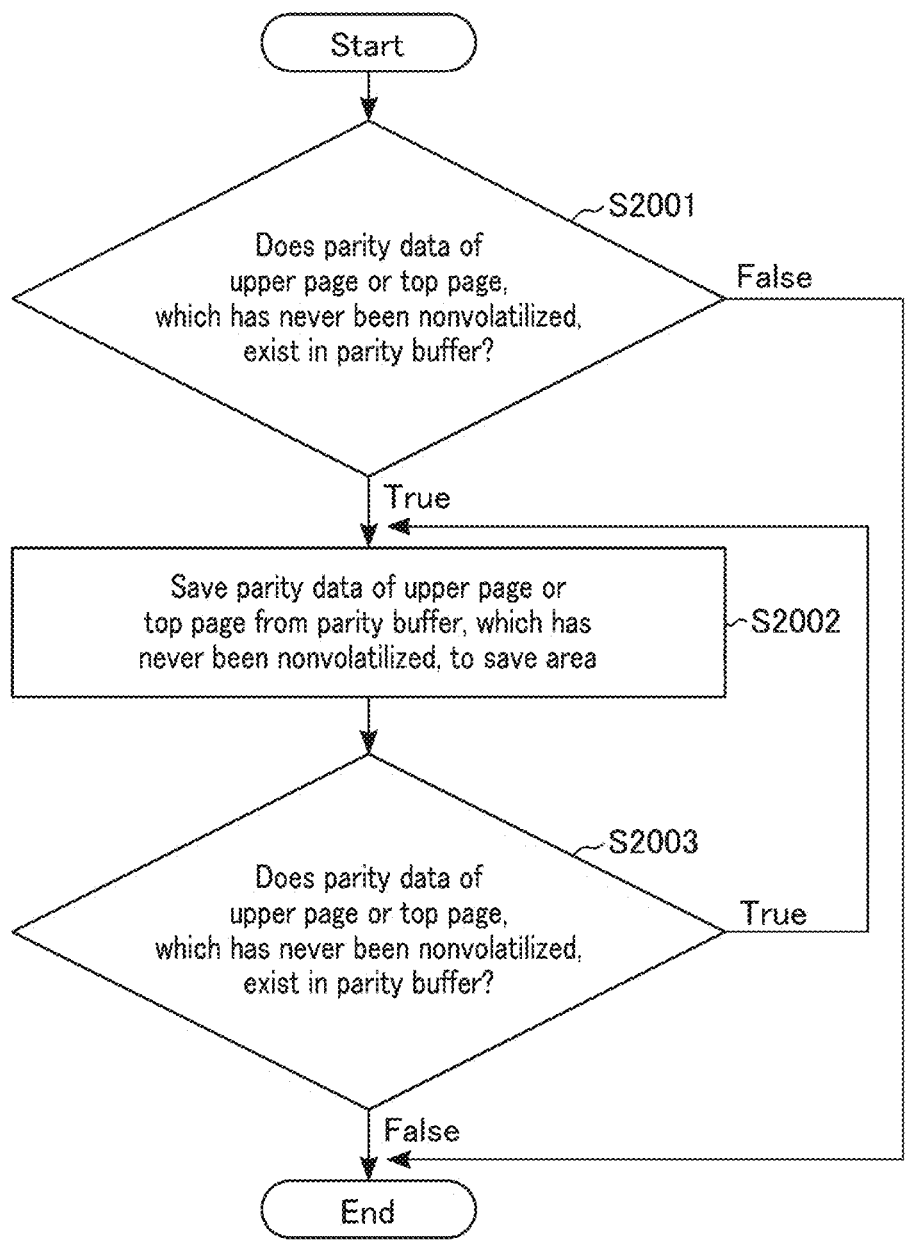
FIG. 18 is a flowchart showing an example of save processing of parity data in the memory system according to the first embodiment.

Next, an example of the procedure of save processing of parity data will be described with reference to FIG. 18. FIG. 18 is a flowchart showing an example of save processing of parity data.

As shown in FIG. 18, the CPU 22 confirms whether parity data of an upper page or a top page, which has never been nonvolatilized, exists in the parity buffer 252 (step S2001). More specifically, for example, in save processing of parity data according to this embodiment, the parity data PL0 and PM0 are not included in the save target. The CPU 22 confirms whether the parity data PU0 and PT0 are not stored in the user data area UR or the save area SR.

If parity data of an upper page or a top page, which has never been nonvolatilized, does not exist (False in step S2001), parity data of a save target does not exist in the parity buffer 252, and therefore, the CPU 22 ends the save processing of parity data.

If parity data of an upper page or a top page, which has never been nonvolatilized, exists (True in step S2001), the CPU 22 selects one parity data of a target and saves it to the save area SR (step S2002).

The CPU 22 confirms whether parity data of an upper page or a top page, which has not been selected yet as the save target and has never been nonvolatilized, exists (step S2003).

If parity data of an upper page or a top page, which has not been selected yet as the save target and has never been nonvolatilized, exists (True in step S2003), the CPU 22 selects parity data of a next target and saves it to the save area SR (step S2002).

If parity data of an upper page or a top page, which has not been selected yet as the save target and has never been nonvolatilized, does not exist (False in step S2003), the CPU 22 ends the save processing of parity data.

1.7.4 Detailed Examples of Save Operation

Three detailed examples of the save operation will be described next.

1.7.4.1 First Detailed Example

Figure 19:
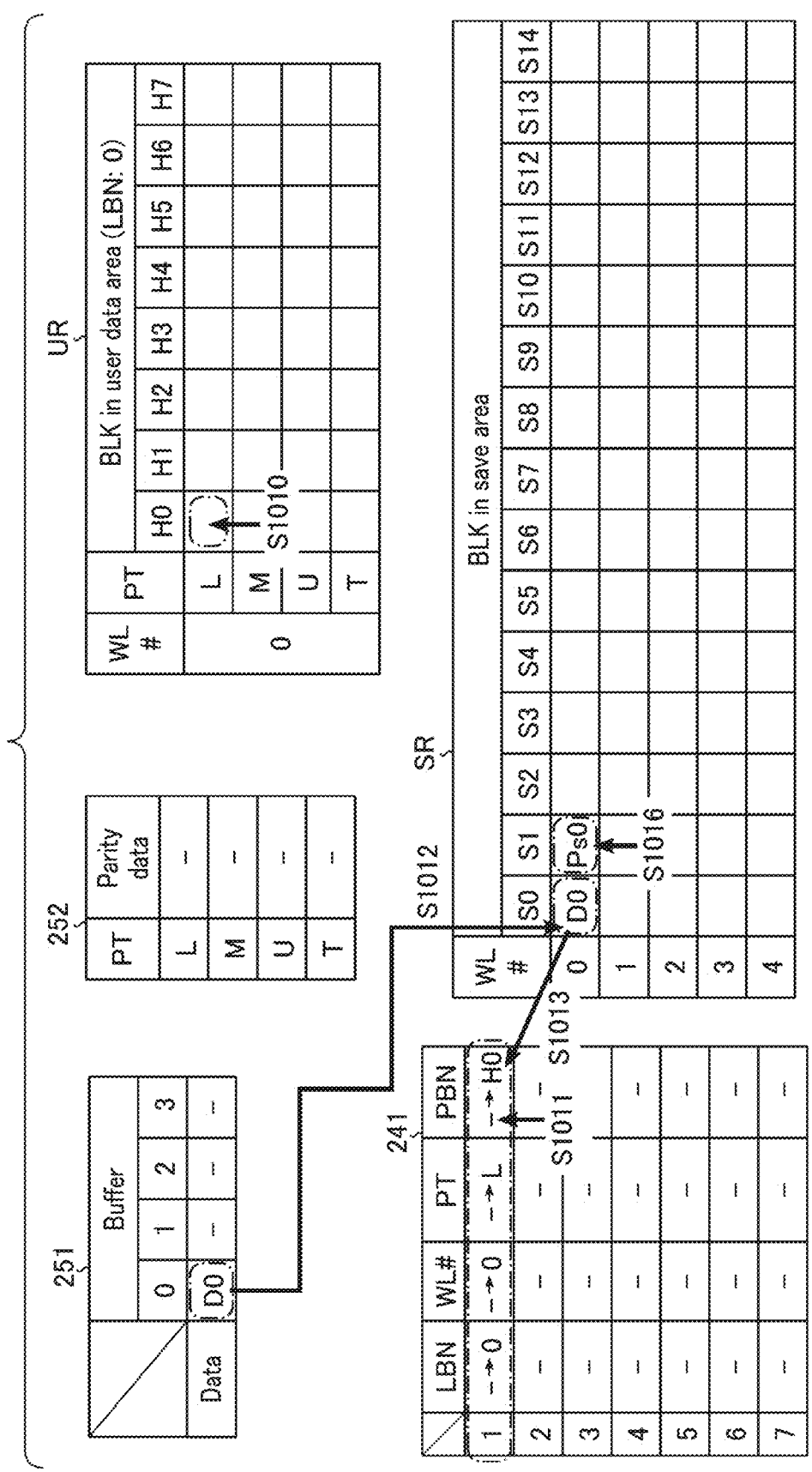
FIG. 19 is a view showing a first detailed example of the save operation in the memory system according to the first embodiment.

First, a first detailed example of the first embodiment will be described with reference to FIG. 19. In the first detailed example of the first embodiment, a case where the CPU 22 receives a flush command from the host 2 in a state in which no data is stored in the user data area UR will be described. In other words, a case where the CPU 22 receives a flush command from the host 2 before the first write operation is executed for the first time will be described. FIG. 19 is a view showing changes in the write buffer 251, the parity buffer 252, the save flag table 241, the user data area UR, and the save area SR caused by the save operation in the first detailed example of the first embodiment.

As shown in FIG. 19, when the CPU 22 receives a flush command from the host 2, no data is stored in the user data area UR. That is, no data of the MLC state exists in the user data area UR (False in step S1001 in FIG. 16). In this case, save processing of write data from the user data area UR is omitted.

Since unwritten write data exists in the write buffer 251 (True in step S1008 in FIG. 17), the CPU 22 executes save processing of the write data from the write buffer 251. For example, the CPU 22 sets data in buffer 0 of the write buffer 251 to the data D0 (step S1009 in FIG. 17). As a scheduled write destination address Add_0 of the data D0, in step S1010, the CPU 22 acquires address information including the logical block number LBN "0", the block BLK_H0, the word line WL0, and the page type L (lower page). Since the address Add_0 is not registered in the save flag table 241 (False in step S1011 in FIG. 17), the CPU 22 saves the data D0 to the save area SR (step S1012). More specifically, the sequencer 105 selects the word line WL0 of the block BLK_S0 in the save area SR and executes the write operation of the data D0. The CPU 22 registers the address Add_0 of the data D0 in entry 1 of the save flag table 241 (step S1013). More specifically, in entry 1 of the save flag table 241, "0" is registered in the item of the logical block number LBN, "0" is registered in the item of the word line number WL#, "L" is registered in the item of the page type PT, and "H0" is registered in the item of the physical block number PBN. Note that, for example, in the save flag table 241 shown in FIG. 19, an expression "-→0" of the logical block number LBN in entry 1 indicates that the logical block number LBN has transitioned from an unregistered state "-" to a state in which "0" is registered. This also applies to the remaining items.

Next, the CPU 22 controls the ECC circuit 26 to generate the parity data Ps0 of the data D0 saved to the save area SR (step S1015 in FIG. 17). Then, the CPU 22 writes the parity data Ps0 to the save area SR (step S1016). More specifically, the sequencer 105 selects the word line WL0 of the block BLK_S1 in the save area SR and executes the write operation of the parity data Ps0.

In the example shown in FIG. 19, no parity data is stored in the parity buffer 252 (False in step S2001 in FIG. 18). In this case, save processing of parity data from the parity buffer 252 is omitted.

After the end of the save operation, the CPU 22 transmits, to the host 2, a completion response to the flush command.

As shown in the first detailed example of the first embodiment, the CPU 22 can save data (write data) from the write buffer 251 to the save area SR. Also, the CPU 22 can generate parity data based on the write data saved to the save area SR and write it to the save area SR. The CPU 22 can protect the saved write data by generating the parity data based on the saved write data.

At this time, the information of the saved write data is registered in the save flag table 241. Hence, the CPU 22 can appropriately manage the state of the saved write data.

1.7.4.2 Second Detailed Example

Next, a second detailed example of the first embodiment will be described with reference to FIG. 20. In the second detailed example of the first embodiment, a case where the CPU 22 receives a flush command from the host 2 in a state in which data of the MLC state is stored in the user data area UR will be described. In other words, a case where the CPU 22 receives a flush command from the host 2 after the first write operation is executed and before the next first write operation is executed will be described. FIG. 20 is a view showing changes in the write buffer 251, the parity buffer 252, the save flag table 241, the user data area UR, and the save area SR caused by the save operation in the second detailed example of the first embodiment. Note that the example in FIG. 20 shows a case where data write is continued after the data write situation explained with reference to FIG. 19.

As shown in FIG. 20, when the CPU 22 receives a flush command from the host 2, data of the MLC state is stored in the user data area UR (True in step S1001 in FIG. 16). In the example shown in FIG. 20, lower page data and middle page data are stored in the cell unit CU of the block BLK_H0 corresponding to the word line WL0 in a logical block identified by the logical block number LBN "0" in the user data area UR. In addition, the parity data PL0 and PM0 corresponding to the lower page data and the middle page data, respectively, are stored in the parity buffer 252. A bit in the parity data PM0 is an example of a first error correction code. For example, as described in the first detailed example of the first embodiment, the lower page data D0 is already saved to the save area SR. That is, the address Add_0 of the data D0 is already registered in the save flag table 241 (True in step S1004 in FIG. 16). For this reason, save processing of the data D0 is not executed.

Next, the CPU 22 sets the middle page data in the data of the MLC state in the user data area UR to the data D1 (step S1002 in FIG. 16). As a write destination address Add_1 of the data D1, in step S1003 in FIG. 16, the CPU 22 acquires address information including the logical block number LBN "0", the block BLK_H0, the word line WL0, and the page type M (middle page). A memory cell transistor MC at the write destination specified by the address Add_1 and a bit in the data D1 written in the memory cell transistor MC are examples of a first memory cell and first bit data, respectively. Since the address Add_1 is not registered in the save flag table 241 (False in step S1004 in FIG. 16), the CPU 22 saves the data D1 to the save area SR (step S1005). More specifically, the sequencer 105 selects the word line WL0 of the block BLK_S2 in the save area SR and executes the write operation of the data D1. A memory cell transistor MC in the block BLK_S2 coupled with the word line WL0 is an example of a second memory cell. The CPU 22 registers the address Add_1 of the data D1 in entry 2 of the save flag table 241 (step S1006). More specifically, in entry 2 of the save flag table 241, "0" is registered in the item of the logical block number LBN, "0" is registered in the item of the word line number WL#, "M" is registered in the item of the page type PT, and "H0" is registered in the item of the physical block number PBN.

Next, since unwritten write data exists in the write buffer 251 (True in step S1008 in FIG. 17), the CPU 22 executes save processing of the data from the write buffer 251. For example, the CPU 22 sets data in buffer 0 of the write buffer 251 to the data D2 (step S1009 in FIG. 17). A bit in the data D2 is an example of first write data. As a scheduled write destination address Add_2 of the data D2, in step S1010, the CPU 22 acquires address information including the logical block number LBN "0", the block BLK_H1, the word line WL0, and the page type L (lower page). Since the address Add_2 is not registered in the save flag table 241 (False in step S1011 in FIG. 17), the CPU 22 saves the data D2 to the save area SR (step S1012). More specifically, the sequencer 105 selects the word line WL0 of the block BLK_S3 in the save area SR and executes the write operation of the data D2. A memory cell transistor MC in the block BLK_S3 coupled with the word line WL0 is an example of a third memory cell. The CPU 22 registers the address Add_2 of the data D2 in entry 3 of the save flag table 241 (step S1013). More specifically, in entry 3 of the save flag table 241, "0" is registered in the item of the logical block number LBN, "0" is registered in the item of the word line number WL#, "L" is registered in the item of the page type PT, and "H1" is registered in the item of the physical block number PBN.

Next, the CPU 22 controls the ECC circuit 26 to generate parity data Ps1 of the data D1 and D2 saved to the save area SR (step S1015 in FIG. 17). A bit in the parity data Ps1 is an example of a second error correction code. Then, the CPU 22 writes the parity data Ps1 to the save area SR (step S1016). More specifically, the sequencer 105 selects the word line WL0 of the block BLK_S4 in the save area SR and executes the write operation of the parity data Ps1. A memory cell transistor MC in the block BLK_S4 coupled with the word line WL0 is an example of a fourth memory cell.

The parity data PL0 and PM0 in the parity buffer 252 are not save targets (False in step S2001). Hence, save processing of the parity data from the parity buffer 252 is omitted. The data D1 and D2 saved to the save area SR are protected by the parity data Ps1. Hence, the CPU 22 can restore data from burst errors even if save of the parity data PL0 and PM0 in the parity buffer 252 is omitted.

After the end of the save operation, the CPU 22 transmits, to the host 2, a completion response to the flush command.

As shown in the second detailed example of the first embodiment, the CPU 22 can save data to the save area SR while eliminating redundancy of data of the MLC state in the user data area UR. Also, the CPU 22 can generate parity data based on the write data saved to the save area SR and write it to the save area SR. Even if the parity data PL0 and PM0 stored in the parity buffer 252 are not saved, the CPU 22 can protect the saved write data by generating the parity data based on the saved write data.

1.7.4.3 Third Detailed Example

Figure 21:
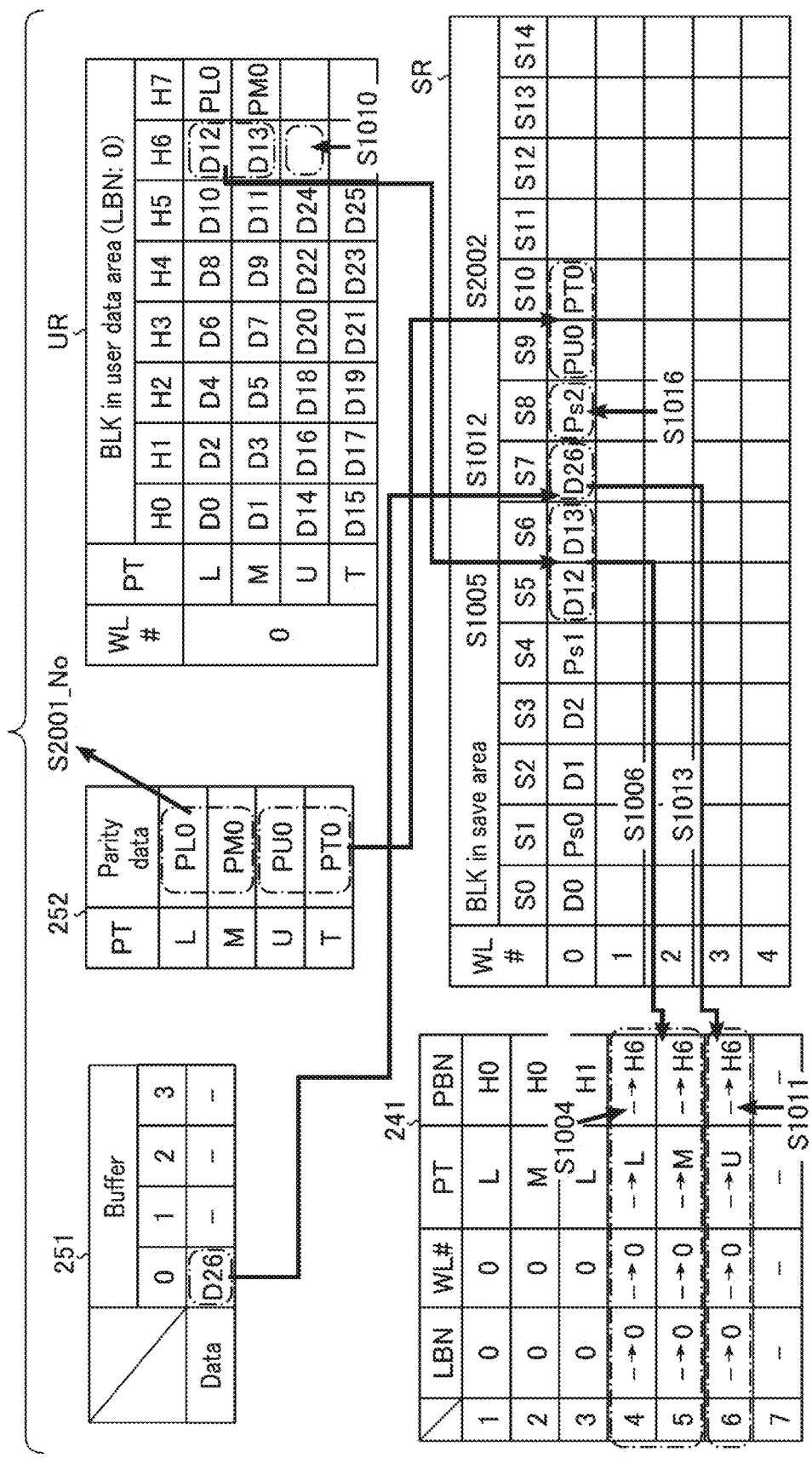
FIG. 21 is a view showing a third detailed example of the save operation in the memory system according to the first embodiment.

Next, a third detailed example of the first embodiment will be described with reference to FIG. 21. In the third detailed example of the first embodiment, a case where the CPU 22 receives a flush command from the host 2 in a state in which upper page data and top page data are stored in some blocks BLK in the user data area UR will be described. In other words, a case where the CPU 22 receives a flush command from the host 2 after the second write operation is executed and before the next second write operation is executed will be described. FIG. 21 is a view showing changes in the write buffer 251, the parity buffer 252, the save flag table 241, the user data area UR, and the save area SR caused by the save operation in the third detailed example of the first embodiment. Note that the example in FIG. 21 shows a case where data write is continued after the data write situation explained with reference to FIG. 20.

As shown in FIG. 21, when the CPU 22 receives a flush command from the host 2, data of the MLC state is stored in the user data area UR (True in step S1001 in FIG. 16). More specifically, the second write operation is completed for the cell units CU of the blocks BLK_H0 to BLK_H5 corresponding to the word line WL0 in a logical block identified by the logical block number LBN "0" in the user data area UR. The data D12 and D13 of the MLC state are stored in the cell unit CU of the block BLK_H6 corresponding to the word line WL0. The parity data PL0 and PM0 are stored in the cell unit CU of the block BLK_H7 corresponding to the word line WL0. A bit in the parity data PM0 is an example of a third error correction code. The parity data PL0 and PM0 are data of the MLC state. The parity data PU0 and PT0 corresponding to upper page data and top page data, respectively, are stored in the parity buffer 252.

The CPU 22 selects, for example, the data D12 in the data of the MLC state in the user data area UR (step S1002 in FIG. 16). As a write destination address Add_12 of the data D12, in step S1003 in FIG. 16, the CPU 22 acquires address information including the logical block number LBN "0", the block BLK_H6, the word line WL0, and the page type L (lower page). Since the address Add_12 is not registered in the save flag table 241 (False in step S1004 in FIG. 16), the CPU 22 saves the data D12 to the save area SR (step S1005). More specifically, the sequencer 105 selects the word line WL0 of the block BLK_S5 in the save area SR and executes the write operation of the data D12. The CPU 22 registers the address Add_12 of the data D12 in entry 4 of the save flag table 241 (step S1006). More specifically, in entry 4 of the save flag table 241, "0" is registered in the item of the logical block number LBN, "0" is registered in the item of the word line number WL#, "L" is registered in the item of the page type PT, and "H6" is registered in the item of the physical block number PBN.

Next, the CPU 22 selects, for example, the data D13 in the data of the MLC state in the user data area UR (step S1002 in FIG. 16). As a write destination address Add_13 of the data D13, in step S1003 in FIG. 16, the CPU 22 acquires address information including the logical block number LBN "0", the block BLK_H6, the word line WL0, and the page type M (middle page). A memory cell transistor MC at the write destination specified by the address Add_13 and a bit in the data D13 written in the memory cell transistor MC are examples of a fifth memory cell and second bit data, respectively. Since the address Add_13 is not registered in the save flag table 241 (False in step S1004), the CPU 22 saves the data D13 to the save area SR (step S1005). More specifically, the sequencer 105 selects the word line WL0 of the block BLK_S6 in the save area SR and executes the write operation of the data D13. The CPU 22 registers the address Add_13 of the data D13 in entry 5 of the save flag table 241 (step S1006). More specifically, in entry 5 of the save flag table 241, "0" is registered in the item of the logical block number LBN, "0" is registered in the item of the word line number WL#, "M" is registered in the item of the page type PT, and "H6" is registered in the item of the physical block number PBN.

Next, since unwritten write data exists in the write buffer 251 (True in step S1008 in FIG. 17), the CPU 22 executes save processing of the data from the write buffer 251. For example, the CPU 22 sets data in buffer 0 of the write buffer 251 to the data D26 (step S1009 in FIG. 17). A bit in the data D26 is an example of second write data. As a scheduled write destination address Add_26 of the data D26, in step S1010, the CPU 22 acquires address information including the logical block number LBN "0", the block BLK_H6, the word line WL0, and the page type U (upper page). Since the address Add_26 is not registered in the save flag table 241 (False in step S1011 in FIG. 17), the CPU 22 saves the data D26 to the save area SR (step S1012). More specifically, the sequencer 105 selects the word line WL0 of the block BLK_S7 in the save area SR and executes the write operation of the data D26. The CPU 22 registers the address Add_26 of the data D26 in entry 6 of the save flag table 241 (step S1013). More specifically, in entry 6 of the save flag table 241, "0" is registered in the item of the logical block number LBN, "0" is registered in the item of the word line number WL#, "U" is registered in the item of the page type PT, and "H6" is registered in the item of the physical block number PBN.

Next, the CPU 22 controls the ECC circuit 26 to generate parity data Ps2 of the data D12, D13, and D26 saved to the save area SR (step S1015 in FIG. 17). A bit in the parity data Ps2 is an example of a fourth error correction code. Then, the CPU 22 writes the parity data Ps2 to the save area SR (step S1016). More specifically, the sequencer 105 selects the word line WL0 of the block BLK_S8 in the save area SR and executes the write operation of the parity data Ps2. A memory cell transistor MC in the block BLK_S8 coupled with the word line WL0 is an example of a seventh memory cell.

Next, since the parity data PU0 and PT0 that have never been nonvolatilized exist in the parity buffer 252 (True in step S2001 in FIG. 18), the CPU 22 executes save processing of the parity data from the parity buffer 252. The CPU 22 saves the parity data PU0 and PT0 to the save area SR (step S2002). More specifically, the sequencer 105 selects the word line WL0 of the block BLK_S9 in the save area SR and executes the write operation of the parity data PU0. Next, the sequencer 105 selects the word line WL0 of the block BLK_S10 in the save area SR and executes the write operation of the parity data PT0.

The data D12 and D13 saved to the save area SR are protected by the parity data Ps2. The data D26 saved to the save area SR is also protected by the parity data Ps2, but the data D14, D16, D18, D20, D22, and D24 in the user data area UR cannot be protected if the parity data PU0 is lost. Hence, the CPU 22 saves the parity data PU0 in the parity buffer 252. Similarly, to protect the data D15, D17, D19, D21, D23, and D25 in the user data area UR, the CPU 22 saves the parity data PT0 in the parity buffer 252.

After the end of the save operation, the CPU 22 transmits, to the host 2, a completion response to the flush command.

As shown in the third detailed example of the first embodiment, the page data in the cell unit CU in the user data area UR for which nonvolatilization (second write operation) is completed, are excluded from the target of save processing. More specifically, lower page data D0, D2, D4, D8, and D10, middle page data D1, D3, D5, D7, D9, and D11, upper page data D14, D16, D18, D20, D22, and D24, and top page data D15, D17, D19, D21, D23, and D25 in the blocks BLK_H0 to BLK_H5 in the user data area UR corresponding to the word line WL0 are excluded from the target of save processing. On the other hand, to protect the upper page data and the top page data in the user data area UR, the CPU 22 selects the parity data PU0 and PT0 stored in the parity buffer 252 as the target of save processing.

1.8 Entry Deletion of Save Flag Table

Figure 22:
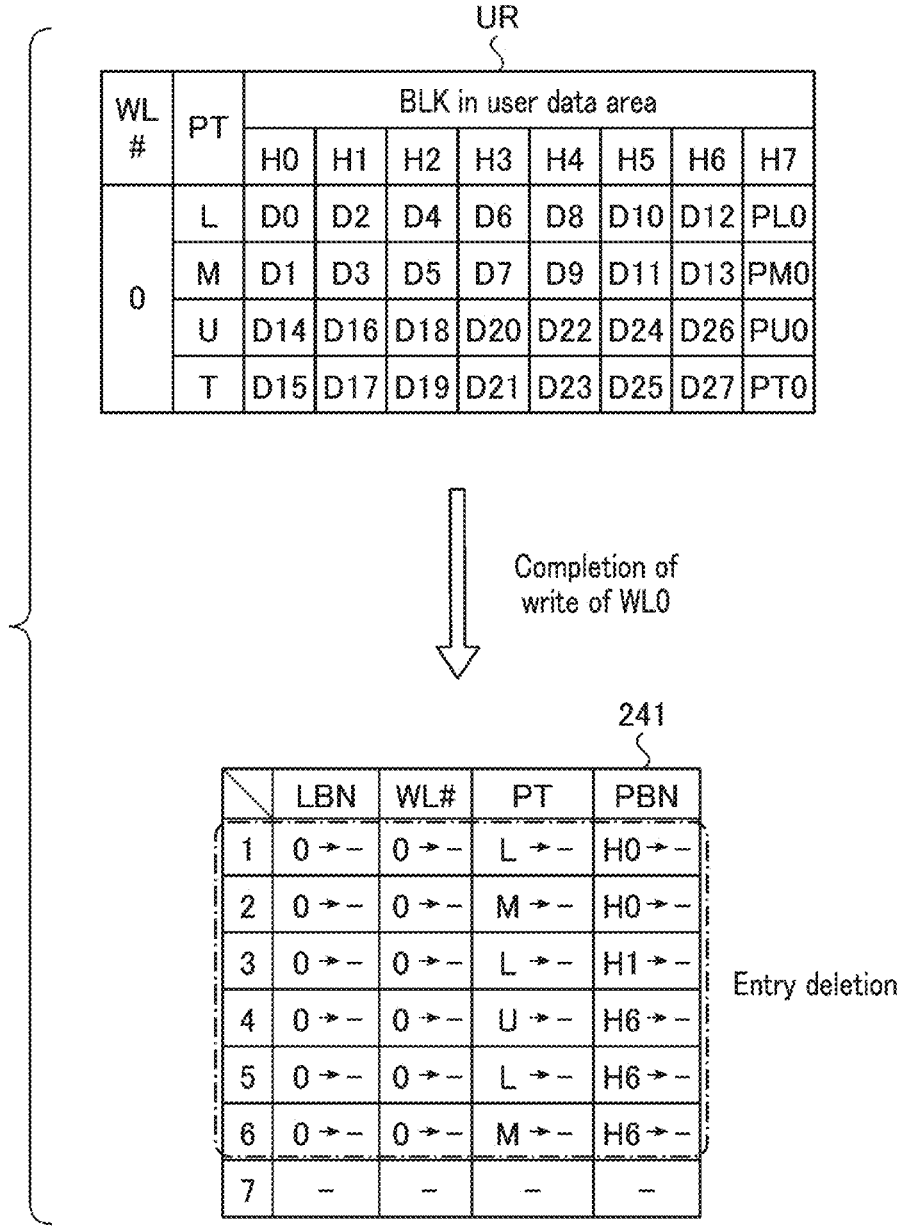
FIG. 22 is a view showing entry deletion of the save flag table in the memory system according to the first embodiment.

Next, the timing of entry deletion of the save flag table 241 will be described with reference to FIG. 22. FIG. 22 is a view showing entry deletion of the save flag table 241.

As shown in FIG. 22, for example, if the write operation corresponding to the same word line WL number of each of the blocks BLK managed as one logical block is completed, the CPU 22 deletes the information of each entry in the save flag table 241. In other words, if the write operation of the parity data PL0, PM0, PU0, and PT0 to each of the blocks BLK managed as one logical block is completed, the information of entry of write data corresponding to the parity data PL0, PM0, PU0, and PT0 is deleted in the save flag table 241. In the example shown in FIG. 22, the second write operation is completed in each cell unit CU of the blocks BLK_H0 to BLK_H7 corresponding to the word line WL0. In this case, the CPU 22 deletes the information of the entry corresponding to the word line WL0 in the save flag table 241.

1.9 Effect of this Embodiment

With the configuration according to this embodiment, a memory system capable of improving reliability of data can be provided. This effect will be described in detail.

For example, if power supply to the memory system is stopped during the second write operation, data that is not nonvolatilized may disappear, or data (lower page data and middle page data) of the MLC state stored in the cell unit CU for which the second write operation is being executed may be broken. Breaking lower page data or middle page data written in the cell unit CU will be referred to as "MLC breakage" hereinafter. For example, to guarantee the latest value of data even if MLC breakage occurs, the host transmits a flush command to the memory system. Upon receiving the flush command from the host, the memory system executes processing for data guarantee. Here, for data protection corresponding to the flush command, a method can be used in which padding data (invalid data) is written as upper page data and top page data in the cell unit CU that stores data of the MLC state to obtain a state in which the write operation (second write operation) is completed. In this case, however, since invalid data increases, the write amplification factor (WAF) increases. In addition, the time to execute padding data generation and the second write operation is relatively long.

However, in the configuration according to this embodiment, the memory system 3 can provide, in the memory area, the save area SR configured to save data in accordance with the flush command. Upon receiving the flush command, the memory system 3 can save data that exist in the write buffer 251 and the parity buffer 252 and are not nonvolatilized and data of the MLC state in the user data area UR, to the save area SR. Thus, the memory system 3 can guarantee the latest value of data that is the target of the flush command. Hence, the memory system 3 can improve the reliability of data.

Furthermore, in the configuration according to this embodiment, the memory system 3 can execute the write operation of an SLC in the save operation by using SLCs as the memory cell transistors MC in the save area SR. The processing time of the write operation of an SLC is shorter than that of the second write operation of a QLC to write padding data. Hence, the processing time of data protection can be shortened in emergency such as stop of power supply.

Furthermore, in the configuration according to this embodiment, the memory system 3 includes the save flag table 241. By managing data saved to the save area SR using the save flag table 241, redundancy of data written to the save area SR can be suppressed. Hence, the processing time of data protection can be shortened.

2. Second Embodiment

Next, a second embodiment will be described. In the second embodiment, a case where a part of write data is redundantly written in a save area SR will be described. The case where the identical data can redundantly be saved will be referred to as "redundant save" hereinafter. That is, in a save operation according to the second embodiment, the redundant save is performed for write data, and the redundancy elimination is performed for parity data. Points different from the first embodiment will mainly be described below.

2.1 Configuration of Save Flag Table

First, an example of the configuration of a save flag table 241 will be described with reference to FIG. 23. FIG. 23 is a view showing an example of the configuration of the save flag table 241.

As shown in FIG. 23, the save flag table 241 according to this embodiment includes a write buffer save flag table 241a and a user data area save flag table 241b. The write buffer save flag table 241a and the user data area save flag table 241b are examples of a first table and a second table, respectively.

The write buffer save flag table 241a includes a plurality of entries configured to store address information of write data saved from a write buffer 251 to the save area SR. The configuration of the table is the same as the save flag table 241 according to the first embodiment described with reference to FIG. 9. In the example shown in FIG. 23, address information is stored in entry 1 of the write buffer save flag table 241a. For example, in entry 1, "0" is registered in the item of a logical block number LBN, "0" (WL0) is registered in the item of a word line number WL#, "L" is registered in the item of a page type PT, and "H0" is registered in the item of a physical block number PBN.

The user data area save flag table 241b includes a plurality of entries configured to store address information of write data saved from a user data area UR to the save area SR. The configuration of the table is the same as the save flag table 241 according to the first embodiment described with reference to FIG. 9. In the example shown in FIG. 23, address information is stored in entry 1 of the user data area save flag table 241b. For example, in entry 1, "0" is registered in the item of the logical block number LBN, "0" (WL0) is registered in the item of the word line number WL#, "L" is registered in the item of the page type PT, and "H0" is registered in the item of the physical block number PBN.

2.2 Procedure of Save Processing of Write Data

Figure 25:
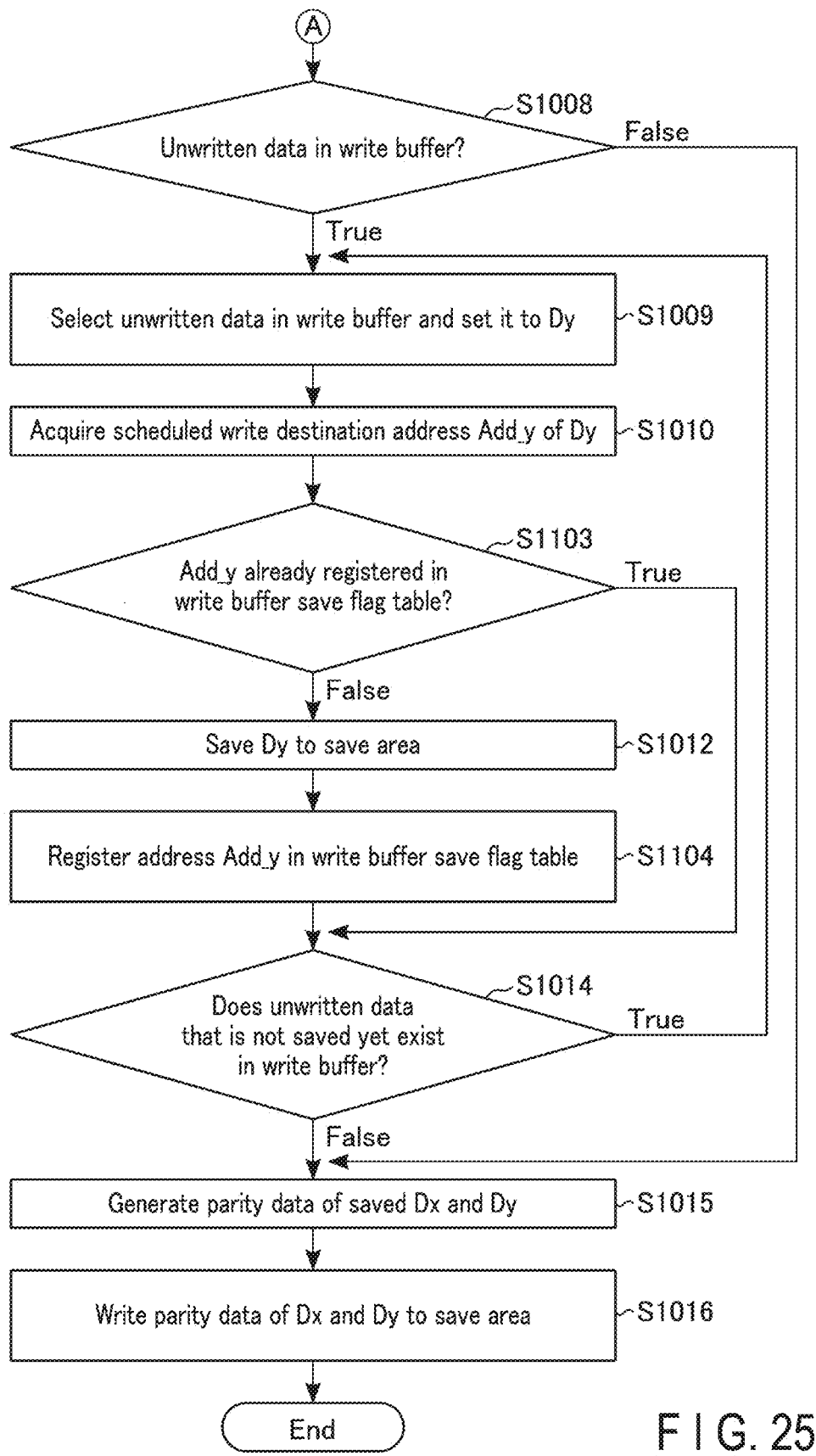
FIG. 25 is a flowchart showing an example of save processing of write data in the memory system according to the second embodiment.

Next, an example of the procedure of save processing of write data will be described with reference to FIGS. 24 and 25. FIGS. 24 and 25 are flowcharts showing an example of save processing of write data.

As shown in FIG. 24, first, a CPU 22 executes the processes of steps S1001 to S1003, step S1101, step S1005, step S1102, and step S1007 to be described later, thereby executing save processing of write data (user data and the error correction code of the user data) from the user data area UR.

The processes of steps S1001 to S1003 are the same as in the first embodiment described with reference to FIG. 16.

The CPU 22 acquires a write destination address Add_x of data Dx (step S1003), and confirms whether the address Add_x is already registered in the user data area save flag table 241b (step S1101).

If the address Add_x is already registered (True in step S1101), the CPU 22 advances to the process of step S1007 without saving the data Dx.

If the address Add_x is not already registered (False in step S1101), the CPU 22 saves the data Dx to the save area SR (step S1005). For example, a sequencer 105 executes the write operation of the data Dx to the save area SR.

If the save of the data Dx is ended, the CPU 22 registers the address Add_x of the data Dx in the user data area save flag table 241b (step S1102).

If the address Add_x is already registered (True in step S1101), or after the address Add_x is registered (step S1102), the CPU 22 confirms whether data of the MLC state that is not saved yet (not selected yet as the save target) exists in the user data area UR (step S1007).

If data of the MLC state that is not selected yet as the save target exists (True in step S1007), the CPU 22 increments a variable x and then sets the data to the data Dx (step S1002).

If data of the MLC state that is not selected yet as the save target does not exist (False in step S1007), as shown in FIG. 25, the CPU 22 executes the processes of steps S1008 to S1010, step S1103, step S1012, step S1104, and step S1014 to be described later, thereby executing save processing of write data from the write buffer 251.

The processes of steps S1008 to S1010 are the same as in the first embodiment described with reference to FIG. 17.

The CPU 22 acquires a scheduled write destination address Add_y of data Dy (step S1010), and confirms whether the address Add_y is already registered in the write buffer save flag table 241a (step S1103).

If the address Add_y is already registered (True in step S1103), the CPU 22 advances to the process of step S1014 without saving the data Dy.

If the address Add_y is not already registered (False in step S1103), the CPU 22 saves the data Dy to the save area SR (step S1012). For example, the sequencer 105 executes the write operation of the data Dy to the save area SR.

When the save of the data Dy is ended, the CPU 22 registers the address Add_y of the data Dy in the write buffer save flag table 241a (step S1104).

If the address Add_y is already registered (True in step S1103), or after the address Add_y is registered (step S1104), the CPU 22 confirms whether unwritten data that is not saved yet (not selected yet as the save target) exists in the write buffer 251 (step S1014).

If unwritten data that is not selected yet as the save target exists (True in step S1014), the CPU 22 increments a variable y and then sets the data to the data Dy (step S1009).

If unwritten data that is not selected yet as the save target does not exist (False in step S1014), the CPU 22 controls an ECC circuit 26 to generate parity data of the data Dx and Dy saved to the save area SR (step S1015).

The CPU 22 writes the parity data of the data Dx and Dy to the save area SR (step S1016). For example, the sequencer 105 executes the write operation of the parity data of the data Dx and Dy to the save area SR.

After the end of the process of step S1016, the CPU 22 ends the save processing of write data.

2.3 Procedure of Save Processing of Parity Data

An example of the procedure of save processing of parity data will be described next. The procedure of save processing of parity data according to this embodiment is the same as in the first embodiment described with reference to FIG. 18.

2.4 Detailed Examples of Save Operation

Three detailed examples of the save operation will be described next. A description will be made below focusing on points different from the first to third detailed examples of the first embodiment.

2.4.1 First Detailed Example

Figure 26:
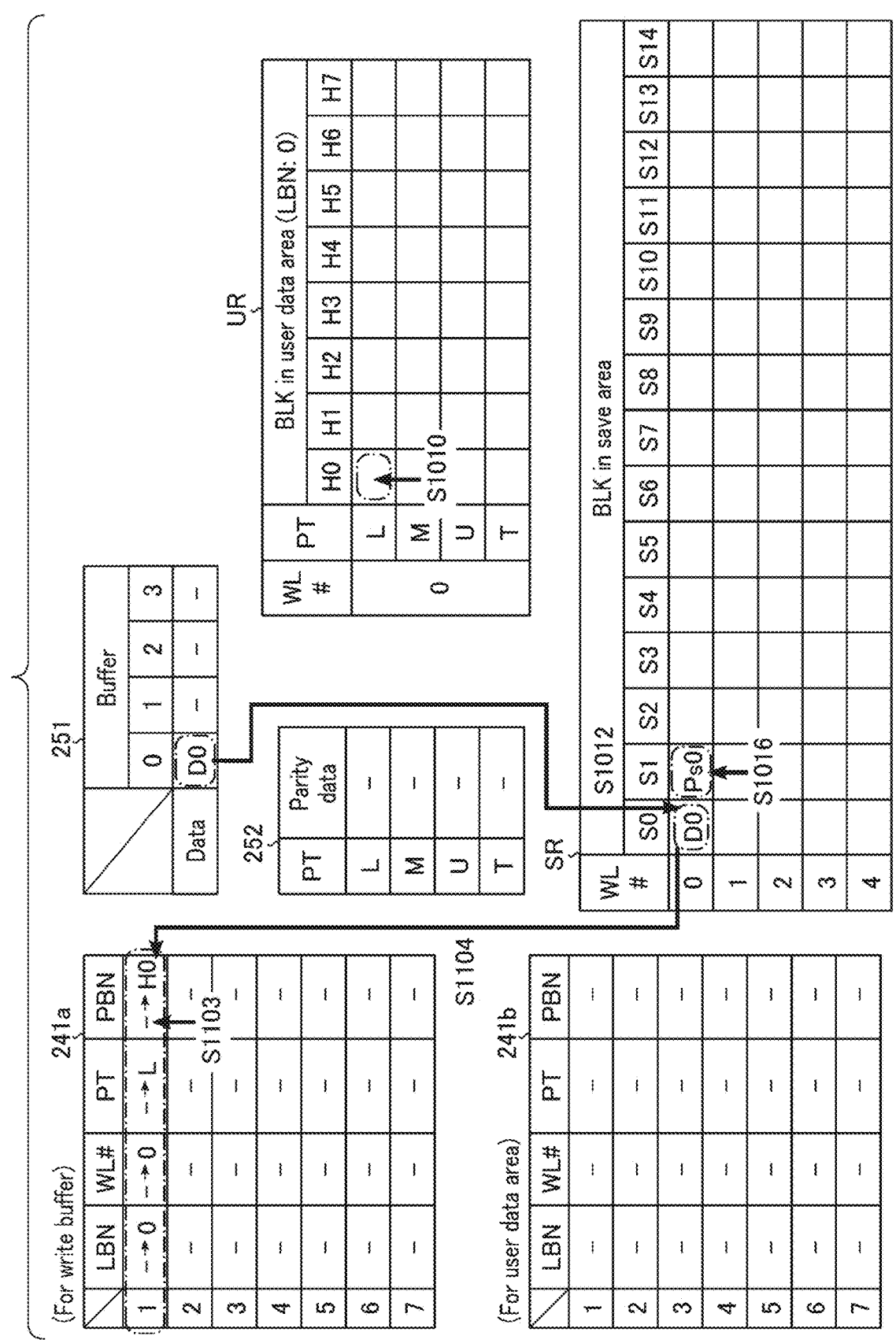
FIG. 26 is a view showing a first detailed example of a save operation in the memory system according to the second embodiment.

First, a first detailed example of the second embodiment will be described with reference to FIG. 26. In the first detailed example of the second embodiment, a case where the CPU 22 receives a flush command from a host 2 in a state in which no data is stored in the user data area UR will be described, like the first detailed example of the first embodiment (FIG. 19). FIG. 26 is a view showing changes in the write buffer 251, a parity buffer 252, the write buffer save flag table 241*a*, the user data area save flag table 241*b*, the user data area UR, and the save area SR caused by the save operation in the first detailed example of the second embodiment. Note that in the example shown in FIG. 26, the states of data stored in the write buffer 251, the parity buffer 252, and the user data area UR are the same as in the first detailed example of the first embodiment (FIG. 19).

As shown in FIG. 26, like the first detailed example of the first embodiment (FIG. 19), the CPU 22 executes save processing of write data from the write buffer 251. For example, the CPU 22 sets data in buffer 0 of the write buffer 251 to data D0 (step S1009 in FIG. 25). The CPU 22 acquires address information including a scheduled write destination address Add_0 of the data D0 (step S1010). Since the address Add_0 is not registered in the write buffer save flag table 241*a* (False in step S1103 in FIG. 25), the CPU 22 saves the data D0 to the save area SR (step S1012). More specifically, the sequencer 105 selects a word line WL0 of a block BLK_S0 in the save area SR and executes the write operation of the data D0. The CPU 22 registers the address Add_0 of the data D0 in entry 1 of the write buffer save flag table 241*a* (step S1104).

The operation from step S1104 is the same as in the first embodiment described with reference to FIG. 19.

After the end of the save operation, the CPU 22 transmits, to the host 2, a completion response to the flush command.

As shown in the first detailed example of the second embodiment, the CPU 22 can save the data (write data) from the write buffer 251 to the save area SR. At this time, the information of the saved data is registered in the write buffer save flag table 241*a*.

2.4.2 Second Detailed Example

Figure 27:
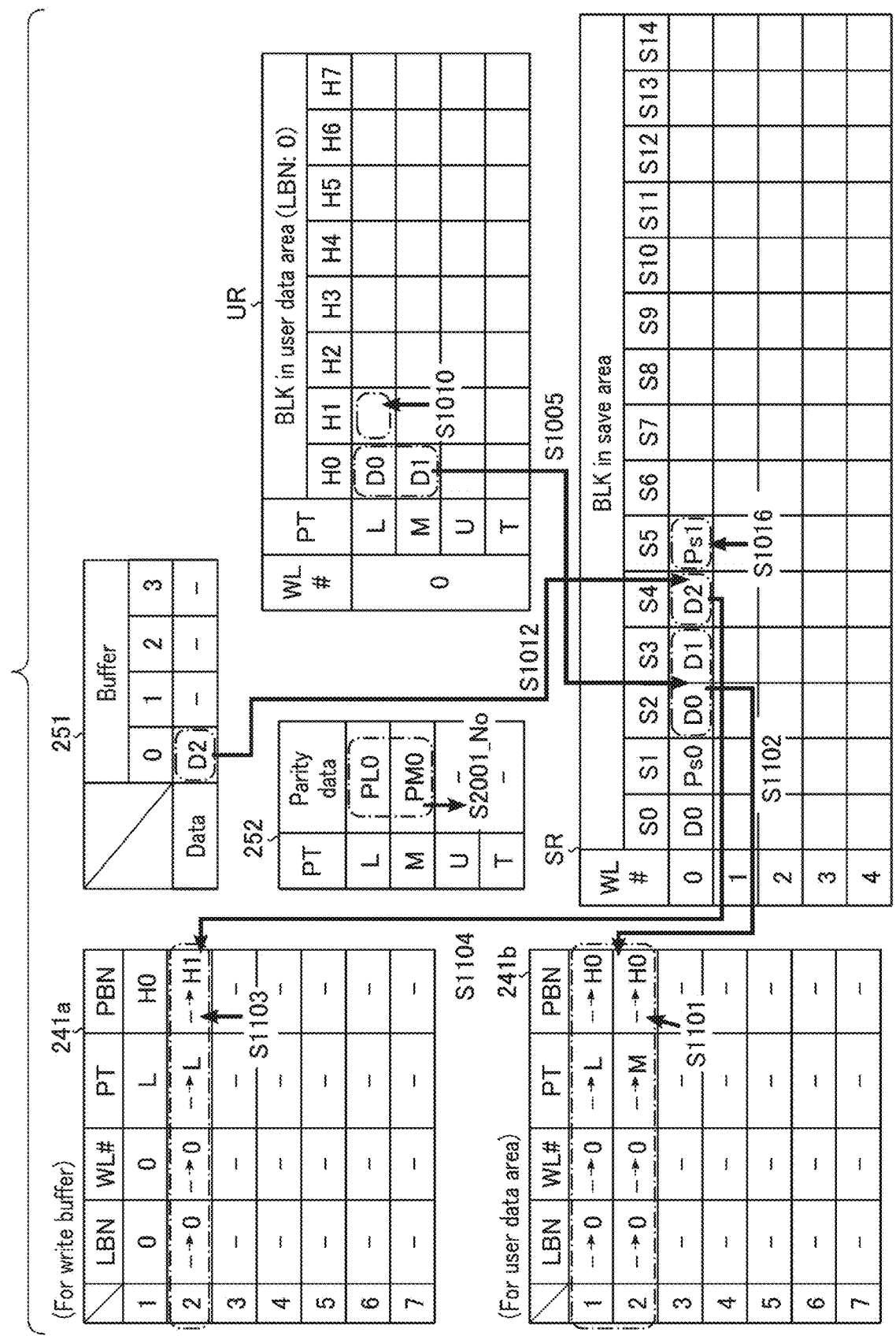
FIG. 27 is a view showing a second detailed example of the save operation in the memory system according to the second embodiment.

Next, a second detailed example of the second embodiment will be described with reference to FIG. 27. In the second detailed example of the second embodiment, a case where the CPU 22 receives a flush command from the host 2 in a state in which data of the MLC state is stored in the user data area UR will be described, like the second detailed example of the first embodiment (FIG. 20). FIG. 27 is a view showing changes in the write buffer 251, the parity buffer 252, the write buffer save flag table 241*a*, the user data area save flag table 241*b*, the user data area UR, and the save area SR caused by the save operation in the second detailed example of the second embodiment. Note that the example in FIG. 27 shows a case where data write is continued after the data write situation explained with reference to FIG. 26. Also, in the example shown in FIG. 27, the states of data stored in the write buffer 251, the parity buffer 252, and the user data area UR are the same as in the second detailed example of the first embodiment (FIG. 20).

As shown in FIG. 27, the CPU 22 selects the data D0 of the data D0 and D1 of the MLC state stored in the user data area UR (step S1002 in FIG. 24). The CPU 22 acquires address information including the write destination address Add_0 of the data D0 (step S1003 in FIG. 24). Since the address Add_0 is not registered in the user data area save flag table 241*b* (False in step S1101 in FIG. 24), the CPU 22 saves the data D0 to the save area SR (step S1005). More specifically, the sequencer 105 selects the word line WL0 of the block BLK_S2 in the save area SR and executes the write operation of the data D0. The CPU 22 registers the address Add_0 of the data D0 in entry 1 of the user data area save flag table 241*b* (step S1102).

Next, the CPU 22 sets data of a middle page to the data D1 (step S1002 in FIG. 24). The CPU 22 acquires address information including a write destination address Add_1 of the data D1 (step S1003 in FIG. 24). Since the address Add_1 is not registered in the user data area save flag table 241*b* (False in step S1101 in FIG. 24), the CPU 22 saves the data D1 to the save area SR (step S1005). More specifically, the sequencer 105 selects the word line WL0 of the block BLK_S3 in the save area SR and executes the write operation of the data D1. The CPU 22 registers the address Add_1 of the data D1 in entry 2 of the user data area save flag table 241*b* (step S1102).

Next, the CPU 22 executes save processing of data from the write buffer 251. For example, the CPU 22 sets data in buffer 0 of the write buffer 251 to data D2 (step S1009 in FIG. 25). The CPU 22 acquires address information including a scheduled write destination address Add_2 of the data D2 (step S1010). Since the address Add_2 is not registered in the write buffer save flag table 241*a* (False in step S1103 in FIG. 25), the CPU 22 saves the data D2 to the save area SR (step S1012). More specifically, the sequencer 105 selects the word line WL0 of the block BLK_S4 in the save area SR and executes the write operation of the data D2. The CPU 22 registers the address Add_2 of the data D2 in entry 2 of the write buffer save flag table 241*a* (step S1104).

Next, the CPU 22 controls the ECC circuit 26 to generate parity data Ps1 of the data D0, D1, and D2 saved to the save area SR (step S1015 in FIG. 25). Then, the CPU 22 writes the parity data Ps1 in the save area SR (step S1016). More specifically, the sequencer 105 selects the word line WL0 of the block BLK_S5 in the save area SR and executes the write operation of the parity data Ps1.

Parity data PL0 and PM0 in the parity buffer 252 are not save targets (False in step S2001). Hence, save processing of the parity data from the parity buffer 252 is omitted.

After the end of the save operation, the CPU 22 transmits, to the host 2, a completion response to the flush command.

As shown in the second detailed example of the second embodiment, the CPU 22 can redundantly save data of the MLC state from the user data area UR to the save area SR. Also, the CPU 22 can generate parity data based on the write data saved to the save area SR and write it to the save area SR, like the second detailed example of the first embodiment. Hence, even if the parity data PL0 and PM0 stored in the parity buffer 252 are not saved, the CPU 22 can protect the saved write data.

2.4.3 Third Detailed Example

Figure 28:
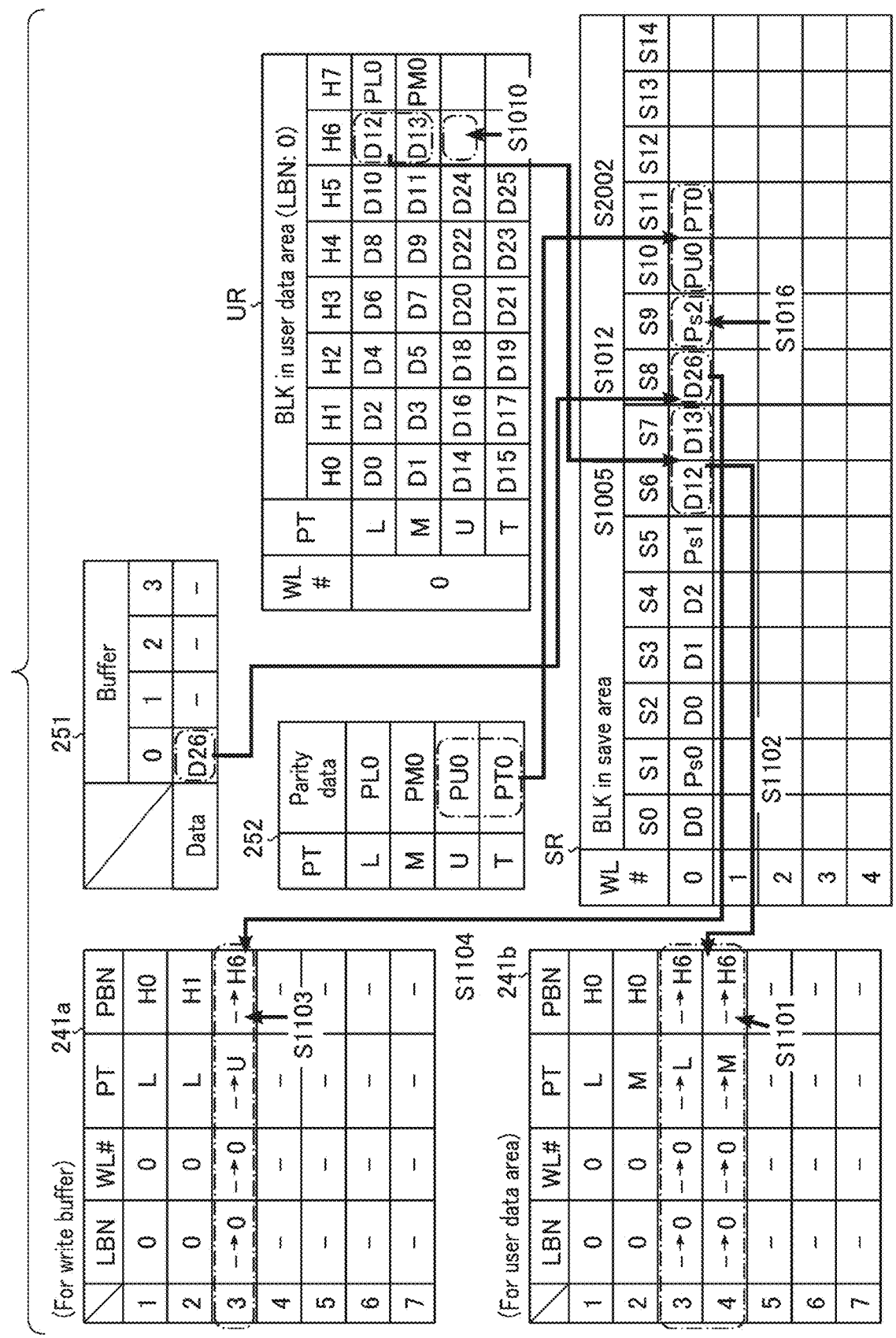
FIG. 28 is a view showing a third detailed example of the save operation in the memory system according to the second embodiment.

Next, a third detailed example of the second embodiment will be described with reference to FIG. 28. In the third detailed example of the second embodiment, a case where the CPU 22 receives a flush command from the host 2 in a state in which upper page data and top page data are stored in some blocks BLK in the user data area UR will be described, like the third detailed example of the first embodiment (FIG. 21). FIG. 28 is a view showing changes in the write buffer 251, the parity buffer 252, the write buffer save flag table 241*a*, the user data area save flag table 241*b*, the user data area UR, and the save area SR caused by the save operation in the third detailed example of the second embodiment. Note that the example in FIG. 28 shows a case where data write is continued after the data write situation explained with reference to FIG. 27. Also, in the example shown in FIG. 28, the states of data stored in the write buffer 251, the parity buffer 252, and the user data area UR are the same as in the third detailed example of the first embodiment (FIG. 21).

As shown in FIG. 28, the CPU 22 selects, for example, data D12 of the data D12 and D13 of the MLC state stored in the user data area UR (step S1002 in FIG. 24). The CPU 22 acquires address information including a write destination address Add_12 of the data D12 (step S1003 in FIG. 24). Since the address Add_12 is not registered in the user data area save flag table 241*b* (False in step S1101 in FIG. 24), the CPU 22 saves the data D12 to the save area SR (step S1005). More specifically, the sequencer 105 selects the word line WL0 of the block BLK_S6 in the save area SR and executes the write operation of the data D12. The CPU 22 registers the address Add_12 of the data D12 in entry 3 of the user data area save flag table 241*b* (step S1102).

Next, the CPU 22 selects, for example, the data D13 (step S1002 in FIG. 24). The CPU 22 acquires address information including a write destination address Add_13 of the data D13 (step S1003 in FIG. 24). Since the address Add_13 is not registered in the user data area save flag table 241*b* (False in step S1101), the CPU 22 saves the data D13 to the save area SR (step S1005). More specifically, the sequencer 105 selects the word line WL0 of the block BLK_S7 in the save area SR and executes the write operation of the data D13. The CPU 22 registers the address Add_13 of the data D13 in entry 4 of the user data area save flag table 241*b* (step S1102).

Next, the CPU 22 executes save processing of data from the write buffer 251. For example, the CPU 22 sets data in buffer 0 of the write buffer 251 to data D26 (step S1009 in FIG. 25). The CPU 22 acquires address information including a scheduled write destination address Add_26 of the data D26 (step S1010). Since the address Add_26 is not registered in the write buffer save flag table 241*a* (False in step S1103 in FIG. 25), the CPU 22 saves the data D26 to the save area SR (step S1012). More specifically, the sequencer 105 selects the word line WL0 of the block BLK_S8 in the save area SR and executes the write operation of the data D26. The CPU 22 registers the address Add_26 of the data D26 in entry 3 of the write buffer save flag table 241*a* (step S1104).

Next, the CPU 22 controls the ECC circuit 26 to generate parity data Ps2 of the data D12, D13, and D26 saved to the save area SR (step S1015 in FIG. 25). Then, the CPU 22 writes the parity data Ps2 to the save area SR (step S1016). More specifically, the sequencer 105 selects the word line WL0 of the block BLK_S9 in the save area SR and executes the write operation of the parity data Ps2.

Next, the CPU 22 executes save processing of the parity data from the parity buffer 252. For example, first, the CPU 22 saves parity data PU0 to the save area SR (step S2002). More specifically, the sequencer 105 selects the word line WL0 of the block BLK_S10 in the save area SR and executes the write operation of the parity data PU0. Next, the CPU 22 saves parity data PT0 to the save area SR (step S2002). More specifically, the sequencer 105 selects the word line WL0 of the block BLK_S11 in the save area SR and executes the write operation of the parity data PT0.

After the end of the save operation, the CPU 22 transmits, to the host 2, a completion response to the flush command.

As shown in the third detailed example of the second embodiment, the page data in the cell unit CU in the user data area UR, for which nonvolatilization (second write operation) is completed, are excluded from the target of save processing, like the third detailed example of the first embodiment. Also, even if the parity data PL0 and PM0 stored in the parity buffer 252 are not saved, the CPU 22 can protect the saved write data, like the second detailed example of the first embodiment.

2.5 Entry Deletion of Save Flag Table

Figure 29:
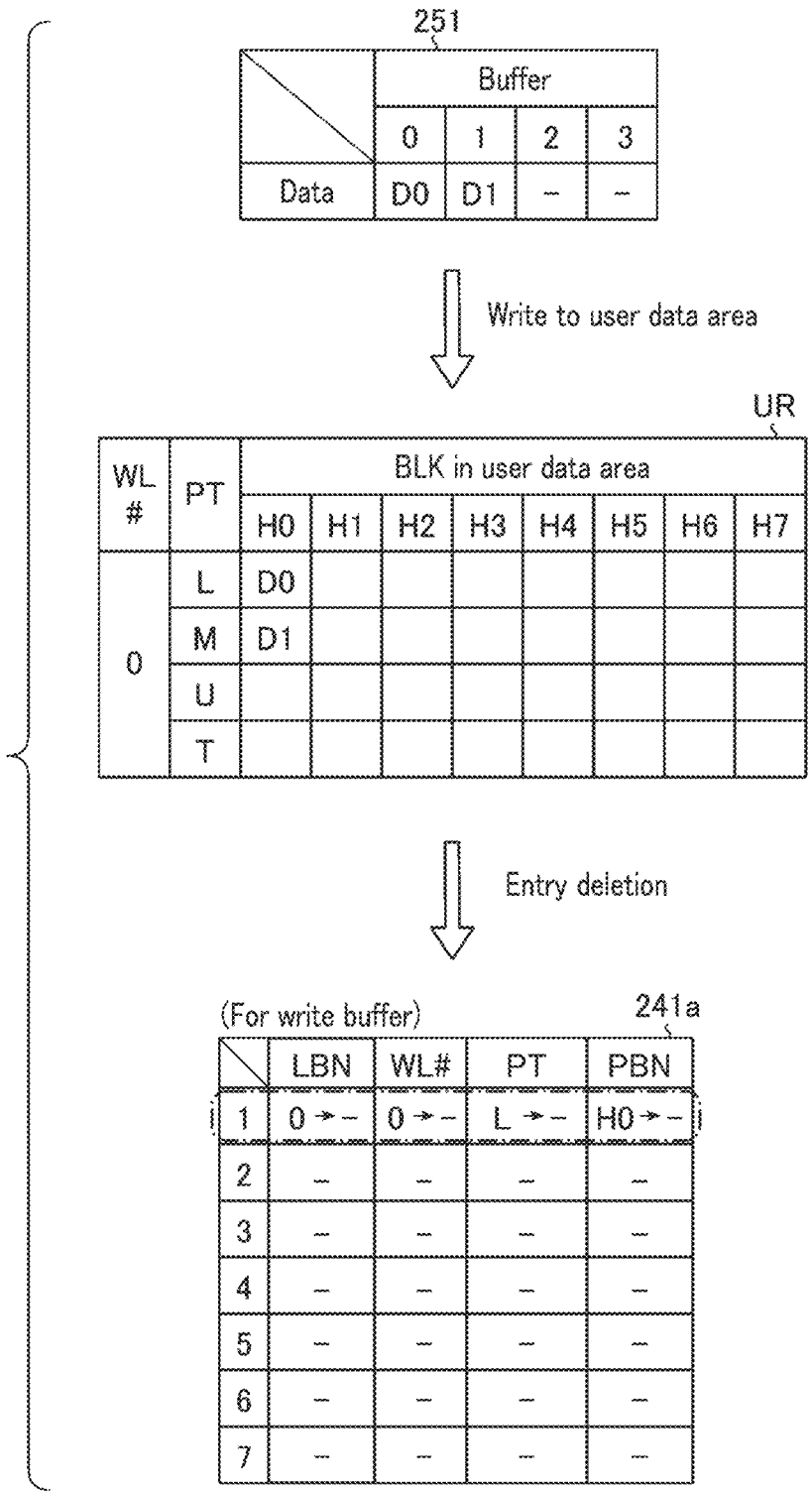
FIG. 29 is a view showing entry deletion of a write buffer save flag table in the memory system according to the second embodiment.

Next, the timing of entry deletion of the write buffer save flag table 241*a* and the user data area save flag table 241*b* will be described with reference to FIGS. 29 and 30. FIG. 29 is a view showing entry deletion of the write buffer save flag table 241*a*. FIG. 30 is a view showing entry deletion of the user data area save flag table 241*b*.

As shown in FIG. 29, the information of each entry of the write buffer save flag table 241*a* is deleted at a timing when write data stored in the write buffer 251 is written to the user data area UR. More specifically, the example shown in FIG. 29 assumes a case where save processing is executed when the data D0 is stored in the write buffer 251. For this reason, information corresponding to the data D0 is registered in entry 1 of the write buffer save flag table 241*a*. There is assumed a case where, after that, the data D1 is stored in the write buffer 251 and the data D0 and D1 are written to the user data area UR. When the data D0 is written to the user data area UR, the CPU 22 deletes the information of the data D0 in entry 1 of the write buffer save flag table 241*a*.

As shown in FIG. 30, like the first embodiment described with reference to FIG. 22, the information of each entry of the user data area save flag table 241*b* is deleted, for example, at a timing when the write operation corresponding to the same word line WL number of each of the blocks BLK managed as one logical block is completed. In the example shown in FIG. 30, the second write operation is completed in each cell unit CU of blocks BLK_H0 to BLK_H7 corresponding to the word line WL0. In this case, the CPU 22 deletes the information of the entry corresponding to the word line WL0 in the user data area save flag table 241*b*.

2.6 Effect of this Embodiment

With the configuration according to this embodiment, the same effect as in the first embodiment can be obtained.

Furthermore, with the configuration according to this embodiment, redundant save of write data is possible. If identical data is written to the save area SR a plurality of times, the possibility of data missing at the time of the save operation can be reduced, and reliability of data protection improves.

3. Third Embodiment

Next, a third embodiment will be described. In the third embodiment, a case where a part of parity data is redundantly written in a save area SR will be described. That is, in a save operation according to the third embodiment, redundancy elimination is performed for write data, and redundant save is performed for parity data. Note that redundant save of parity data indicates a state in which write data saved to the save area SR is protected by a plurality of parity data. Points different from the first and second embodiments will mainly be described below.

3.1 Procedure of Save Processing of Write Data

The procedure of save processing of write data will be described first. The procedure of save processing of write data according to this embodiment is the same as in the first embodiment described with reference to FIGS. 16 and 17.

3.2 Procedure of Save Processing of Parity Data

Figure 31:
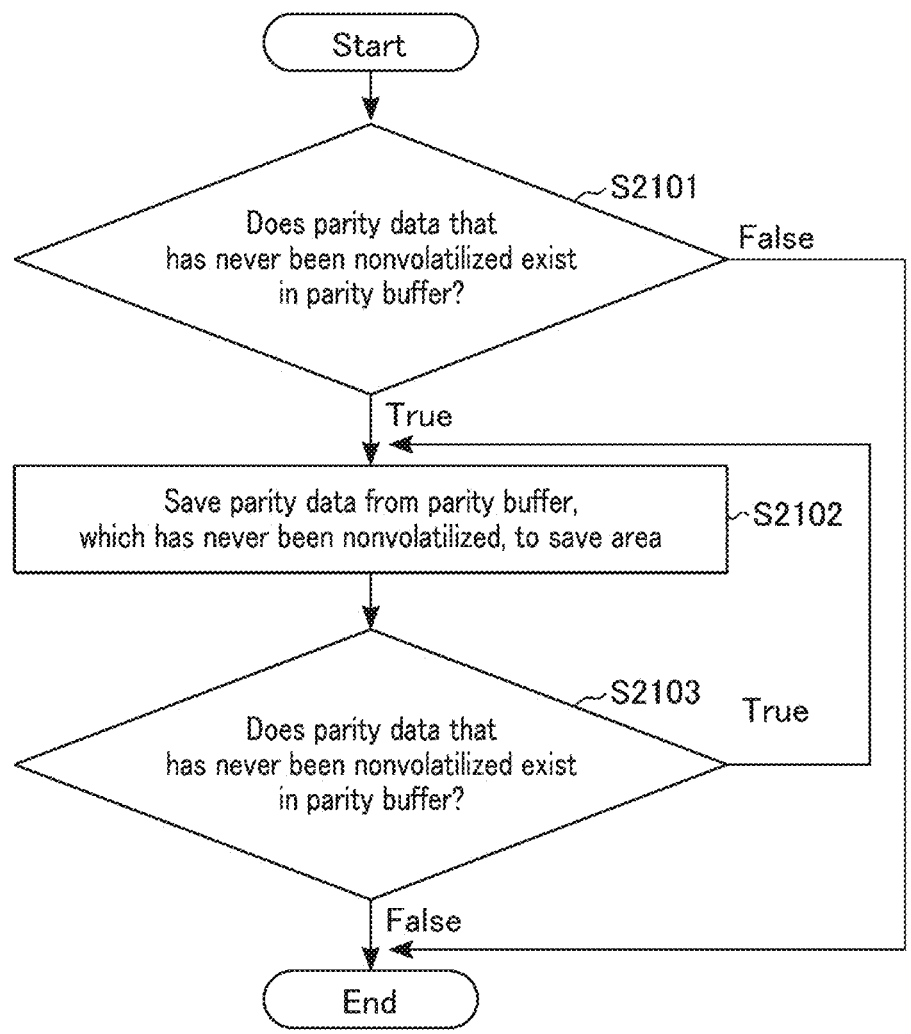
FIG. 31 is a flowchart showing an example of save processing of parity data in a memory system according to a third embodiment.

Next, an example of the procedure of save processing of parity data will be described with reference to FIG. 31. FIG. 31 is a flowchart showing an example of save processing of parity data.

As shown in FIG. 31, the CPU 22 confirms whether parity data that has never been nonvolatilized exists in a parity buffer 252 (step S2101). More specifically, for example, the CPU 22 confirms whether parity data PL0, PM0, PU0, and PT0 in the parity buffer 252 have never been stored in a user data area UR or a save area SR.

If parity data that has never been nonvolatilized does not exist (False in step S2101), parity data of a save target does not exist in the parity buffer 252, and therefore, the CPU 22 ends the save processing of parity data.

If parity data that has never been nonvolatilized exists (True in step S2101), the CPU 22 selects one parity data of a target and saves it to the save area SR (step S2102).

The CPU 22 confirms whether parity data that has not been selected yet as the save target and has never been nonvolatilized exists (step S2103).

If parity data that has not been selected yet as the save target and has never been nonvolatilized exists (True in step S2103), the CPU 22 selects parity data of a target and saves it to the save area SR (step S2102).

If parity data that has not been selected yet as the save target and has never been nonvolatilized does not exist (False in step S2103), the CPU 22 ends the save processing of parity data.

In the first embodiment described with reference to FIG. 18, the parity data of lower page data and middle page data are not saved to the save area SR. On the other hand, in this embodiment, the parity data of lower page data and middle page data are saved to the save area SR. Hence, in the save area SR, protection of write data by the parity data stored in the parity buffer 252 and protection of write data by parity data generated based on the write data written in the save area SR may redundantly be performed. In other words, at least a part of write data saved to the save area SR is protected by a plurality of parity data. That is, the parity data of at least a part of write data is redundantly saved.

3.3 Detailed Examples of Save Operation

Two detailed examples of the save operation will be described next. A description will be made below focusing on save processing of parity data.

3.3.1 First Detailed Example

Figure 32:
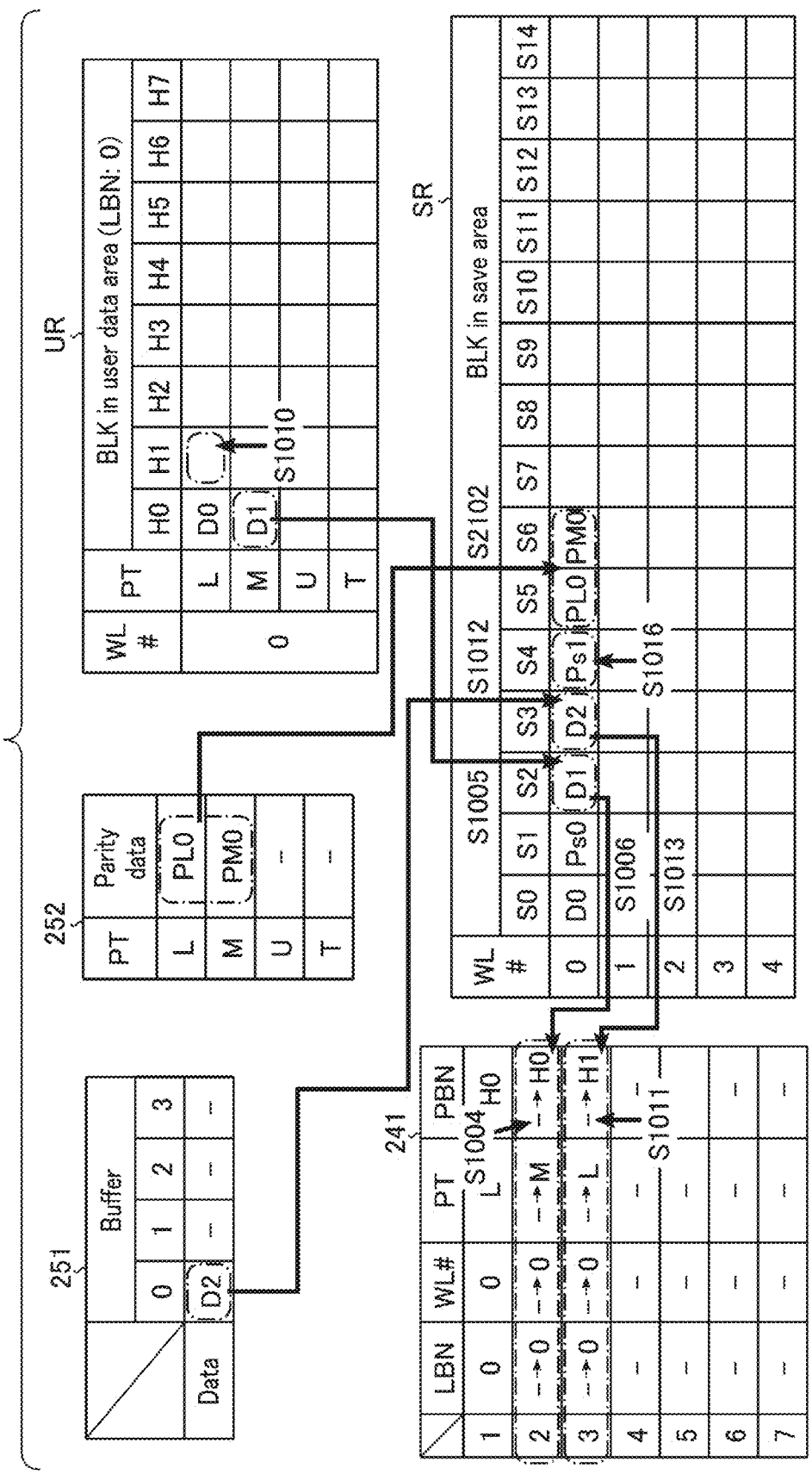
FIG. 32 is a view showing a first detailed example of a save operation in the memory system according to the third embodiment.

First, a first detailed example of the third embodiment will be described with reference to FIG. 32. In the first detailed example of the third embodiment, a case where the CPU 22 receives a flush command from a host 2 in a state in which data of the MLC state is stored in the user data area UR will be described, like the second detailed example of the first embodiment (FIG. 20). FIG. 32 is a view showing changes in the write buffer 251, the parity buffer 252, a save flag table 241, the user data area UR, and the save area SR caused by the save operation in the first detailed example of the third embodiment. Note that the example in FIG. 32 shows a case where data write is continued after the data write situation explained with reference to FIG. 19. Also, in the example shown in FIG. 32, the states of data stored in the write buffer 251, the parity buffer 252, and the user data area UR are the same as in the second detailed example of the first embodiment (FIG. 20).

As shown in FIG. 32, first, the CPU 22 executes save processing of write data. Save processing of write data is the same as in the second detailed example of the first embodiment described with reference to FIG. 20.

Next, since parity data that has never been nonvolatilized exists in the parity buffer 252 (True in step S2101 in FIG. 31), the CPU 22 executes save processing of the parity data from the parity buffer 252. For example, first, the CPU 22 saves the parity data PL0 to the save area SR (step S2102). More specifically, a sequencer 105 selects a word line WL0 of a block BLK_S5 in the save area SR and executes the write operation of the parity data PL0. Next, the CPU 22 saves the parity data PM0 to the save area SR (step S2102). More specifically, the sequencer 105 selects the word line WL0 of a block BLK_S6 in the save area SR and executes the write operation of the parity data PM0. For example, the data D0 is thus protected by the parity data Ps0 and PL0. That is, the parity data Ps0 and PL0 for the data D0 are redundantly saved. Similarly, the data D1 is protected by the parity data Ps1 and PM0. Also, the data D2 is protected by the parity data Ps1 and PL0. That is, the parity data Ps1, PM0, and PL0 for the data D1 and D2 are redundantly saved.

After the end of the save operation, the CPU 22 transmits, to the host 2, a completion response to the flush command.

As shown in the first detailed example of the third embodiment, the CPU 22 can save data to the save area SR while eliminating redundancy of data of the MLC state in the user data area UR, like the second detailed example of the first embodiment. At this time, the CPU 22 can redundantly save the parity data by saving the parity data PL0 and PM0 stored in the parity buffer 252.

3.3.2 Second Detailed Example

Figure 33:
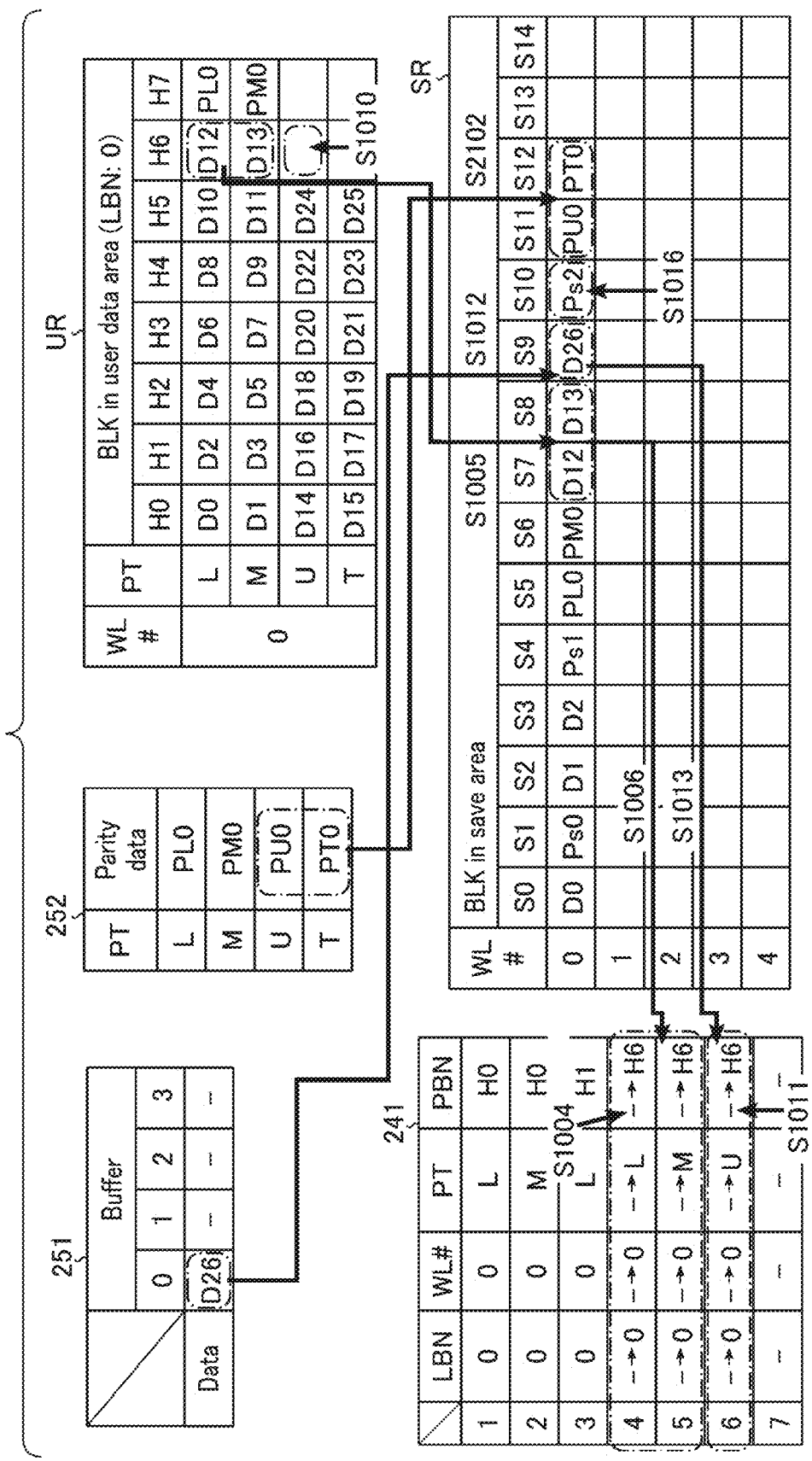
FIG. 33 is a view showing a second detailed example of the save operation in the memory system according to the third embodiment.

Next, a second detailed example of the third embodiment will be described with reference to FIG. 33. In the second detailed example of the third embodiment, a case where the CPU 22 receives a flush command from the host 2 in a state in which upper page data and top page data are stored in some blocks BLK in the user data area UR will be described, like the third detailed example of the first embodiment (FIG. 21). FIG. 33 is a view showing changes in the write buffer 251, the parity buffer 252, the save flag table 241, the user data area UR, and the save area SR caused by the save operation in the second detailed example of the third embodiment. Note that the example in FIG. 33 shows a case where data write is continued after the data write situation explained with reference to FIG. 32. Also, in the example shown in FIG. 33, the states of data stored in the write buffer 251, the parity buffer 252, and the user data area UR are the same as in the third detailed example of the first embodiment (FIG. 21).

As shown in FIG. 33, first, the CPU 22 executes save processing of write data. Save processing of write data is the same as in the third detailed example of the first embodiment described with reference to FIG. 21. In this example, the CPU 22 writes the data D12, D13, and D26 and the parity data Ps2 to the blocks BLK_S7 to BLK_S10 in the save area SR.

Next, since the parity data PU0 and PT0 that have never been nonvolatilized exist in the parity buffer 252 (True in step S2101 in FIG. 31), the CPU 22 executes save processing of the parity data from the parity buffer 252. The parity data PL0 and PM0 in the parity buffer 252 have been saved to the blocks BLK_S5 and BLK_S6 in the save area SR, respectively, and therefore, are not selected as the save target. For example, first, the CPU 22 saves the parity data PU0 to the save area SR (step S2102). More specifically, the sequencer 105 selects a word line WL0 of a block BLK_S11 in the save area SR and executes the write operation of the parity data PU0. Next, the CPU 22 saves the parity data PT0 to the save area SR (step S2102). More specifically, the sequencer 105 selects the word line WL0 of a block BLK_S12 in the save area SR and executes the write operation of the parity data PT0. For example, the data D26 is thus protected by the parity data Ps2 and PU0. That is, the parity data Ps2 and PU0 for the data D26 are redundantly saved.

After the end of the save operation, the CPU 22 transmits, to the host 2, a completion response to the flush command.

As shown in the second detailed example of the third embodiment, the page data in the cell unit CU in the user data area UR, for which nonvolatilization (second write operation) is completed, are excluded from the target of save processing, like the third detailed example of the first embodiment. That is, upper page data and top page data in the user data area UR are excluded from the target of save processing. At this time, the CPU 22 can redundantly save the parity data by saving the parity data PU0 and PT0 stored in the parity buffer 252.

3.4 Effect of this Embodiment

With the configuration according to this embodiment, the same effect as in the first embodiment can be obtained.

Furthermore, with the configuration according to this embodiment, redundant save of parity data is possible. This can increase the number of times of attempting correction processing when correcting burst errors of write data. Thus, reliability of data correction improves.

4. Fourth Embodiment

Next, a fourth embodiment will be described. In the fourth embodiment, a case where a part of write data and a part of parity data are redundantly written in a save area SR will be described. That is, in a save operation according to the fourth embodiment, redundant save is performed for write data and parity data. Points different from the first to third embodiments will mainly be described below.

4.1 Procedure of Save Processing of Write Data

The procedure of save processing of write data will be described first. The procedure of save processing of write data according to this embodiment is the same as in the second embodiment described with reference to FIGS. 24 and 25.

4.2 Procedure of Save Processing of Parity Data

The procedure of save processing of parity data will be described next. The procedure of save processing of parity data according to this embodiment is the same as in the third embodiment described with reference to FIG. 31.

4.3 Detailed Examples of Save Operation

Two detailed examples of the save operation will be described next.

4.3.1 First Detailed Example

First, a first detailed example of the fourth embodiment will be described with reference to FIG. 34. In the first detailed example of the fourth embodiment, a case where a CPU 22 receives a flush command from a host 2 in a state in which data of the MLC state is stored in a user data area UR will be described, like the second detailed example of the second embodiment (FIG. 27). FIG. 34 is a view showing changes in a write buffer 251, a parity buffer 252, a write buffer save flag table 241*a*, a user data area save flag table 241*b*, the user data area UR, and the save area SR caused by the save operation in the first detailed example of the fourth embodiment. Note that the example in FIG. 34 shows a case where data write is continued after the data write situation explained with reference to FIG. 26. Also, in the example shown in FIG. 34, the states of data stored in the write buffer 251, the parity buffer 252, and the user data area UR are the same as in the second detailed example of the second embodiment (FIG. 27).

As shown in FIG. 34, first, the CPU 22 executes save processing of write data. The save processing of write data is the same as in the second detailed example of the second embodiment described with reference to FIG. 27.

Next, since parity data that has never been nonvolatilized exists in the parity buffer 252 (True in step S2101 in FIG. 31), the CPU 22 executes save processing of the parity data from the parity buffer 252, like the first detailed example of the third embodiment described with reference to FIG. 32. That is, the CPU 22 saves parity data PL0 and parity data PM0 to the save area SR (step S2102).

After the end of the save operation, the CPU 22 transmits, to the host 2, a completion response to the flush command.

As shown in the first detailed example of the fourth embodiment, the CPU 22 can perform the same control as in the second detailed example of the second embodiment and the first detailed example of the third embodiment.

4.3.2 Second Detailed Example

Figure 35:
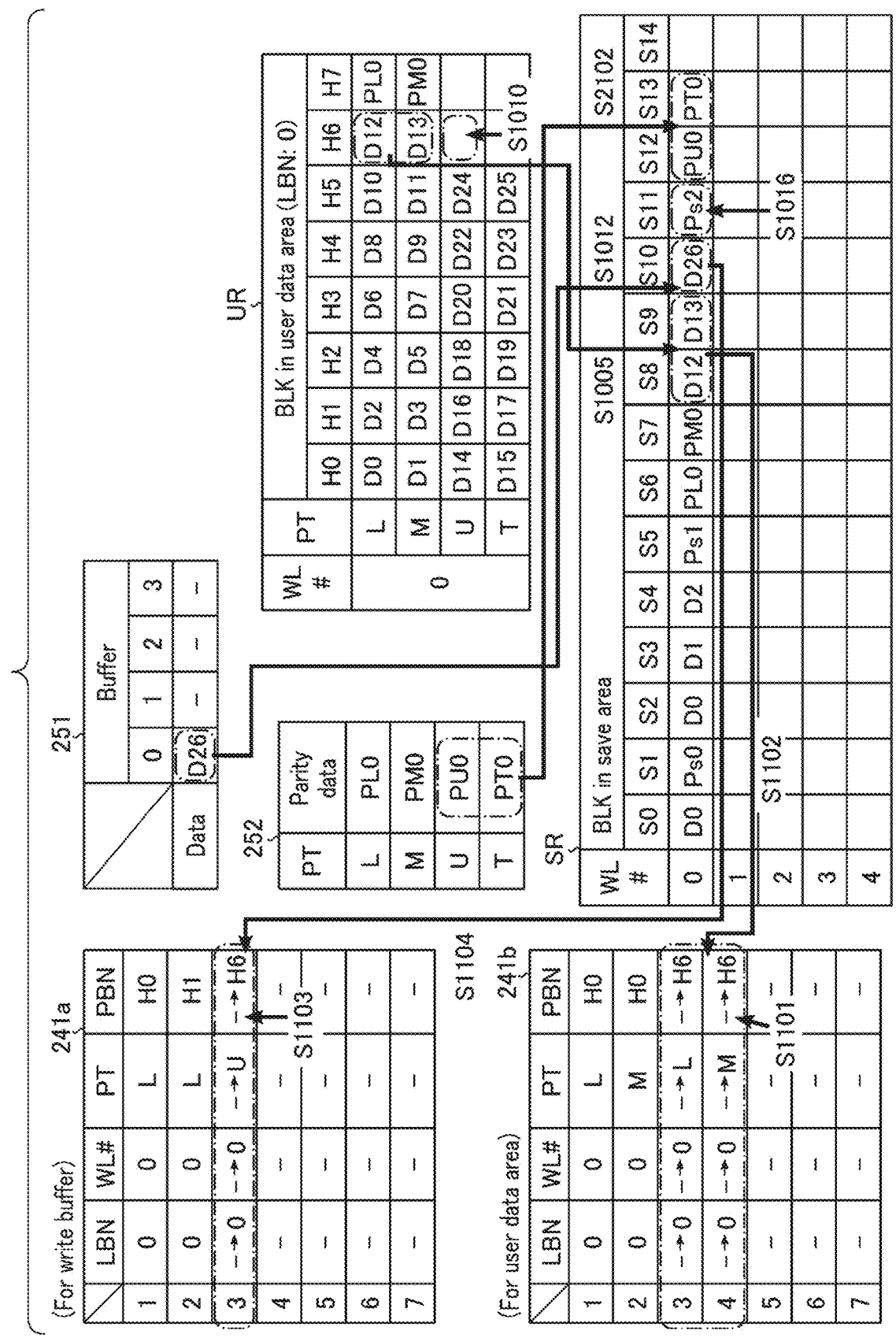
FIG. 35 is a view showing a second detailed example of the save operation in the memory system according to the fourth embodiment.

Next, a second detailed example of the fourth embodiment will be described with reference to FIG. 35. In the second detailed example of the fourth embodiment, a case where the CPU 22 receives a flush command from the host 2 in a state in which upper page data and top page data are stored in some blocks BLK in the user data area UR will be described, like the third detailed example of the second embodiment (FIG. 28). FIG. 35 is a view showing changes in the write buffer 251, the parity buffer 252, the write buffer save flag table 241a, the user data area save flag table 241b, the user data area UR, and the save area SR caused by the save operation in the second detailed example of the fourth embodiment. Note that the example in FIG. 35 shows a case where data write is continued after the data write situation explained with reference to FIG. 34. Also, in the example shown in FIG. 35, the states of data stored in the write buffer 251, the parity buffer 252, and the user data area UR are the same as in the third detailed example of the second embodiment (FIG. 28).

As shown in FIG. 35, first, the CPU 22 executes save processing of write data. Save processing of write data is the same as in the third detailed example of the second embodiment described with reference to FIG. 28. In this example, the CPU 22 writes data D12, D13, and D26 and parity data Ps2 in blocks BLK_S8 to BLK_S11 in the save area SR.

Next, since the parity data PU0 and PT0 that have never been nonvolatilized exist in the parity buffer 252 (True in step S2101 in FIG. 31), the CPU 22 executes save processing of the parity data from the parity buffer 252, like the second detailed example of the third embodiment described with reference to FIG. 33. That is, the CPU 22 saves the parity data PU0 and PT0 to the save area SR (step S2102).

After the end of the save operation, the CPU 22 transmits, to the host 2, a completion response to the flush command.

As shown in the second detailed example of the fourth embodiment, the CPU 22 can perform the same control as in the third detailed example of the second embodiment and the second detailed example of the third embodiment.

4.4 Effect of this Embodiment

With the configuration according to this embodiment, an effect that is a combination of the second embodiment and the third embodiment can be obtained.

5. Modifications

According to the above embodiment, a memory system (3) includes a nonvolatile memory (10) and a memory controller (20). The nonvolatile memory (10) includes a first memory cell (MC) configured to nonvolatilely store data of a plurality of bits including a first bit (middle bit) and a second bit (upper bit), and a second memory cell (MC) configured to nonvolatilely store data of at least one bit. The memory controller is configured to execute a save operation in accordance with reception of a command (flush command) from a host. The memory controller is configured to, in the save operation, write first bit data to the second memory cell in a case where the first memory cell stores the first bit data as the first bit and does not store data as the second bit, and transmit, to the host, a completion response to the command after the first bit data has been written to the second memory cell.

According to the above-described embodiment, it is possible to provide a memory system that improves reliability of data.

Note that the embodiments are not limited to the above-described embodiments, and various modifications can be made. Also, the embodiments can be combined as much as possible.

Furthermore, "couple" in the above-described embodiments includes a state in which elements are coupled indirectly by interposing, for example, another element such as a transistor or a resistor therebetween.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory including a first memory cell configured to nonvolatilely store data of a plurality of bits, the plurality of bits including a first bit that is to be written to the first memory cell by a first write operation and a second bit that is to be written to the first memory cell by a second write operation, a second memory cell configured to nonvolatilely store data of at least one bit, a third memory cell configured to nonvolatilely store data of at least one bit, and a fourth memory cell configured to nonvolatilely store data of at least one bit;
a first buffer;
a second buffer; and
a memory controller configured to:
    execute a data erase operation to the first memory cell such that the first memory cell stores neither the first bit nor the second bit;
    write first bit data to the first memory cell as the first bit by the first write operation;
    generate a first error correction code corresponding to at least the first bit data;
    write the first error correction code to the second buffer;
    execute a save operation in accordance with reception of a command from a host; and
    in the save operation, in a case that the save operation is executed at a first timing that is after the first write operation to write the first bit data to the first memory cell is executed and before the second write operation is executed to the first memory cell since execution of the data erase operation executed to the first memory cell,
        write the first bit data to the second memory cell;
        transmit, to the host, a completion response to the command after the first bit data has been written to the second memory cell; and
        in a case where first write data that is scheduled to be written as the second bit to the first memory cell is stored in the first buffer:
            read the first write data from the first buffer;
            write the first write data read from the first buffer to the third memory cell;
            generate a second error correction code based on at least one of the first bit data and the first write data; and
            write the second error correction code to the fourth memory cell without writing, to the nonvolatile memory, the first error correction code stored in the second buffer.

2. The memory system according to claim 1, wherein the memory controller is configured to:
- read the first bit data from the first memory cell; and
- write the first bit data read from the first memory cell to the second memory cell.

3. The memory system according to claim 1, wherein the memory controller is further configured to:
- manage the nonvolatile memory using a third table; and
- in the save operation, omit the writing of the first bit data to the second memory cell in a case where information of the first bit data is registered in the third table.

4. The memory system according to claim 1, further comprising a third buffer,
- wherein the nonvolatile memory further includes a fifth memory cell configured to nonvolatilely store data of a plurality of bits including a third bit and a fourth bit, and
- the memory controller is further configured to:
  - generate a third error correction code corresponding to at least the first bit data and second bit data stored as the third bit of the fifth memory cell; and
  - write the third error correction code to the third buffer.

5. The memory system according to claim 4, further comprising a fourth buffer,
- wherein the memory controller is further configured to, in the save operation, generate a fourth error correction code based on at least one of the first bit data, the second bit data, and second write data in a case where the second write data that is scheduled to be written to the fourth bit of the fifth memory cell is stored in the fourth buffer.

6. The memory system according to claim 5, wherein the nonvolatile memory further includes a sixth memory cell configured to nonvolatilely store data of at least one bit, and
- the memory controller is further configured to, in the save operation, write the fourth error correction code to the sixth memory cell without writing, to the nonvolatile memory, the third error correction code stored in the third buffer in a case where the third error correction code is stored in the nonvolatile memory.

7. The memory system according to claim 5, wherein the nonvolatile memory further includes a seventh memory cell configured to nonvolatilely store data of at least one bit, and
- the memory controller is further configured to, in the save operation, write a fifth error correction code to the seventh memory cell in a case where the fifth error correction code corresponding to the second write data is stored in the third buffer.

8. The memory system according to claim 1, wherein the nonvolatile memory includes a first memory area that includes the first memory cell and is not used for the save operation, and a second memory area that includes the second memory cell and is used for the save operation.

9. The memory system according to claim 1, wherein a write operation to the first memory cell includes the first write operation of writing data as the first bit, and the second write operation of writing data as the second bit, and
the memory controller is further configured to execute the second write operation based on the first bit data written as the first bit and the first write data that is scheduled to be written as the second bit.

10. A memory system comprising:
- a nonvolatile memory including a first memory cell configured to nonvolatilely store data of a plurality of bits, the plurality of bits including a first bit that is to be written to the first memory cell by a first write operation and a second bit that is to be written to the first memory cell by a second write operation, a second memory cell configured to nonvolatilely store data of at least one bit, and a third memory cell configured to nonvolatilely store data of at least one bit;
- a first buffer; and
- a memory controller is further configured to:
  - execute a data erase operation to the first memory cell such that the first memory cell stores neither the first bit nor the second bit;
  - write first bit data to the first memory cell as the first bit by the first write operation;
  - execute a save operation in accordance with reception of a command from a host;
  - manage, using a first table, data written from the first buffer to the third memory cell;
  - manage, using a second table, data written from the first memory cell to the second memory cell; and
  - in the save operation, in a case that the save operation is executed at a first timing that is after the first write operation to write the first bit data to the first memory cell is executed and before the second write operation is executed to the first memory cell since execution of the data erase operation executed to the first memory cell:
    - write the first bit data to the second memory cell in a case where information of the first bit data is not registered in the second table;
    - transmit, to the host, a completion response to the command after the first bit data has been written to the second memory cell; and
    - in a case where first write data that is scheduled to be written as the second bit to the first memory cell is stored in the first buffer:
      - read the first write data from the first buffer; and
      - write the first write data read from the first buffer to the third memory cell in a case where information of the first write data is not registered in the first table.

11. The memory system according to claim 10, wherein the memory controller is further configured to register the information of the first write data in the first table after the first write data has been written to the third memory cell.

12. The memory system according to claim 10, wherein the memory controller is further configured to register the information of the first bit data in the second table after the first bit data has been written to the second memory cell.

13. The memory system according to claim 12, further comprising a second buffer,
- wherein the nonvolatile memory further includes a fourth memory cell configured to nonvolatilely store data of at least one bit, and
- the memory controller is further configured to:
  - generate a first error correction code corresponding to at least the first bit data;

write the first error correction code to the second buffer; and in the save operation,
generate a second error correction code based on at least one of the first bit data and the first write data, and
write the second error correction code to the fourth memory cell without writing, to the nonvolatile memory, the first error correction code stored in the second buffer.

14. The memory system according to claim 10, further comprising a second buffer,
wherein the nonvolatile memory further includes a fourth memory cell and a fifth memory cell, which are configured to nonvolatilely store data of at least one bit, and
the memory controller is further configured to:
generate a first error correction code corresponding to at least the first bit data;
write the first error correction code to the second buffer; and
in the save operation,
generate a second error correction code based on at least one of the first bit data and the first write data,
write the second error correction code to the fourth memory cell, and
write the first error correction code to the fifth memory cell.

15. The memory system according to claim 10, wherein the memory controller is configured to:
read the first bit data from the first memory cell; and
write the first bit data read from the first memory cell to the second memory cell.

16. The memory system according to claim 10, wherein the memory controller is further configured to:
manage the nonvolatile memory using a third table; and
in the save operation, omit the writing of the first bit data to the second memory cell in a case where information of the first bit data is registered in the third table.

17. The memory system according to claim 10, further comprising a second buffer,
wherein the nonvolatile memory further includes a fourth memory cell configured to nonvolatilely store data of at least one bit, and
the memory controller is further configured to:
generate a first error correction code corresponding to at least the first bit data;
write the first error correction code to the second buffer; and
in the save operation,
generate a second error correction code based on at least one of the first bit data and the first write data, and
write the second error correction code to the fourth memory cell without writing, to the nonvolatile memory, the first error correction code stored in the second buffer.

18. A memory system comprising:
wherein a nonvolatile memory including a first memory cell configured to nonvolatilely store data of a plurality of bits, the plurality of bits including a first bit that is to be written to the first memory cell by a first write operation and a second bit that is to be written to the first memory cell by a second write operation, a second memory cell configured to nonvolatilely store data of at least one bit, a third memory cell configured to nonvolatilely store data of at least one bit, a fourth memory cell configured to nonvolatilely store data of at least one bit, and a fifth memory cell configured to nonvolatilely store data of at least one bit; and a first buffer;
a second buffer; and
a memory controller is configured to:
execute a data erase operation to the first memory cell such that the first memory cell stores neither the first bit nor the second bit;
write first bit data to the first memory cell as the first bit by the first write operation;
execute a save operation in accordance with reception of a command from a host;
generate a first error correction code corresponding to at least the first bit data;
write the first error correction code to the second buffer; and
in the save operation, in a case that the save operation is executed at a first timing that is after the first write operation to write the first bit data to the first memory cell is executed and before the second write operation is executed to the first memory cell since execution of the data erase operation executed to the first memory cell:
write the first bit data to the second memory cell;
transmit, to the host, a completion response to the command after the first bit data has been written to the second memory cell; and
in a case where first write data that is scheduled to be written as the second bit to the first memory cell is stored in the first buffer:
read the first write data from the first buffer;
write the first write data read from the first buffer to the third memory cell;
generate a second error correction code based on at least one of the first bit data and the first write data;
write the second error correction code to the fourth memory cell; and
write the first error correction code to the fifth memory cell.

19. The memory system according to claim 18, wherein the memory controller is further configured to:
manage the nonvolatile memory using a third table; and
in the save operation, omit the writing of the first bit data to the second memory cell in a case where information of the first bit data is registered in the third table.

20. The memory system according to claim 18, wherein the memory controller is configured to:
read the first bit data from the first memory cell; and
write the first bit data read from the first memory cell to the second memory cell.

* * * * *